(12) United States Patent
Edwards et al.

(10) Patent No.: US 12,478,739 B2
(45) Date of Patent: Nov. 25, 2025

(54) DEVICES AND METHODS FOR DELIVERY OF SUBSTANCES WITHIN A PREFILLED SYRINGE

(71) Applicant: kaleo, Inc., Richmond, VA (US)

(72) Inventors: Eric S. Edwards, Moseley, VA (US); Evan T. Edwards, Charlottesville, VA (US); Paul F. Meyers, Fishers, IN (US); Michael J. Roe, Powhatan, VA (US)

(73) Assignee: kaleo, Inc., Glen Allen, VA (US)

( * ) Notice: Subject to any disclaimer, the term of this patent is extended or adjusted under 35 U.S.C. 154(b) by 982 days.

(21) Appl. No.: 17/415,397

(22) PCT Filed: Dec. 27, 2019

(86) PCT No.: PCT/US2019/068750
§ 371 (c)(1),
(2) Date: Jun. 17, 2021

(87) PCT Pub. No.: WO2020/140040
PCT Pub. Date: Jul. 2, 2020

(65) Prior Publication Data
US 2022/0040413 A1    Feb. 10, 2022

Related U.S. Application Data

(60) Provisional application No. 62/786,409, filed on Dec. 29, 2018.

(51) Int. Cl.
*A61M 5/315*    (2006.01)
*A61M 5/31*     (2006.01)

(52) U.S. Cl.
CPC .... *A61M 5/31525* (2013.01); *A61M 5/31501* (2013.01); *A61M 5/31513* (2013.01);
(Continued)

(58) Field of Classification Search
CPC .......... A61M 5/31525; A61M 5/31501; A61M 5/31513; A61M 2005/3128;
(Continued)

(56) References Cited

U.S. PATENT DOCUMENTS 2,409,656 A    10/1946  Austin
2,960,087 A    11/1960  Uytenbogaart
(Continued)

FOREIGN PATENT DOCUMENTS

DE    2019296       11/1971
EP    1287840 A1    3/2003
(Continued)

OTHER PUBLICATIONS

"Anaphylaxis Canada Product Catalogue," Anaphylaxis Canada > Living with Anaphylaxis > Tools and Resources [online] [retrieved on Jan. 24, 2007] Retrieved from the Internet <URL: http://anaphylaxis.org/content/livingwith/product catalogue.asp >, 9 pages.
(Continued)

*Primary Examiner* — Loan B Jimenez
*Assistant Examiner* — Kathleen Paige Farrell
(74) *Attorney, Agent, or Firm* — Mills IP Law, PLLC

(57) ABSTRACT

An apparatus includes a housing, a carrier, a medicament container, and a flexible member. The housing defines an opening placing a gas chamber of the housing in fluid communication with an exterior volume. The carrier has a proximal surface that defines a portion of the gas chamber. The medicament container is coupled to the carrier and has a distal end portion coupled to a delivery member. The medicament container containing a medicament and includes an elastomeric member that seals the medicament therein. The flexible member has a distal end portion coupled to the elastomeric member and a proximal end portion coupled to a valve member. The flexible member
(Continued)

transitions from a collapsed configuration to an expanded configuration when the elastomeric member moves within the medicament container. The flexible member moves the valve member relative to the opening when the flexible member transitions from the collapsed configuration to the expanded configuration.

18 Claims, 45 Drawing Sheets

(52) U.S. Cl.
CPC ............... *A61M 2005/3128* (2013.01); *A61M 2205/0216* (2013.01)

(58) Field of Classification Search
CPC ........ A61M 2205/0216; A61M 5/2053; A61M 5/20; A61M 5/24; A61M 5/2046
See application file for complete search history.

(56) References Cited

U.S. PATENT DOCUMENTS

| | | | |
|---|---|---|---|
| 3,055,362 A | 9/1962 | Uytenbogaart |
| 3,115,133 A | 12/1963 | Morando |
| 3,426,448 A | 2/1969 | Sarnoff |
| 3,563,373 A | 2/1971 | Paulson |
| 3,565,070 A | 2/1971 | Hanson et al. |
| 3,688,765 A | 9/1972 | Gasaway |
| 3,768,472 A | 10/1973 | Hodosh et al. |
| 3,795,061 A | 3/1974 | Sarnoff et al. |
| 3,797,489 A | 3/1974 | Sarnoff |
| 3,941,130 A | 3/1976 | Tibbs |
| 3,945,379 A | 3/1976 | Pritz et al. |
| 4,031,889 A | 6/1977 | Pike |
| 4,108,177 A | 8/1978 | Pistor |
| 4,124,024 A | 11/1978 | Schwebel et al. |
| 4,226,235 A | 10/1980 | Sarnoff et al. |
| 4,227,528 A | 10/1980 | Wardlaw |
| 4,258,713 A | 3/1981 | Wardlaw |
| 4,360,019 A | 11/1982 | Portner et al. |
| 4,378,015 A | 3/1983 | Wardlaw |
| 4,394,863 A | 7/1983 | Bartner |
| 4,424,057 A | 1/1984 | House |
| 4,441,629 A | 4/1984 | Mackal |
| 4,484,910 A | 11/1984 | Sarnoff |
| 4,573,976 A | 3/1986 | Sampson et al. |
| 4,596,556 A | 6/1986 | Morrow et al. |
| 4,610,666 A | 9/1986 | Pizzino |
| 4,617,557 A | 10/1986 | Gordor |
| 4,624,660 A | 11/1986 | Mijers et al. |
| 4,640,686 A | 2/1987 | Dalling et al. |
| 4,643,721 A | 2/1987 | Brunet |
| 4,664,653 A | 5/1987 | Sagstetter et al. |
| 4,666,430 A | 5/1987 | Brown et al. |
| 4,673,657 A | 6/1987 | Christian |
| 4,689,042 A | 8/1987 | Sarnoff et al. |
| 4,693,708 A | 9/1987 | Wanderer et al. |
| 4,755,169 A | 7/1988 | Sarnoff et al. |
| 4,781,697 A | 11/1988 | Slaughter |
| 4,782,841 A | 11/1988 | Lopez |
| 4,784,652 A | 11/1988 | Wikström |
| 4,790,824 A | 12/1988 | Morrow et al. |
| 4,795,433 A | 1/1989 | Sarnoff |
| 4,820,286 A | 4/1989 | van der Wal |
| 4,822,340 A | 4/1989 | Kamstra |
| 4,826,489 A | 5/1989 | Haber |
| 4,853,521 A | 8/1989 | Claeys et al. |
| 4,874,381 A | 10/1989 | Vetter |
| 4,874,382 A | 10/1989 | Lindemann et al. |
| 4,894,054 A | 1/1990 | Miskinyar |
| 4,906,235 A | 3/1990 | Roberts |
| 4,915,695 A | 4/1990 | Koobs |
| 4,941,880 A | 7/1990 | Burns |
| 4,959,056 A | 9/1990 | Dombrowski et al. |
| 4,968,302 A | 11/1990 | Schluter et al. |
| 4,983,164 A | 1/1991 | Hook et al. |
| 5,000,736 A | 3/1991 | Kaufhold, Jr. et al. |
| 5,024,656 A | 6/1991 | Gasaway et al. |
| 5,037,306 A | 8/1991 | van Schoonhoven |
| 5,038,023 A | 8/1991 | Saliga |
| 5,041,088 A | 8/1991 | Ritson et al. |
| 5,042,977 A | 8/1991 | Bechtold et al. |
| 5,062,603 A | 11/1991 | Smith et al. |
| 5,064,413 A | 11/1991 | McKinnon et al. |
| 5,071,353 A | 12/1991 | van der Wal |
| 5,080,649 A | 1/1992 | Vetter |
| 5,085,642 A | 2/1992 | Sarnoff et al. |
| 5,092,842 A | 3/1992 | Bechtold et al. |
| 5,092,843 A | 3/1992 | Monroe et al. |
| 5,104,380 A | 4/1992 | Holman et al. |
| 5,125,898 A | 6/1992 | Kaufhold, Jr. et al. |
| 5,139,490 A | 8/1992 | Vetter et al. |
| 5,147,311 A | 9/1992 | Pickhard |
| 5,167,641 A | 12/1992 | Schmitz |
| 5,199,949 A | 4/1993 | Haber et al. |
| 5,224,936 A | 7/1993 | Gallagher |
| 5,240,146 A | 8/1993 | Smedley et al. |
| 5,244,465 A | 9/1993 | Michel |
| 5,271,527 A | 12/1993 | Haber et al. |
| 5,281,198 A | 1/1994 | Haber et al. |
| 5,286,258 A | 2/1994 | Haber et al. |
| 5,295,965 A | 3/1994 | Wilmot |
| 5,298,023 A | 3/1994 | Haber et al. |
| 5,298,024 A | 3/1994 | Richmond |
| 5,312,326 A | 5/1994 | Myers et al. |
| 5,314,412 A | 5/1994 | Rex |
| 5,318,544 A | 6/1994 | Drypen et al. |
| 5,336,180 A | 8/1994 | Kriesel et al. |
| 5,343,519 A | 8/1994 | Feldman |
| 5,344,407 A | 9/1994 | Ryan |
| 5,354,284 A | 10/1994 | Haber et al. |
| 5,356,376 A | 10/1994 | Milijasevic et al. |
| 5,358,489 A | 10/1994 | Wyrick |
| 5,363,842 A | 11/1994 | Mishelevich et al. |
| 5,380,281 A | 1/1995 | Tomellini et al. |
| 5,383,851 A | 1/1995 | McKinnon, Jr. et al. |
| 5,383,864 A | 1/1995 | van den Heuvel |
| 5,394,866 A | 3/1995 | Ritson et al. |
| 5,395,345 A | 3/1995 | Gross |
| 5,399,163 A | 3/1995 | Peterson et al. |
| 5,405,362 A | 4/1995 | Kramer et al. |
| 5,417,660 A | 5/1995 | Martin |
| 5,451,210 A | 9/1995 | Kramer et al. |
| 5,466,217 A | 11/1995 | Myers et al. |
| 5,478,316 A | 12/1995 | Bitdinger et al. |
| 5,514,097 A | 5/1996 | Knauer |
| 5,514,135 A | 5/1996 | Earle |
| 5,527,287 A | 6/1996 | Miskinyar |
| 5,540,664 A | 7/1996 | Wyrick |
| 5,558,679 A | 9/1996 | Tuttle |
| 5,567,160 A | 10/1996 | Massino |
| 5,568,555 A | 10/1996 | Shamir |
| 5,569,192 A | 10/1996 | van der Wal |
| 5,584,815 A | 12/1996 | Pawelka et al. |
| 5,615,771 A | 4/1997 | Hollister |
| 5,616,132 A | 4/1997 | Newman |
| 5,645,534 A | 7/1997 | Chanoch |
| 5,658,259 A | 8/1997 | Pearson et al. |
| 5,681,291 A | 10/1997 | Galli |
| 5,681,292 A | 10/1997 | Tober et al. |
| 5,692,492 A | 12/1997 | Bruna et al. |
| 5,695,476 A | 12/1997 | Harris |
| 5,697,916 A | 12/1997 | Schraga |
| 5,716,338 A | 2/1998 | Hjertman et al. |
| 5,728,074 A | 3/1998 | Castellano et al. |
| 5,772,635 A | 6/1998 | Dastur et al. |
| 5,779,677 A | 7/1998 | Frezza |
| 5,792,190 A | 8/1998 | Olson et al. |
| 5,800,397 A | 9/1998 | Wilson et al. |
| 5,805,423 A | 9/1998 | Wever et al. |
| 5,809,997 A | 9/1998 | Wolf |
| 5,814,020 A | 9/1998 | Gross |
| 5,823,346 A | 10/1998 | Weiner |

(56) References Cited

U.S. PATENT DOCUMENTS

| | | |
|---|---|---|
| 5,832,488 A | 11/1998 | Eberhardt |
| 5,837,546 A | 11/1998 | Allen et al. |
| RE35,986 E | 12/1998 | Ritson et al. |
| 5,846,089 A | 12/1998 | Weiss et al. |
| 5,848,990 A | 12/1998 | Cirelli et al. |
| 5,852,590 A | 12/1998 | de la Huerga |
| 5,853,292 A | 12/1998 | Eggert et al. |
| 5,858,001 A | 1/1999 | Tsals et al. |
| 5,865,795 A | 2/1999 | Schiff et al. |
| 5,868,711 A | 2/1999 | Kramer et al. |
| 5,868,713 A | 2/1999 | Klippenstein |
| 5,868,721 A | 2/1999 | Marinacci |
| D407,487 S | 3/1999 | Greubel et al. |
| 5,876,380 A | 3/1999 | Manganini et al. |
| 5,925,021 A | 7/1999 | Castellano et al. |
| 5,928,195 A | 7/1999 | Malamud |
| 5,941,857 A | 8/1999 | Nguyen et al. |
| 5,964,739 A | 10/1999 | Champ |
| 5,970,457 A | 10/1999 | Brant et al. |
| 5,971,953 A | 10/1999 | Bachynsky |
| 6,015,438 A | 1/2000 | Shaw |
| 6,030,363 A | 2/2000 | Kriesel |
| 6,039,713 A | 3/2000 | Botich et al. |
| 6,045,534 A | 4/2000 | Jacobsen et al. |
| 6,050,977 A | 4/2000 | Adams |
| 6,056,728 A | 5/2000 | von Schuckmann |
| 6,062,901 A | 5/2000 | Liu et al. |
| 6,063,053 A | 5/2000 | Castellano et al. |
| 6,074,213 A | 6/2000 | Hon |
| 6,077,106 A | 6/2000 | Mish |
| 6,080,130 A | 6/2000 | Castellano |
| 6,083,199 A | 7/2000 | Thorley et al. |
| 6,084,526 A | 7/2000 | Blotky et al. |
| 6,086,562 A | 7/2000 | Jacobsen et al. |
| 6,096,002 A | 8/2000 | Landau |
| 6,099,504 A | 8/2000 | Gross et al. |
| 6,102,896 A | 8/2000 | Roser |
| 6,119,684 A | 9/2000 | Nöhl et al. |
| 6,120,786 A | 9/2000 | Cheikh |
| 6,123,685 A | 9/2000 | Reynolds |
| 6,149,626 A | 11/2000 | Rachynsky et al. |
| 6,158,613 A | 12/2000 | Novosel et al. |
| 6,161,281 A | 12/2000 | Dando et al. |
| 6,165,155 A | 12/2000 | Jacobsen et al. |
| 6,179,812 B1 | 1/2001 | Botich et al. |
| 6,192,891 B1 | 2/2001 | Gravel et al. |
| 6,193,695 B1 | 2/2001 | Rippstein, Jr. |
| 6,202,642 B1 | 3/2001 | McKinnon et al. |
| 6,210,359 B1 | 4/2001 | Patel et al. |
| 6,210,369 B1 | 4/2001 | Wilmot et al. |
| 6,219,587 B1 | 4/2001 | Ahlin et al. |
| 6,221,045 B1 | 4/2001 | Duchon et al. |
| 6,221,055 B1 | 4/2001 | Shaw et al. |
| 6,223,936 B1 | 5/2001 | Jeanbourquin |
| 6,245,046 B1 | 6/2001 | Sibbitt |
| 6,258,063 B1 | 7/2001 | Haar et al. |
| 6,258,068 B1 | 7/2001 | Kirchhofer et al. |
| 6,259,654 B1 | 7/2001 | de la Huerga |
| 6,264,629 B1 | 7/2001 | Landau |
| 6,270,479 B1 | 8/2001 | Bergens et al. |
| 6,280,421 B1 | 8/2001 | Kirchhofer et al. |
| 6,312,412 B1 | 11/2001 | Saied et al. |
| 6,317,630 B1 | 11/2001 | Gross et al. |
| 6,334,070 B1 | 12/2001 | Nova et al. |
| 6,364,866 B1 | 4/2002 | Furr et al. |
| 6,371,939 B2 | 4/2002 | Bergens et al. |
| 6,383,168 B1 | 5/2002 | Landau et al. |
| 6,387,078 B1 | 5/2002 | Gillespie, III |
| 6,405,912 B2 | 6/2002 | Giannou |
| 6,406,455 B1 | 6/2002 | Willis et al. |
| 6,411,567 B1 | 6/2002 | Niemiec et al. |
| 6,413,236 B1 | 7/2002 | Van Dyke |
| 6,419,656 B1 | 7/2002 | Vetter et al. |
| 6,425,897 B2 | 7/2002 | Overes et al. |
| 6,427,684 B2 | 8/2002 | Ritsche et al. |
| 6,428,517 B1 | 8/2002 | Hochman et al. |
| 6,428,528 B2 | 8/2002 | Sadowski |
| 6,454,746 B1 | 9/2002 | Bydlon et al. |
| 6,475,181 B1 | 11/2002 | Potter et al. |
| 6,478,771 B1 | 11/2002 | Lavi et al. |
| 6,482,186 B1 | 11/2002 | Douglas et al. |
| 6,494,863 B1 | 12/2002 | Shaw et al. |
| 6,500,150 B1 | 12/2002 | Gross et al. |
| 6,514,230 B1 | 2/2003 | Munk et al. |
| 6,529,446 B1 | 3/2003 | de la Huerga |
| 6,530,900 B1 | 3/2003 | Daily et al. |
| 6,530,904 B1 | 3/2003 | Edwards et al. |
| 6,535,714 B2 | 3/2003 | Melker et al. |
| 6,540,672 B1 | 4/2003 | Simonsen et al. |
| 6,540,675 B2 | 4/2003 | Aceti et al. |
| 6,544,234 B1 | 4/2003 | Gabriel |
| 6,551,276 B1 | 4/2003 | Mann et al. |
| 6,551,298 B1 | 4/2003 | Zhang |
| 6,554,798 B1 | 4/2003 | Mann et al. |
| 6,558,320 B1 | 5/2003 | Causey, III et al. |
| 6,565,533 B1 | 5/2003 | Smith et al. |
| 6,569,123 B2 | 5/2003 | Alchas |
| 6,572,584 B1 | 6/2003 | Shaw et al. |
| 6,574,166 B2 | 6/2003 | Niemiec |
| 6,575,939 B1 | 6/2003 | Brunel |
| RE38,189 E | 7/2003 | Walker et al. |
| 6,585,685 B2 | 7/2003 | Staylor et al. |
| 6,585,698 B1 | 7/2003 | Packman et al. |
| 6,589,158 B2 | 7/2003 | Winkler |
| 6,595,956 B1 | 7/2003 | Gross et al. |
| 6,599,272 B1 | 7/2003 | Hjertman et al. |
| 6,613,010 B2 | 9/2003 | Castellano |
| 6,613,011 B2 | 9/2003 | Castellano |
| 6,616,627 B2 | 9/2003 | Willis et al. |
| 6,633,796 B1 | 10/2003 | Pool et al. |
| 6,641,566 B2 | 11/2003 | Douglas et al. |
| 6,645,171 B1 | 11/2003 | Robinson et al. |
| 6,645,181 B1 | 11/2003 | Lavi et al. |
| 6,648,850 B2 | 11/2003 | Landau |
| 6,656,150 B2 | 12/2003 | Hill et al. |
| 6,656,163 B1 | 12/2003 | Marshall et al. |
| 6,659,980 B2 | 12/2003 | Moberg et al. |
| 6,673,035 B1 | 1/2004 | Rice et al. |
| 6,676,630 B2 | 1/2004 | Landau et al. |
| 6,679,862 B2 | 1/2004 | Diaz et al. |
| 6,689,093 B2 | 2/2004 | Landau |
| 6,692,469 B1 | 2/2004 | Weekes et al. |
| 6,702,778 B2 | 3/2004 | Hill et al. |
| 6,706,019 B1 | 3/2004 | Parker et al. |
| 6,707,763 B2 | 3/2004 | Osberg et al. |
| 6,708,050 B2 | 3/2004 | Carim |
| 6,722,916 B2 | 4/2004 | Buccinna et al. |
| 6,723,077 B2 | 4/2004 | Pickup et al. |
| 6,726,657 B1 | 4/2004 | Dedig et al. |
| 6,726,661 B2 | 4/2004 | Munk et al. |
| 6,736,796 B2 | 5/2004 | Shekalim |
| 6,743,203 B1 | 6/2004 | Pickhard |
| 6,743,635 B2 | 6/2004 | Neel et al. |
| 6,749,437 B2 | 6/2004 | Chan |
| 6,752,781 B2 | 6/2004 | Landau et al. |
| 6,764,469 B2 | 7/2004 | Broselow |
| 6,767,336 B1 | 7/2004 | Kaplan |
| 6,770,052 B2 | 8/2004 | Hill et al. |
| 6,770,056 B2 | 8/2004 | Price et al. |
| 6,783,509 B1 | 8/2004 | Landau et al. |
| 6,786,875 B2 | 9/2004 | Barker et al. |
| 6,786,885 B2 | 9/2004 | Hochman et al. |
| 6,793,646 B1 | 9/2004 | Giambattista et al. |
| 6,803,856 B1 | 10/2004 | Murphy et al. |
| 6,805,686 B1 | 10/2004 | Fathallah et al. |
| 6,808,514 B2 | 10/2004 | Schneider et al. |
| 6,809,653 B1 | 10/2004 | Mann et al. |
| 6,817,986 B2 | 11/2004 | Slate et al. |
| 6,830,560 B1 | 12/2004 | Gross et al. |
| 6,839,304 B2 | 1/2005 | Niemiec et al. |
| 6,872,200 B2 | 3/2005 | Mann et al. |
| 6,875,195 B2 | 4/2005 | Choi |
| 6,883,222 B2 | 4/2005 | Landau |
| 6,923,764 B2 | 8/2005 | Aceti et al. |

(56) References Cited

U.S. PATENT DOCUMENTS

| | | |
|---|---|---|
| 6,936,029 B2 | 8/2005 | Mann et al. |
| 6,936,032 B1 | 8/2005 | Bush, Jr. et al. |
| 6,937,150 B2 | 8/2005 | Medema et al. |
| 6,942,646 B2 | 9/2005 | Langley et al. |
| 6,946,299 B2 | 9/2005 | Neel et al. |
| 6,949,082 B2 | 9/2005 | Langley et al. |
| 6,952,604 B2 | 10/2005 | DeNuzzio et al. |
| 6,953,445 B2 | 10/2005 | Wilmot et al. |
| 6,953,693 B2 | 10/2005 | Neel et al. |
| 6,958,691 B1 | 10/2005 | Anderson et al. |
| 6,959,247 B2 | 10/2005 | Neel et al. |
| 6,961,285 B2 | 11/2005 | Niemiec et al. |
| 6,964,650 B2 | 11/2005 | Alexandre et al. |
| 6,969,259 B2 | 11/2005 | Pastrick et al. |
| 6,979,316 B1 | 12/2005 | Rubin et al. |
| 6,979,326 B2 | 12/2005 | Mann et al. |
| 6,985,870 B2 | 1/2006 | Martucci et al. |
| 6,997,911 B2 | 2/2006 | Klitmose |
| 7,014,470 B2 | 3/2006 | Vann |
| 7,074,211 B1 | 7/2006 | Heiniger et al. |
| 7,104,972 B2 | 9/2006 | Moller et al. |
| 7,113,101 B2 | 9/2006 | Peterson et al. |
| 7,116,233 B2 | 10/2006 | Zhurin |
| 7,118,553 B2 | 10/2006 | Scherer |
| 7,126,879 B2 | 10/2006 | Snyder |
| 7,158,011 B2 | 1/2007 | Brue |
| 7,299,981 B2 | 11/2007 | Hickle et al. |
| 7,329,241 B2 | 2/2008 | Horvath et al. |
| 7,357,790 B2 | 4/2008 | Hommann et al. |
| 7,416,540 B2 | 8/2008 | Edwards et al. |
| 7,465,294 B1 | 12/2008 | Vladimirsky |
| 7,500,963 B2 | 3/2009 | Westbye et al. |
| 7,500,967 B2 | 3/2009 | Thorley et al. |
| 7,503,907 B1 | 3/2009 | Lesch, Jr. |
| 7,544,188 B2 | 6/2009 | Edwards et al. |
| 7,611,491 B2 | 11/2009 | Pickhard |
| 7,611,495 B1 | 11/2009 | Gianturco |
| 7,637,891 B2 | 12/2009 | Wall |
| 7,648,482 B2 | 1/2010 | Edwards et al. |
| 7,648,483 B2 | 1/2010 | Edwards et al. |
| 7,654,983 B2 | 2/2010 | De La Sema et al. |
| 7,674,246 B2 | 3/2010 | Gillespie et al. |
| 7,678,073 B2 | 3/2010 | Griffiths et al. |
| 7,686,788 B2 | 3/2010 | Freyman et al. |
| 7,708,719 B2 | 5/2010 | Wilmot et al. |
| 7,731,686 B2 | 6/2010 | Edwards et al. |
| 7,731,690 B2 | 6/2010 | Edwards et al. |
| 7,749,194 B2 | 7/2010 | Edwards et al. |
| 7,758,550 B2 | 7/2010 | Bollenbach et al. |
| 7,771,397 B1 | 8/2010 | Olson |
| 7,806,866 B2 | 10/2010 | Hommann et al. |
| 7,850,662 B2 | 12/2010 | Veasey et al. |
| 7,871,393 B2 | 1/2011 | Monroe |
| 7,901,377 B1 | 3/2011 | Harrison et al. |
| 7,901,384 B2 | 3/2011 | Kleyman et al. |
| 7,918,823 B2 | 4/2011 | Edwards et al. |
| 7,918,832 B2 | 4/2011 | Veasey et al. |
| 7,931,614 B2 | 4/2011 | Gonnelli et al. |
| 7,938,802 B2 | 5/2011 | Bicknell et al. |
| 7,938,808 B2 | 5/2011 | Pessin |
| 7,947,017 B2 | 5/2011 | Edwards et al. |
| 8,016,788 B2 | 9/2011 | Edwards et al. |
| 8,021,335 B2 | 9/2011 | Lesch, Jr. |
| 8,105,281 B2 | 1/2012 | Edwards et al. |
| 8,105,293 B2 | 1/2012 | Pickhard |
| 8,123,719 B2 | 2/2012 | Edwards et al. |
| 8,162,886 B2 | 4/2012 | Sadowski et al. |
| 8,172,082 B2 | 5/2012 | Edwards et al. |
| 8,172,790 B2 | 5/2012 | Hunter et al. |
| 8,177,749 B2 | 5/2012 | Slate et al. |
| 8,206,360 B2 | 6/2012 | Edwards et al. |
| 8,221,347 B2 | 7/2012 | Toles et al. |
| 8,231,573 B2 | 7/2012 | Edwards et al. |
| 8,251,947 B2 | 8/2012 | Kramer et al. |
| 8,276,583 B2 | 10/2012 | Farieta et al. |
| 8,313,466 B2 | 11/2012 | Edwards et al. |
| 8,317,756 B2 | 11/2012 | Krumme et al. |
| 8,361,029 B2 | 1/2013 | Edwards et al. |
| 8,409,141 B2 | 4/2013 | Johansen et al. |
| 8,425,462 B2 | 4/2013 | Edwards et al. |
| 8,574,214 B2 | 11/2013 | Kühn et al. |
| 8,608,698 B2 | 12/2013 | Edwards et al. |
| 8,613,720 B2 | 12/2013 | Bendek et al. |
| 8,632,504 B2 | 1/2014 | Young |
| 8,647,306 B2 | 2/2014 | Schwirtz et al. |
| 8,662,349 B2 | 3/2014 | Genosar et al. |
| 8,663,188 B2 | 3/2014 | Genosar et al. |
| 8,670,865 B2 | 3/2014 | Coe |
| 8,684,968 B2 | 4/2014 | Genosar |
| 8,690,827 B2 | 4/2014 | Edwards et al. |
| 8,708,968 B2 | 4/2014 | Julian et al. |
| 8,728,042 B2 | 5/2014 | Pickhard |
| 8,734,392 B2 | 5/2014 | Stadelhofer |
| 8,734,394 B2 | 5/2014 | Adams et al. |
| 8,747,357 B2 | 6/2014 | Stamp et al. |
| 8,751,039 B1 | 6/2014 | Macoviak et al. |
| 8,789,748 B2 | 7/2014 | Waugh et al. |
| 8,807,131 B1 | 8/2014 | Tunnell et al. |
| 8,849,449 B2 | 9/2014 | Waugh et al. |
| 8,900,197 B2 | 12/2014 | Crow |
| 8,910,299 B2 | 12/2014 | Michalske |
| 8,920,377 B2 | 12/2014 | Edwards et al. |
| 8,922,367 B2 | 12/2014 | Denny et al. |
| 8,939,959 B2 | 1/2015 | Baney et al. |
| 8,945,048 B2 | 2/2015 | Thorley et al. |
| 8,961,455 B2 | 2/2015 | Holmqvist et al. |
| 8,986,242 B2 | 3/2015 | Auld et al. |
| 8,992,477 B2 | 3/2015 | Raday et al. |
| 9,022,980 B2 | 5/2015 | Edwards et al. |
| 9,035,765 B2 | 5/2015 | Engelhard et al. |
| 9,044,549 B2 | 6/2015 | Niklasson |
| 9,053,530 B2 | 6/2015 | Vik et al. |
| 9,056,170 B2 | 6/2015 | Edwards et al. |
| 9,084,849 B2 | 7/2015 | Edwards et al. |
| 9,149,579 B2 | 10/2015 | Edwards et al. |
| 9,173,999 B2 | 11/2015 | Edwards et al. |
| 9,289,563 B2 | 3/2016 | Pickhard et al. |
| 9,345,831 B2 | 5/2016 | Raday et al. |
| 9,352,099 B2 | 5/2016 | Roberts et al. |
| 9,586,010 B2 | 3/2017 | Mesa et al. |
| 9,586,011 B2 | 3/2017 | Roberts et al. |
| 9,820,913 B2 | 11/2017 | Genosar |
| 9,821,113 B2 | 11/2017 | Cole et al. |
| 9,925,333 B2 | 3/2018 | Hooven et al. |
| 10,028,886 B2 | 7/2018 | Genosar |
| 10,071,203 B2 | 9/2018 | Edwards et al. |
| 10,105,499 B2 | 10/2018 | Schwirtz et al. |
| 10,251,999 B2 | 4/2019 | Cole et al. |
| 10,363,374 B2 | 7/2019 | Nazzaro et al. |
| 10,507,285 B2 | 12/2019 | Dunki-Jacobs et al. |
| 10,695,485 B2 | 6/2020 | Nazzaro |
| 10,716,901 B2 | 7/2020 | Genosar |
| 10,729,842 B2 | 8/2020 | Hooven et al. |
| 10,864,139 B2 | 12/2020 | Genosar |
| 10,960,134 B2 | 3/2021 | Salter et al. |
| 10,981,713 B2 | 4/2021 | Genosar |
| 11,001,435 B2 | 5/2021 | Genosar |
| 11,167,087 B2 | 11/2021 | Meyers et al. |
| 11,185,634 B2 | 11/2021 | Genosar |
| 11,638,794 B2 | 5/2023 | Genosar |
| 11,648,180 B2 | 5/2023 | Genosar |
| 2001/0005781 A1 | 6/2001 | Bergens et al. |
| 2001/0037087 A1 | 11/2001 | Knauer |
| 2002/0016567 A1 | 2/2002 | Hochman et al. |
| 2002/0042596 A1 | 4/2002 | Hartlaub et al. |
| 2002/0055711 A1 | 5/2002 | Lavi et al. |
| 2002/0076679 A1 | 6/2002 | Aman |
| 2002/0079326 A1 | 6/2002 | Fuchs |
| 2002/0095120 A1 | 7/2002 | Larsen et al. |
| 2002/0096543 A1 | 7/2002 | Juselius |
| 2003/0028145 A1 | 2/2003 | Duchon et al. |
| 2003/0040717 A1 | 2/2003 | Saulenas et al. |
| 2003/0105430 A1 | 6/2003 | Lavi et al. |
| 2003/0106824 A1 | 6/2003 | Wilmot et al. |

(56) References Cited

U.S. PATENT DOCUMENTS

| | | |
|---|---|---|
| 2003/0120222 A1 | 6/2003 | Vaillancourt |
| 2003/0132128 A1 | 7/2003 | Mazur |
| 2003/0233070 A1 | 12/2003 | De La Serna et al. |
| 2004/0015125 A1 | 1/2004 | Alexandre et al. |
| 2004/0019326 A1 | 1/2004 | Gilbert et al. |
| 2004/0024361 A1 | 2/2004 | Fago et al. |
| 2004/0024367 A1 | 2/2004 | Gilbert |
| 2004/0039336 A1 | 2/2004 | Amark et al. |
| 2004/0039337 A1 | 2/2004 | Letzing |
| 2004/0039368 A1 | 2/2004 | Reilly et al. |
| 2004/0054327 A1 | 3/2004 | Gillespie, III |
| 2004/0073169 A1 | 4/2004 | Amisar et al. |
| 2004/0092874 A1 | 5/2004 | Mazidji |
| 2004/0094146 A1 | 5/2004 | Schiewe et al. |
| 2004/0116854 A1 | 6/2004 | Abulhaj et al. |
| 2004/0138611 A1 | 7/2004 | Griffiths et al. |
| 2004/0143298 A1 | 7/2004 | Nova et al. |
| 2004/0159364 A1 | 8/2004 | Landau et al. |
| 2004/0210199 A1 | 10/2004 | Atterbury et al. |
| 2004/0220524 A1 | 11/2004 | Sadowski et al. |
| 2004/0249358 A1 | 12/2004 | McWethy et al. |
| 2004/0267204 A1 | 12/2004 | Brustowicz |
| 2005/0027255 A1 | 2/2005 | Lavi et al. |
| 2005/0033234 A1 | 2/2005 | Sadowski et al. |
| 2005/0033386 A1 | 2/2005 | Osborn et al. |
| 2005/0049561 A1 | 3/2005 | Hommann et al. |
| 2005/0062603 A1 | 3/2005 | Fuerst et al. |
| 2005/0070848 A1 | 3/2005 | Kim |
| 2005/0089517 A1* | 4/2005 | Shames .............. A61P 11/00 |
| 2005/0090781 A1 | 4/2005 | Baba et al. |
| 2005/0090782 A1 | 4/2005 | Marshall et al. |
| 2005/0101912 A1 | 5/2005 | Faust et al. |
| 2005/0134433 A1 | 6/2005 | Sweeney, II |
| 2005/0148931 A1 | 7/2005 | Juhasz |
| 2005/0148945 A1 | 7/2005 | Chen |
| 2005/0159705 A1 | 7/2005 | Crawford et al. |
| 2005/0165360 A1 | 7/2005 | Stamp |
| 2005/0168337 A1 | 8/2005 | Mahoney |
| 2005/0171477 A1 | 8/2005 | Rubin et al. |
| 2005/0182358 A1 | 8/2005 | Veit et al. |
| 2005/0183982 A1 | 8/2005 | Giewercer |
| 2005/0192530 A1 | 9/2005 | Castellano |
| 2005/0192534 A1 | 9/2005 | Wolbring et al. |
| 2005/0197654 A1 | 9/2005 | Edman et al. |
| 2005/0203466 A1 | 9/2005 | Hommann et al. |
| 2005/0222539 A1 | 10/2005 | Gonzales et al. |
| 2005/0261742 A1 | 11/2005 | Nova et al. |
| 2005/0267403 A1 | 12/2005 | Landau et al. |
| 2005/0273059 A1 | 12/2005 | Mernoe et al. |
| 2005/0277891 A1 | 12/2005 | Sibbitt |
| 2006/0030819 A1 | 2/2006 | Young et al. |
| 2006/0053036 A1 | 3/2006 | Coffman et al. |
| 2006/0058848 A1 | 3/2006 | Piraino et al. |
| 2006/0111666 A1 | 5/2006 | Hommann et al. |
| 2006/0111671 A1 | 5/2006 | Klippenstein |
| 2006/0116639 A1 | 6/2006 | Russell |
| 2006/0129089 A1 | 6/2006 | Stamp |
| 2006/0129090 A1 | 6/2006 | Moberg et al. |
| 2006/0173408 A1 | 8/2006 | Wyrick |
| 2006/0184133 A1 | 8/2006 | Pessin |
| 2006/0189938 A1 | 8/2006 | Hommann et al. |
| 2006/0200077 A1 | 9/2006 | Righi et al. |
| 2006/0223027 A1 | 10/2006 | Smith et al. |
| 2006/0235354 A1 | 10/2006 | Kaal et al. |
| 2006/0247578 A1 | 11/2006 | Arguendas et al. |
| 2006/0247579 A1 | 11/2006 | Friedman |
| 2006/0265186 A1 | 11/2006 | Holland et al. |
| 2007/0008113 A1 | 1/2007 | Spoonhower et al. |
| 2007/0021720 A1 | 1/2007 | Guilllermo |
| 2007/0074722 A1 | 4/2007 | Giroux et al. |
| 2007/0079777 A1 | 4/2007 | Hurlstone et al. |
| 2007/0088268 A1 | 4/2007 | Edwards et al. |
| 2007/0100288 A1 | 5/2007 | Bozeman et al. |
| 2007/0129686 A1 | 6/2007 | Daily et al. |
| 2007/0135767 A1 | 6/2007 | Gillespie, III et al. |
| 2007/0173772 A1 | 7/2007 | Liversidge |
| 2007/0184847 A1 | 8/2007 | Hansen et al. |
| 2007/0210147 A1 | 9/2007 | Morrone et al. |
| 2007/0213598 A1 | 9/2007 | Howard et al. |
| 2007/0233001 A1 | 10/2007 | Burroughs et al. |
| 2007/0265568 A1 | 11/2007 | Tsals et al. |
| 2007/0276320 A1 | 11/2007 | Wall et al. |
| 2007/0293826 A1 | 12/2007 | Wall et al. |
| 2008/0058719 A1* | 3/2008 | Edwards et al. ......... A61M 5/19 |
| 2008/0111685 A1 | 5/2008 | Olson et al. |
| 2008/0147006 A1 | 6/2008 | Brunnberg et al. |
| 2008/0154200 A1 | 6/2008 | Lesch |
| 2008/0171995 A1 | 7/2008 | Vitullo et al. |
| 2008/0188798 A1 | 8/2008 | Weber |
| 2008/0208114 A1 | 8/2008 | Landau et al. |
| 2008/0228143 A1 | 9/2008 | Stamp |
| 2008/0255513 A1 | 10/2008 | Kaal et al. |
| 2008/0262443 A1 | 10/2008 | Hommann et al. |
| 2009/0093759 A1 | 4/2009 | Judd et al. |
| 2009/0192486 A1 | 7/2009 | Wilmot et al. |
| 2009/0209939 A1 | 8/2009 | Verespej et al. |
| 2009/0221962 A1 | 9/2009 | Kaal et al. |
| 2009/0240200 A1 | 9/2009 | Heneveld et al. |
| 2009/0299279 A1 | 12/2009 | Richter |
| 2009/0318361 A1 | 12/2009 | Noera et al. |
| 2010/0010454 A1 | 1/2010 | Marshall et al. |
| 2010/0049125 A1 | 2/2010 | James et al. |
| 2010/0137808 A1 | 6/2010 | Wilmot et al. |
| 2010/0152659 A1 | 6/2010 | Streit et al. |
| 2010/0160894 A1 | 6/2010 | Julian et al. |
| 2010/0185148 A1 | 7/2010 | Gillespie, III et al. |
| 2010/0185178 A1 | 7/2010 | Sharp et al. |
| 2010/0280460 A1 | 11/2010 | Markussen |
| 2011/0046565 A1 | 2/2011 | Radmer et al. |
| 2011/0060274 A1 | 3/2011 | Kuhn |
| 2011/0092954 A1 | 4/2011 | Jennings |
| 2011/0098655 A1 | 4/2011 | Jennings et al. |
| 2011/0144594 A1 | 6/2011 | Sund et al. |
| 2011/0201999 A1 | 8/2011 | Cronenberg |
| 2011/0202011 A1 | 8/2011 | Wozencroft |
| 2011/0213314 A1 | 9/2011 | Guillermo |
| 2011/0270220 A1 | 11/2011 | Genosar |
| 2011/0319864 A1 | 12/2011 | Beller et al. |
| 2012/0046613 A1 | 2/2012 | Plumptre |
| 2012/0056019 A1 | 3/2012 | Renz et al. |
| 2012/0101446 A1 | 4/2012 | Heald |
| 2012/0101475 A1 | 4/2012 | Wilmot et al. |
| 2012/0103328 A1 | 5/2012 | Smith et al. |
| 2012/0103462 A1 | 5/2012 | Levy |
| 2012/0107783 A1 | 5/2012 | Julian et al. |
| 2012/0116319 A1 | 5/2012 | Grunhut |
| 2012/0125951 A1 | 5/2012 | Leak et al. |
| 2012/0130318 A1 | 5/2012 | Young |
| 2012/0143144 A1 | 6/2012 | Young |
| 2012/0172804 A1 | 7/2012 | Plumptre |
| 2012/0172817 A1 | 7/2012 | Bruggemann et al. |
| 2012/0191049 A1 | 7/2012 | Harms et al. |
| 2012/0209200 A1 | 8/2012 | Jones et al. |
| 2012/0233834 A1 | 9/2012 | Szechinski et al. |
| 2012/0238960 A1 | 9/2012 | Smith et al. |
| 2012/0253288 A1 | 10/2012 | Dasbach et al. |
| 2012/0259285 A1 | 10/2012 | Schabbach et al. |
| 2012/0268741 A1 | 10/2012 | Pommerau et al. |
| 2012/0271243 A1 | 10/2012 | Plumptre et al. |
| 2012/0283648 A1 | 11/2012 | Veasey et al. |
| 2012/0283651 A1 | 11/2012 | Veasey et al. |
| 2012/0283662 A1 | 11/2012 | MacDonald et al. |
| 2012/0289906 A1 | 11/2012 | Jones et al. |
| 2012/0289929 A1 | 11/2012 | Boyd et al. |
| 2012/0310168 A1 | 12/2012 | Plumptre et al. |
| 2012/0310206 A1 | 12/2012 | Kouyoumjian et al. |
| 2012/0323186 A1 | 12/2012 | Karlsen et al. |
| 2012/0325865 A1 | 12/2012 | Forstreuter et al. |
| 2012/0330244 A1 | 12/2012 | Helmer et al. |
| 2013/0060231 A1 | 3/2013 | Adlon et al. |
| 2013/0060232 A1 | 3/2013 | Adlon et al. |
| 2013/0079718 A1 | 3/2013 | Shang et al. |
| 2013/0079725 A1 | 3/2013 | Shang et al. |
| 2013/0096512 A1 | 4/2013 | Ekman et al. |

(56) References Cited

U.S. PATENT DOCUMENTS

| | | |
|---|---|---|
| 2013/0110050 A1 | 5/2013 | Boyd et al. |
| 2013/0131602 A1 | 5/2013 | Kemp et al. |
| 2013/0138049 A1 | 5/2013 | Kemp et al. |
| 2013/0150800 A1 | 6/2013 | Kemp et al. |
| 2013/0172822 A1 | 7/2013 | Ekman et al. |
| 2013/0204199 A1 | 8/2013 | Hourmand et al. |
| 2013/0218074 A1 | 8/2013 | Holmqvist et al. |
| 2013/0226084 A1 | 8/2013 | Samandi et al. |
| 2013/0236872 A1 | 9/2013 | Laurusonis et al. |
| 2013/0245562 A1 | 9/2013 | Kouyoumjian et al. |
| 2013/0266919 A1 | 10/2013 | Baker et al. |
| 2013/0274662 A1 | 10/2013 | Hourmand et al. |
| 2013/0274707 A1 | 10/2013 | Wilmot et al. |
| 2013/0296796 A1 | 11/2013 | Hourmand et al. |
| 2013/0317427 A1 | 11/2013 | Brereton et al. |
| 2013/0317477 A1 | 11/2013 | Edwards et al. |
| 2013/0317480 A1 | 11/2013 | Reber et al. |
| 2014/0008366 A1 | 1/2014 | Genosar |
| 2014/0025014 A1 | 1/2014 | Radmer et al. |
| 2014/0031760 A1 | 1/2014 | Mercer et al. |
| 2014/0046259 A1 | 2/2014 | Reber et al. |
| 2014/0081234 A1 | 3/2014 | Eggert et al. |
| 2014/0103075 A1 | 4/2014 | Bennison et al. |
| 2014/0114250 A1 | 4/2014 | DeSalvo et al. |
| 2014/0128840 A1 | 5/2014 | Rao et al. |
| 2014/0135705 A1 | 5/2014 | Hourmand et al. |
| 2014/0257185 A1 | 9/2014 | Bechmann et al. |
| 2014/0257241 A1 | 9/2014 | Sutkin et al. |
| 2015/0051538 A1 | 2/2015 | Hata et al. |
| 2015/0144793 A1 | 5/2015 | Whalley et al. |
| 2015/0165129 A1* | 6/2015 | Row et al. .......... A61M 5/2033 |
| 2015/0174325 A1 | 6/2015 | Young et al. |
| 2015/0238695 A1 | 8/2015 | Edwards et al. |
| 2015/0283323 A1 | 10/2015 | Young et al. |
| 2016/0015907 A1 | 1/2016 | Edwards et al. |
| 2016/0045670 A1 | 2/2016 | Edwards et al. |
| 2016/0074584 A1 | 3/2016 | Carmel et al. |
| 2016/0114110 A1 | 4/2016 | Kerns |
| 2016/0184521 A1 | 6/2016 | Edwards et al. |
| 2016/0193412 A1 | 7/2016 | Cereda et al. |
| 2016/0250414 A1 | 9/2016 | Edwards et al. |
| 2016/0354556 A1 | 12/2016 | Zucker et al. |
| 2016/0361496 A1 | 12/2016 | Guillermo et al. |
| 2017/0246393 A1 | 8/2017 | Genosar |
| 2017/0290982 A1 | 10/2017 | Edwards et al. |
| 2018/0008774 A1 | 1/2018 | Edwards et al. |
| 2018/0104413 A1* | 4/2018 | Mcloughlin et al. ... A61M 5/20 |
| 2018/0117251 A1 | 5/2018 | Rioux et al. |
| 2018/0200451 A1 | 7/2018 | Shekalim |
| 2018/0204636 A1 | 7/2018 | Edwards et al. |
| 2018/0207369 A1 | 7/2018 | Converse et al. |
| 2018/0235840 A1 | 8/2018 | Genosar |
| 2018/0289901 A1 | 10/2018 | Bøggild-damkvist et al. |
| 2018/0296760 A1 | 10/2018 | Csenar et al. |
| 2018/0304017 A1 | 10/2018 | Edwards et al. |
| 2018/0304018 A1 | 10/2018 | Blondino et al. |
| 2019/0009025 A1 | 1/2019 | Chakrabarti et al. |
| 2019/0009027 A1 | 1/2019 | Edwards et al. |
| 2019/0151548 A1 | 5/2019 | Edwards et al. |
| 2019/0175837 A1 | 6/2019 | Edwards et al. |
| 2019/0275253 A1 | 9/2019 | Edwards et al. |
| 2019/0282763 A1 | 9/2019 | Edwards et al. |
| 2020/0197612 A1 | 6/2020 | Edwards et al. |
| 2020/0214625 A1 | 7/2020 | Hooven et al. |
| 2020/0316290 A1 | 10/2020 | Bourelle et al. |
| 2020/0345937 A1 | 11/2020 | Genosar |
| 2020/0360231 A1 | 11/2020 | Genosar |
| 2021/0138152 A1 | 5/2021 | Edwards et al. |
| 2021/0154098 A1 | 5/2021 | Genosar |
| 2021/0292073 A1 | 9/2021 | Genosar |
| 2021/0402097 A1 | 12/2021 | Genosar et al. |
| 2022/0054753 A1 | 2/2022 | Meyers et al. |
| 2022/0071844 A1 | 3/2022 | Genosar |
| 2022/0088310 A1 | 3/2022 | Genosar |
| 2023/0076855 A1 | 3/2023 | Edwards et al. |
| 2023/0099753 A1 | 3/2023 | Genosar |
| 2023/0210526 A1 | 7/2023 | Genosar |
| 2024/0399063 A1 | 12/2024 | Blondino et al. |

FOREIGN PATENT DOCUMENTS

| | | |
|---|---|---|
| EP | 1462134 A1 | 9/2004 |
| EP | 1518575 A1 | 3/2005 |
| EP | 1712178 A2 | 10/2006 |
| FR | 1514210 | 2/1968 |
| FR | 2506161 | 11/1982 |
| FR | 2509615 | 1/1983 |
| FR | 2700959 | 2/1993 |
| GB | 2490807 | 11/2012 |
| JP | 2004-344639 | 12/2004 |
| MX | PA04009276 | 1/2005 |
| WO | WO 91/04760 | 4/1991 |
| WO | WO 93/02720 | 2/1993 |
| WO | WO 93/23096 | 11/1993 |
| WO | WO 95/13838 | 5/1995 |
| WO | WO 95/26009 | 9/1995 |
| WO | WO 95/35126 | 12/1995 |
| WO | WO 98/52632 | 11/1998 |
| WO | WO 99/10031 | 3/1999 |
| WO | WO 2001/024690 | 4/2001 |
| WO | WO 2001/026020 | 4/2001 |
| WO | WO 2001/041849 | 6/2001 |
| WO | WO 2001/088828 | 11/2001 |
| WO | WO 2001/093926 | 12/2001 |
| WO | WO 2002/083205 | 10/2002 |
| WO | WO 2002/083212 | 10/2002 |
| WO | WO 2003/011378 | 2/2003 |
| WO | WO 2003/013632 | 2/2003 |
| WO | WO 2003/095001 | 11/2003 |
| WO | WO 2003/097133 | 11/2003 |
| WO | WO 2004/047890 | 6/2004 |
| WO | WO 2004/047891 | 6/2004 |
| WO | WO 2004/047892 | 6/2004 |
| WO | WO 2004/047893 | 6/2004 |
| WO | WO 2004/054644 | 7/2004 |
| WO | WO 2005/050526 | 6/2005 |
| WO | WO 2005/070481 | 8/2005 |
| WO | WO 2005/077441 | 8/2005 |
| WO | WO 2005/039673 | 5/2006 |
| WO | WO 2006/058426 | 6/2006 |
| WO | WO 2006/109778 | 10/2006 |
| WO | WO 2006/125692 | 11/2006 |
| WO | WO 2008/005315 | 1/2008 |
| WO | WO 2008/148864 | 12/2008 |
| WO | WO 2009/095735 | 8/2009 |
| WO | WO 2010/033806 | 3/2010 |
| WO | WO 2011/157930 | 12/2011 |
| WO | WO 2013/044172 | 3/2013 |
| WO | WO 2015/055588 A1 | 4/2015 |
| WO | WO 2016/160341 A1 | 10/2016 |
| WO | WO 2017/033193 A2 | 3/2017 |
| WO | WO 2017/034618 A1 | 3/2017 |
| WO | WO 2017/210011 | 12/2017 |
| WO | WO 2018/078121 | 5/2018 |
| WO | WO 2020/140040 | 7/2020 |
| WO | WO 2021/012035 A1 | 1/2021 |
| WO | WO 2023/009742 | 2/2023 |
| WO | WO 2023/019209 | 2/2023 |
| WO | WO 2023/034826 | 3/2023 |
| WO | WO 2023/070096 | 4/2023 |

OTHER PUBLICATIONS

"Merck Serono Launches easypod(R), First Electronic Growth Hormone Injection Device," Jan. 30, 2007 [online] [retrieved on Feb. 5, 2007] Retrieved from the Internet <URL: http://www.biz.yahoo.com/prnews/070130/ukm028.html?.v=8>, 3 pages.

Examination Report for British Patent Application No. GB 0708523.6, mailed Dec. 8, 2008.

Office Action for JP2007-543005, mailed Feb. 1, 2010.

Examination Report for British Patent Application No. GB 0822532.8, mailed Jan. 21, 2009.

(56) References Cited

OTHER PUBLICATIONS

Examination Report for British Patent Application No. GB 0822532.8, mailed May 21, 2009.
Office Action for U.S. Appl. No. 11/562,061, mailed Feb. 3, 2009.
Office Action for U.S. Appl. No. 11/758,393, mailed May 13, 2009.
Search Report and Written Opinion for International Patent Application No. PCT/US07/84891 mailed Sep. 15, 2008, 7 pages.
Office Action for U.S. Appl. No. 12/138,987, mailed Oct. 5, 2009.
Office Action for U.S. Appl. No. 13/053,451, mailed Nov. 15, 2012.
Office Action for U.S. Appl. No. 13/090,392, mailed Feb. 29, 2012.
International Search Report and Written Opinion for International Patent Application No. PCT/US06/03415, mailed Jul. 13, 2006, 10 pages.
Office Action for U.S. Appl. No. 12/119,016, mailed Nov. 3, 2011.
Examination Report for Australian Patent Application No. 2012211307, mailed Mar. 3, 2014, 3 pages.
Supplementary Search Report for European Patent Application No. 12740010.9, mailed Aug. 5, 2014.
International Search Report and Written Opinion for International Application No. PCT/US2012/022675, mailed May 25, 2012.
Third Party Observations filed in European Patent Application No. 07864490.3, mailed Aug. 22, 2016.
International Search Report and Written Opinion for International Application No. PCT/US2016/40333 mailed Dec. 12, 2016.
Office Action for Canadian Patent Application No. 2,825,600, mailed Feb. 1, 2018.
Extended European Search Report for European Patent Application No. 16818770.6, mailed Jul. 3, 2019.
Office Action for U.S. Appl. No. 15/738,008, mailed Aug. 22, 2019.
Office Action for CN Application No. 201680038520.9, mailed Mar. 2, 2020.
International Search Report and Written Opinion for PCT/US19/68750, mailed Mar. 20, 2020.
Office Action for JP Application No. 2017-560704, mailed May 13, 2020.
Invitation to Pay Additional Fees for PCT Application No. PCT/US2020/045467, mailed Oct. 14, 2020.
Office Action for AU Application No. 2016287571, mailed Nov. 5, 2020.
International Search Report and Written Opinion for PCT Application No. PCT/US2020/045467, mailed Jan. 4, 2021.
Office Action for U.S. Appl. No. 17/269,510, mailed Apr. 30, 2021.
Office Action for IN Application No. 201718041270, mailed May 24, 2021.
Extended Search Report for European Application No. 19906398.3, dated Aug. 5, 2022.
Examination Report for European Application No. 19906398.3, dated Oct. 28, 2024.

* cited by examiner

DEVICES AND METHODS FOR DELIVERY OF SUBSTANCES WITHIN A PREFILLED SYRINGE

CROSS-REFERENCE TO RELATED APPLICATIONS

This application is a U.S. national stage filing under 35 U.S.C. § 371 of International Application No. PCT/US2019/068750, entitled "Devices and Methods for Delivery of Substances within a Prefilled Syringe," filed Dec. 27, 2019, which claims benefit of priority to U.S. Provisional Application No. 62/786,409, entitled "Devices and Methods for Delivery of Substances within a Prefilled Syringe," filed Dec. 29, 2018, and is related to International Patent Publication No. WO2017/004345, entitled "Auto-Injectors for Administration of a Medicament Within a Prefilled Syringe," filed Jun. 30, 2016 ("the '4345 PCT") and International Patent Publication No. WO2018/136413, entitled "Medicament Delivery Devices with Wireless Connectivity and Event Detection," filed Jan. 16, 2018 ("the '6413 PCT"), each of which is incorporated herein by reference in its entirety.

BACKGROUND

The embodiments described herein relate to medicament delivery devices, pharmaceutical compositions, and drug products. More particularly, the embodiments described herein relate to medicament delivery devices for delivery of medicaments contained within a prefilled syringe.

Known prefilled syringes are commonly used to contain and inject medicaments. Known prefilled syringes include a syringe body, often constructed from glass, within which a medicament is contained. The distal end portion of some known prefilled syringes includes a staked needle (i.e., a needle that is permanently coupled to the syringe body during manufacture), the end of which is disposed within a needle cover to maintain the sterility of the needle prior to use. Other known prefilled syringes include a Luer fitting or adapted such that the distal end portion of the syringe body can be coupled to a needle. The proximal end portion of the syringe body of known prefilled syringes includes a plunger (usually constructed from an elastomer) that defines a portion of the container closure, and that can be moved within the syringe body to inject the medicament. The proximal end portion also includes a flange to allow the user to grasp the syringe body and manually apply a force to a piston to move the plunger, thereby causing injection of the medicament.

Although prefilled syringes can be cost effective devices for storing and delivering medicaments, known methods for using prefilled syringes include manually inserting the needle into the body followed by manually applying the injection force. Moreover, upon completion of the injection, known methods include covering the needle to avoid needle sticks. Thus, known prefilled syringes are often used by healthcare professionals that are trained in such procedures. To facilitate the self-administration of medicaments contained in prefilled syringes, some known autoinjectors have been adapted to contain prefilled syringes. Such known devices include a source of stored energy for inserting the needle and/or injecting the medicament.

Known autoinjectors, however, are often designed for a medicament container having a specific size and/or shape, and are therefore often not configured to receive known prefilled syringes. For example, using a prefilled syringe within a known autoinjector can often result in high forces being applied to the flange of the syringe body during the insertion operation, which can lead to breakage of the syringe flange or body. Moreover, because many known prefilled syringes include a staked needle that is in fluid communication with the medicament, applying a force to the plunger during storage and/or during an insertion operation is undesirable. For example, the application of a force against the plunger during storage, which can result, for example, when a spring-loaded member is placed in contact with the plunger, can cause in leakage of the medicament. As another example, the application of a force against the plunger during a needle insertion event can result in the injection of the medicament before the needle is inserted to the desired location. Similarly stated, some known auto-injectors are not configured to control the force applied to the plunger within the syringe body during storage and/or needle insertion.

Known autoinjectors configured to incorporate a prefilled syringe often include a spring-based actuation system that moves a piston rod to insert the needle and inject the medicament. The size (e.g., length) of such known systems, however, can be larger than desired because of the need to incorporate the piston rod.

Moreover, known medicaments or therapeutic substances are formulated to include high molecular weight compounds, compounds with complex molecular structures, living cells, and/or biologics. Such medicaments often have a very high viscosity (e.g., greater than about 100 centipoise at room temperature), which must be accommodated by the delivery system. Accordingly, many known auto-injectors that accommodate a prefilled syringe may not be able to provide sufficient force and/or develop the desired flow rate for effective delivery of such higher viscosity substances.

Additionally, known prefilled syringes are often filled with a predetermined volume of the medicament (e.g., sufficient for a 1 mL delivered dose). Some therapeutic regimens, however, now require higher delivered volumes (e.g., 2 mL or more). Thus, to accommodate the standard fill volumes available, known methods and devices for delivering higher volumes can include multiple delivery events (e.g., injections) or infusions (either in a clinic or via an on-body pump), which are often undesirable for patients.

Thus, a need exists for improved methods and devices for delivering medicaments contained within a prefilled syringe.

SUMMARY

Medicament delivery devices for administration of medicaments contained within a prefilled syringe are described herein. In some embodiments, an apparatus includes a housing, a carrier, a medicament container, and a flexible member. A side wall of the housing defines an opening configured to selectively place a gas chamber defined by the housing in fluid communication with an exterior volume. The carrier is disposed within the housing and has a proximal surface that defines a portion of a boundary of the gas chamber. The medicament container is coupled to the carrier and has a distal end portion configured to be coupled to a delivery member. The medicament container containing a medicament and includes an elastomeric member that seals the medicament within the medicament container. A distal end portion of the flexible member is coupled to the elastomeric member. A proximal end portion of the flexible member is coupled to a valve member. The flexible member is configured to transition from a collapsed configuration to an expanded configuration when the elastomeric member moves within the medicament container. The flexible member is configured to exert a release force on the valve member to move the valve member relative to the opening when the flexible member transitions from the collapsed configuration to the expanded configuration to place the gas chamber in fluid communication with the exterior volume.

DETAILED DESCRIPTION

Figure 1:
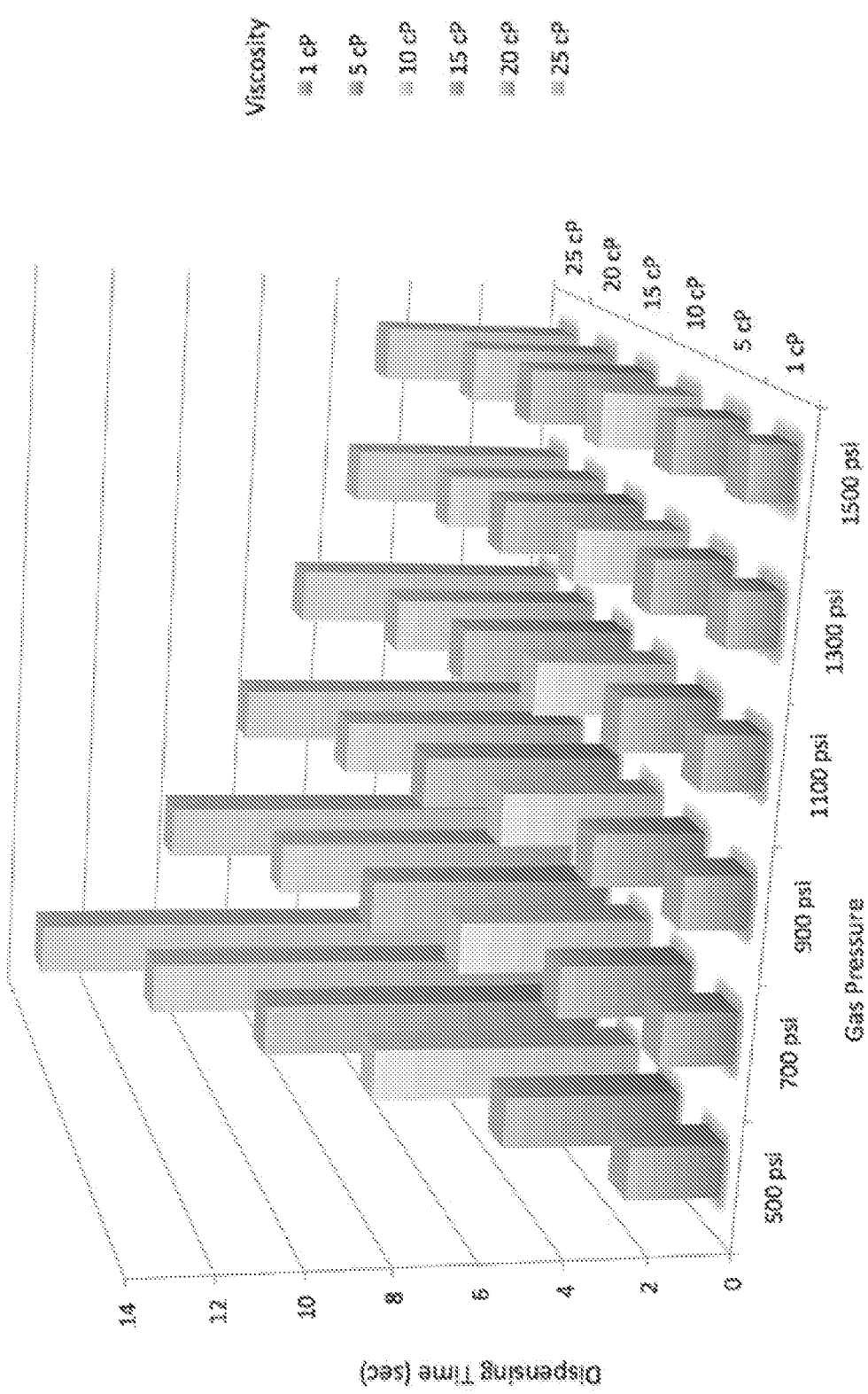
FIG. 1 is a chart showing the time for delivery of 1 mL of a substance via a medicament delivery device according to an embodiment, as a function of the gas pressure and viscosity.
Figure 2:
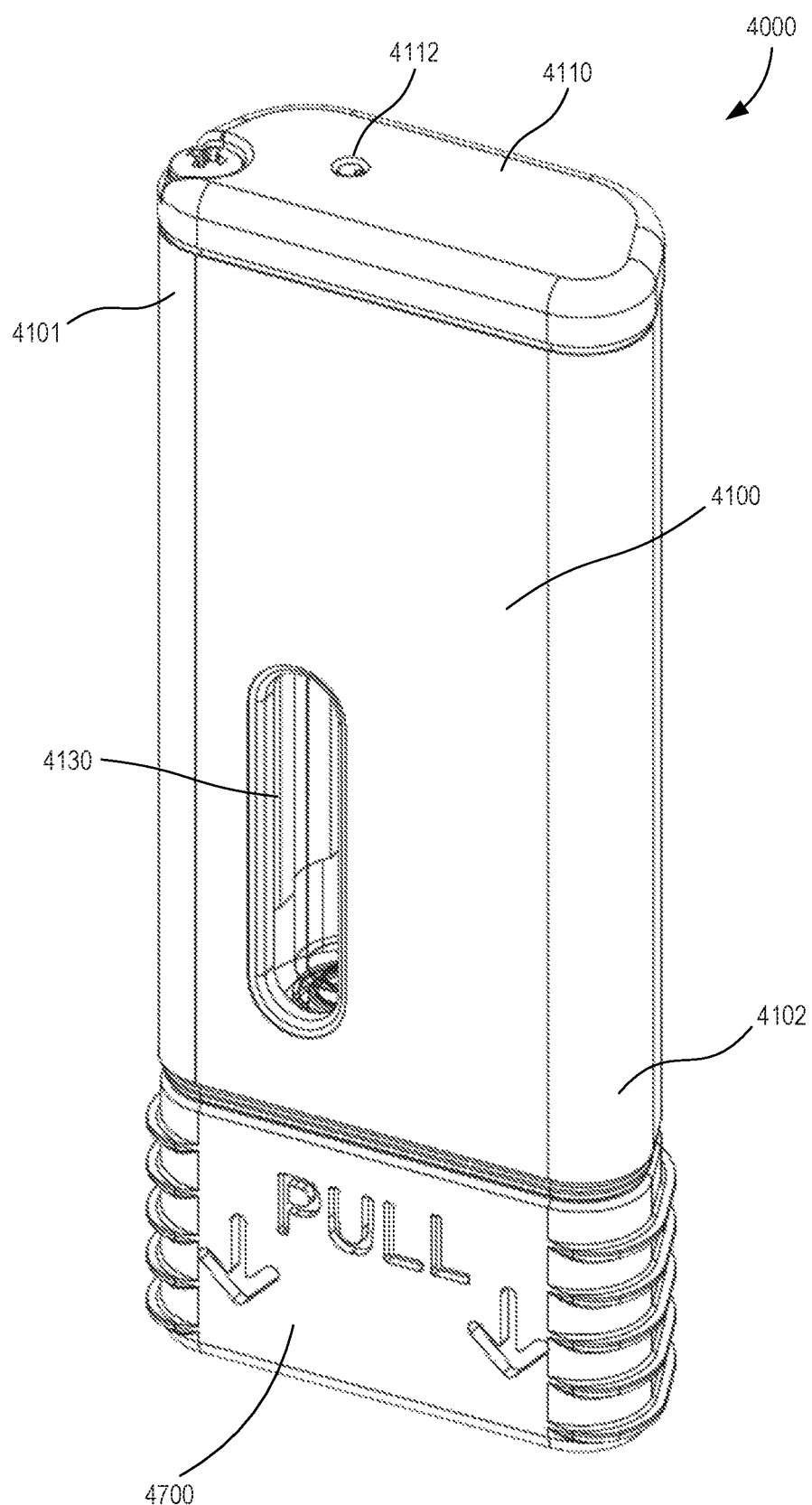
FIGS. 2 and 3 are perspective front and rear views, respectively, of a medical injector according to an embodiment, in a first configuration.
Figure 3:
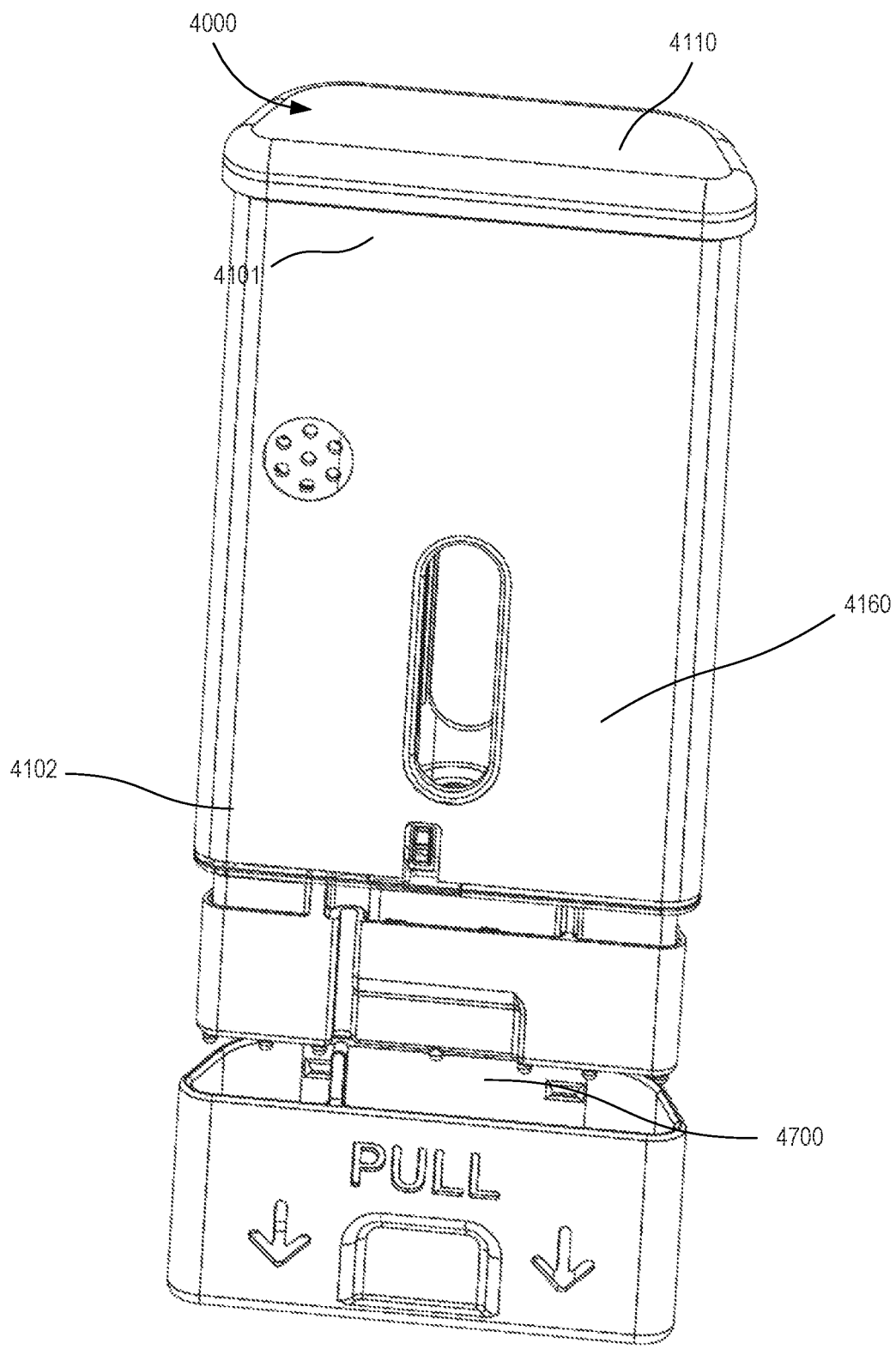
Figure 4:
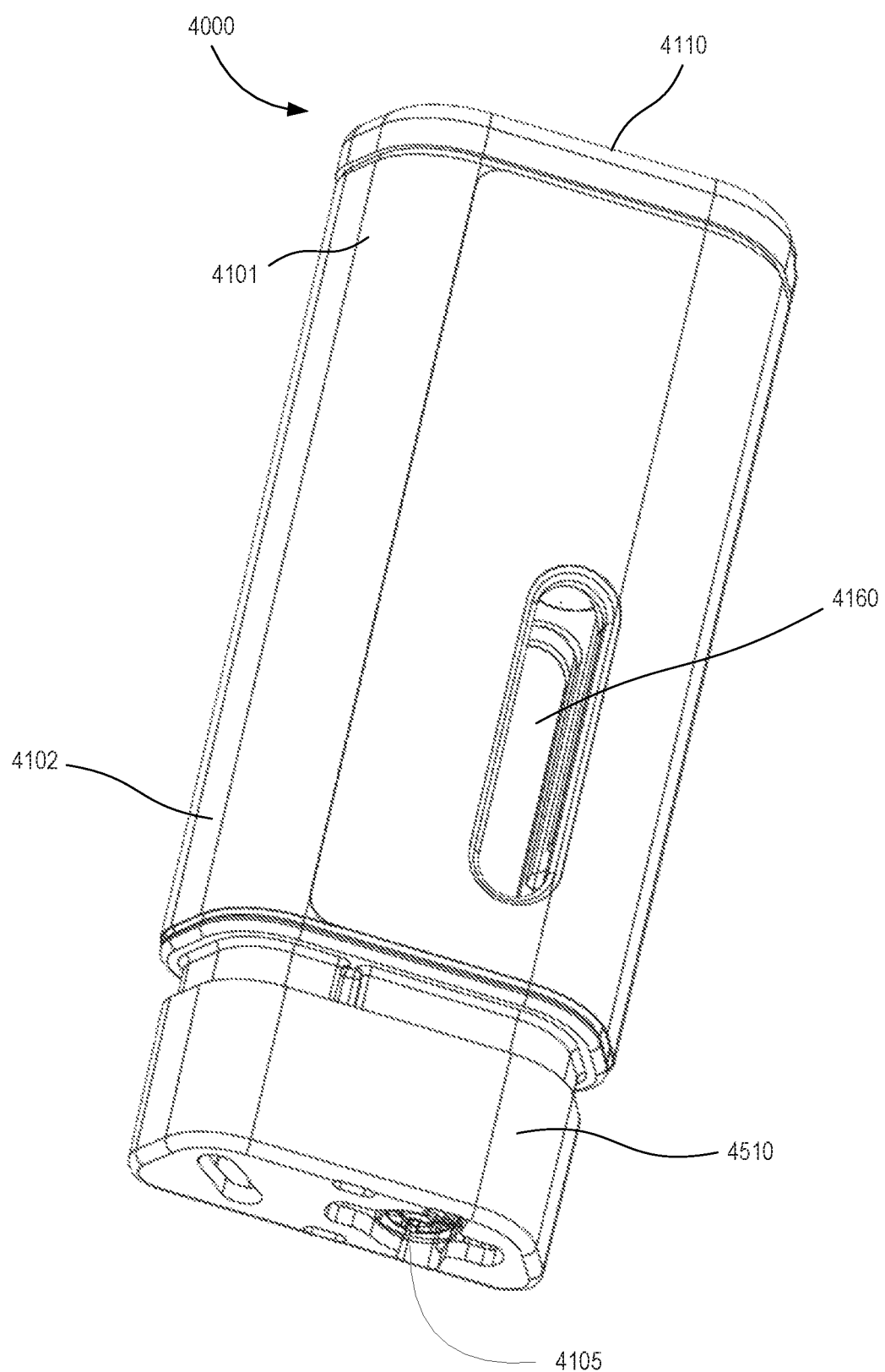
FIG. 4 is a perspective rear view of the medical injector illustrated in FIGS. 2 and 3, with the safety lock removed.

Medicament delivery devices for administration of medicaments contained within a prefilled syringe are described herein. In some embodiments, an apparatus includes a housing, a carrier, a medicament container, and a flexible member. A side wall of the housing defines an opening configured to selectively place a gas chamber defined by the housing in fluid communication with an exterior volume. The carrier is disposed within the housing and has a proximal surface that defines a portion of a boundary of the gas chamber. The medicament container is coupled to the carrier and has a distal end portion configured to be coupled to a delivery member. The medicament container containing a medicament and includes an elastomeric member that seals the medicament within the medicament container. A distal end portion of the flexible member is coupled to the elastomeric member. A proximal end portion of the flexible member is coupled to a valve member. The flexible member is configured to transition from a collapsed configuration to an expanded configuration when the elastomeric member moves within the medicament container. The flexible member is configured to exert a release force on the valve member to move the valve member relative to the opening when the flexible member transitions from the collapsed configuration to the expanded configuration to place the gas chamber in fluid communication with the exterior volume.

In some embodiments, an apparatus includes a housing (that defines a gas chamber), an energy storage member, a first medicament container assembly, and a second medicament container assembly. The energy storage member is disposed within the housing, and is configured to produce a pressurized gas within the gas chamber. Each of the first medicament container assembly and the second medicament container assembly is disposed within the housing. The first medicament container assembly includes a first container body and a first elastomeric member disposed within the first container body. The first medicament container assembly includes a first needle coupled to a distal end portion of the first container body. The first medicament container assembly is configured to move within the housing in response to a force exerted by the pressurized gas such that the first needle moves from within the housing to an exterior volume outside of the housing. The first elastomeric member is configured to move within the first container body to convey a first medicament contained therein in response to the force. The second medicament container assembly includes a second container body and a second elastomeric member disposed within the second container body. The second medicament container assembly includes a second needle coupled to a distal end portion of the second container body. The second medicament container assembly is configured to move within the housing in response to the force such that the second needle moves from within the housing to the exterior volume. The second elastomeric member is configured to move within the second container body to convey a second medicament contained therein in response to the force.

In some embodiments, a method includes placing a housing of a medical injector into contact with a target location. The housing defines a gas chamber, and encloses an energy storage member, a first medicament container assembly, and a second medicament container assembly. The first medicament container assembly includes a first container body, a first elastomeric member disposed within the first container body, and a first needle coupled to a distal end portion of the first container body. The first needle is disposed within the housing. The second medicament container assembly includes a second container body, a second elastomeric member disposed within the second container body, and a second needle coupled to a distal end portion of the second container body. The second needle is disposed within the housing. The method includes actuating the energy storage member to produce a pressurized gas within the gas chamber of the housing. The first medicament container assembly moves within the housing in response to a force exerted by the pressurized gas such that the first needle moves from within the housing to an exterior volume outside of the housing. The first elastomeric member moves within the first container body to convey a first medicament contained therein in response to the force. The second medicament container assembly moves within the housing in response to the force exerted by the pressurized gas such that the second needle moves from within the housing to the exterior volume. The second elastomeric member moves within the second container body to convey a second medicament contained therein in response to the force.

As used herein, the terms "substance" or "medicament" includes any constituent of a therapeutic substance. A medicament can include such constituents regardless of their state of matter (e.g., solid, liquid or gas). Moreover, a medicament can include the multiple constituents that can be included in a therapeutic substance in a mixed state, in an unmixed state and/or in a partially mixed state. A medicament can include both the active constituents and inert constituents of a therapeutic substance. Accordingly, as used herein, a medicament can include non-active constituents such as, water, colorant or the like.

The term "about" when used in connection with a referenced numeric indication means the referenced numeric indication plus or minus up to 10 percent of that referenced numeric indication. For example, "about 100" means from 90 to 110.

In a similar manner, term "substantially" when used in connection with, for example, a geometric relationship, a numerical value, and/or a range is intended to convey that the geometric relationship (or the structures described thereby), the number, and/or the range so defined is nominally the recited geometric relationship, number, and/or range. For example, two structures described herein as being "substantially parallel" is intended to convey that, although a parallel geometric relationship is desirable, some non-parallelism can occur in a "substantially parallel" arrangement. By way of another example, a structure defining a volume that is "substantially 0.50 milliliters (mL)" is intended to convey that, while the recited volume is desirable, some tolerances can occur when the volume is "substantially" the recited volume (e.g., 0.50 mL). Such tolerances can result from manufacturing tolerances, measurement tolerances, and/or other practical considerations (such as, for example, minute imperfections, age of a structure so defined, a pressure or a force exerted within a system, and/or the like). As described above, a suitable tolerance can be, for example, of ±10% of the stated geometric construction, numerical value, and/or range. Furthermore, although a numerical value modified by the term "substantially" can allow for and/or otherwise encompass a tolerance of the stated numerical value, it is not intended to exclude the exact numerical value stated.

As used herein, the term "set" can refer to multiple features or a singular feature with multiple parts. For example, when referring to set of walls, the set of walls can be considered as one wall with multiple portions, or the set of walls can be considered as multiple, distinct walls. Thus, a monolithically-constructed item can include a set of walls. Such a set of walls can include, for example, multiple portions that are either continuous or discontinuous from each other. A set of walls can also be fabricated from multiple items that are produced separately and are later joined together (e.g., via a weld, an adhesive, or any suitable method).

As used in this specification and the appended claims, the words "proximal" and "distal" refer to direction closer to and away from, respectively, an operator of the medical device. Thus, for example, the end of the medicament delivery device contacting the patient's body would be the distal end of the medicament delivery device, while the end opposite the distal end would be the proximal end of the medicament delivery device.

As used herein, the terms "stiffness" or "rigidity" relate to an object's resistance to deflection, deformation, and/or displacement produced by an applied force, and is generally understood to be the opposite of the object's "flexibility." For example, a gas release member with greater stiffness is more resistant to deflection, deformation and/or displacement when exposed to a force than a gas release member having a lower stiffness. Similarly stated, a gas release member having a higher stiffness can be characterized as being more rigid than a gas release member having a lower stiffness. Stiffness can be characterized in terms of the amount of force applied to the object and the resulting distance through which a first portion of the object deflects, deforms, and/or displaces with respect to a second portion of the object. When characterizing the stiffness of an object, the deflected distance may be measured as the deflection of a portion of the object different than the portion of the object to which the force is directly applied. Said another way, in some objects, the point of deflection is distinct from the point where force is applied.

Stiffness (and therefore, flexibility) is an extensive property of the object being described, and thus is dependent upon the material from which the object is formed as well as certain physical characteristics of the object (e.g., cross-sectional shape, length, boundary conditions, etc.). For example, the stiffness of an object can be increased or decreased by selectively including in the object a material having a desired modulus of elasticity, flexural modulus and/or hardness. The modulus of elasticity is an intensive property of (i.e., is intrinsic to) the constituent material and describes an object's tendency to elastically (i.e., non-permanently) deform in response to an applied force. A material having a high modulus of elasticity will not deflect as much as a material having a low modulus of elasticity in the presence of an equally applied stress. Thus, the stiffness of the object can be decreased, for example, by introducing into the object and/or constructing the object of a material having a relatively low modulus of elasticity.

The stiffness of an object can also be increased or decreased by changing a physical characteristic of the object, such as the shape or cross-sectional area of the object. For example, an object having a length and a cross-sectional area may have a greater stiffness than an object having an identical length but a smaller cross-sectional area. As another example, the stiffness of an object can be reduced by including one or more stress concentration risers (or discontinuous boundaries) that cause deformation to occur under a lower stress and/or at a particular location of the object. Thus, the stiffness (or flexibility) of the object can be decreased by decreasing and/or changing the shape of the object.

Thus, an object that deforms readily under small forces, such as, for example, a wire, a filament, a cord, or the like is said to be a flexible object.

The therapeutic compositions described herein can be included in any suitable medicament delivery device as described herein or in the '4345 PCT and/or the '6413 PCT. For example, in some embodiments, a drug product configured for administration by an untrained user (such a person accompanying the patient) can include a dose of icatibant. Such drug products can include, for example, an auto-injector having a needle length and delivery profile (e.g., flow of the icatibant) sufficient to produce subcutaneous injection. In other embodiments, a drug product can include a therapeutic substance including of a monoclonal antibody. Such drug products can include, for example, an auto-injector having multiple prefilled syringe containers and that delivers the medicament from each of the syringes in one operation to deliver the desired dose. By including multiple syringes, such arrangements can allow for higher doses while still using a standard fill volume within the prefilled syringe.

In some embodiments, a gas-powered medicament delivery device can result in a compact device, in which the outer dimensions of the housing are not substantially larger than the length of the medicament container disposed therein. For example, as shown and described herein, in some embodiments, a medicament delivery device can be devoid of a mechanical linkage that exerts or transfers a force to an elastomeric member to expel a medicament from a medicament container therein. Similarly stated, in some embodiments, a medicament delivery device can be devoid of mechanical linkages (rams, rods) that transfer force to the elastomeric member. Rather, in some embodiments, the elastomeric member can exert a force onto a member (e.g., an expandable member) to provide control over the delivery. Such medicament delivery devices (or medicament delivery mechanisms) are considered to be "pistonless" systems. As one example, in a pistonless, gas-powered auto-injector, the force exerted by the gas can move the medicament container relative to the housing and similarly, can move the elastomeric member relative to (e.g., within) the medicament container. In some embodiments, by not including a movable mechanism, a piston, and/or the like, a height of the medical injector can be reduced relative to, for example, the height of a device that includes a rigid, single length piston.

For example, any of the medicament delivery devices described herein can include any suitable "pistonless" design, such as those described in the '4345 PCT or in International Patent Application No. PCT/US16/23995, entitled "DEVICES AND METHODS FOR DELIVERING A LYOPHILIZED MEDICAMENT," filed on Mar. 24, 2016, which is incorporated herein by reference in its entirety.

In some embodiments, the characteristics of the medicament, the medicament container and the needle are such that the force required to achieve the desired injection is not possible via manual injection. Accordingly, in some embodiments a device can include an energy storage member configured to produce the desired force (and/or pressure within the medicament container) to deliver the medicament. For example, in certain circumstances, the pressure of the medicament within a needle-based medicament container can be modeled by the Hagen-Poiseuille law, as indicated below:

$$P=(8*\mu*L*Q)/(\Pi*R^4) \tag{1}$$

where P is the pressure of the medicament within the medicament container, $\mu$ is the viscosity of the medicament, L is the length of the needle (not shown), Q is the flow rate of the medicament through the needle, and R is the radius of the lumen defined by the needle. Because the pressure (and/or force) required to inject a high viscosity fluid through a small-bore needle is proportional to the inverse of the radius of the lumen of the needle to the fourth power, the pressure of the medicament within the medicament container necessary to achieve the desired flow rate can, at times, be relatively high. By including a gas-based energy storage member, the desired pressure can be achieved.

In some embodiments, the energy storage member can be configurable to include various amounts of stored energy without changing the size of the energy storage member. In such embodiments, therefore, a high force (e.g., to inject viscous medicaments) can be achieved in the same packaging that is used for lower viscosity medicaments. For example, in some embodiments, the energy storage member can be a compressed gas cylinder having any desired pressure (and thus, mass) of gas therein. Accordingly, the pressure and/or force can be achieved to complete the operations described herein, regardless of the medicament.

In such embodiments, the use of a non-mechanical energy storage member (e.g., gas, propellant, magnetic, electronic or the like) can produce a sufficiently high force to produce the desired pressure within the medicament container to produce the desired injection. For example, in such embodiments having a larger diameter, the amount of force needed to produce a desired internal pressure increases significantly. In some embodiments, any of the medicament delivery devices shown herein can include a gas-based energy storage system configured to produce a gas pressure (e.g., within the gas chamber) of between about 200 psi and about 2700 psi. In some embodiments, any of the injectors shown herein can include a gas-based energy storage system configured to produce a gas pressure of about 200 psi, 300 psi, 400 psi, 500 psi, 600 psi, 700 psi, 800 psi, 900 psi, 1100 psi, 1200 psi, 1300 psi, 1500 psi, 1700 psi, 1900 psi, 2100 psi, 2300 psi, 2500 psi, or 2700 psi. The gas pressure can be produced by any suitable mechanism, such as, for example, by puncturing a compressed gas container, releasing a propellant (e.g., hydrofluoroalkane), releasing a liquefied gas, triggering a chemical reaction, or the like.

FIG. 1 is a chart showing the delivery time for delivering 1 mL of a substance using a medicament delivery device of the types shown and described herein and in the '4335 PCT as a function of both the gas pressure and the viscosity of the substance. As shown, the delivery time can be tailored to meet desired performance characteristics by adjusting the gas pressure within the device. For example, in some embodiments, any of the devices and drug products described herein can be used to perform a method of subcutaneous injection by limiting the gas pressure during the injection event. By limiting the gas pressure, the injection force (and therefore the momentum of the substance leaving the device) can be reduced to ensure that the substance is delivered subcutaneously and not intramuscularly.

In some embodiments, the gas pressure can be controlled during the injection event by limiting the amount of pressurized gas within the compressed gas container. In other embodiments, the gas pressure can be controlled by selective movement of a gas release valve, such as the release valve 4340 described below, during a delivery (e.g., injection) event. Similarly stated, in some embodiments, any of the devices described herein (or in the '4345 PCT or the '6413 PCT) can include a valve and a mechanism that opens the valve by a predetermined amount during a delivery event. In yet other embodiments, any of the devices described herein (or in the '4345 PCT or the '6413 PCT) can include a porous valve member that allows some amount of pressure reduction during a delivery event.

In some embodiments, a medicament delivery can be an auto-injector having a pistonless delivery system in which the force exerted by the gas can move the medicament container relative to the housing and the elastomeric member relative to (e.g., within) the medicament container. For example, FIGS. 2-36 show a medical injector 4000 (also referred to as "auto-injector," "injector," or "device"), according to an embodiment. The medical injector 4000 is a gas-powered auto-injector configured to deliver a medicament contained within a prefilled syringe 4200, as described herein. A discussion of the components of the medical injector 4000 will be followed by a discussion of the operation of the medical injector 4000. Certain aspects of the medical injector 4000 can be similar to or substantially the same to the medical injectors described in the '4345 PCT, the '6413 PCT, U.S. patent application Ser. No. 13/357,935 (now U.S. Pat. No. 9,084,849) entitled, "MEDICAMENT DELIVERY DEVICES FOR ADMINISTRATION OF A MEDICAMENT WITHIN A PREFILLED SYRINGE," filed on Jan. 25, 2012 (referred to henceforth as the "'849 patent"), the disclosures of each of which are incorporated herein by reference in its entirety.

Figure 5:
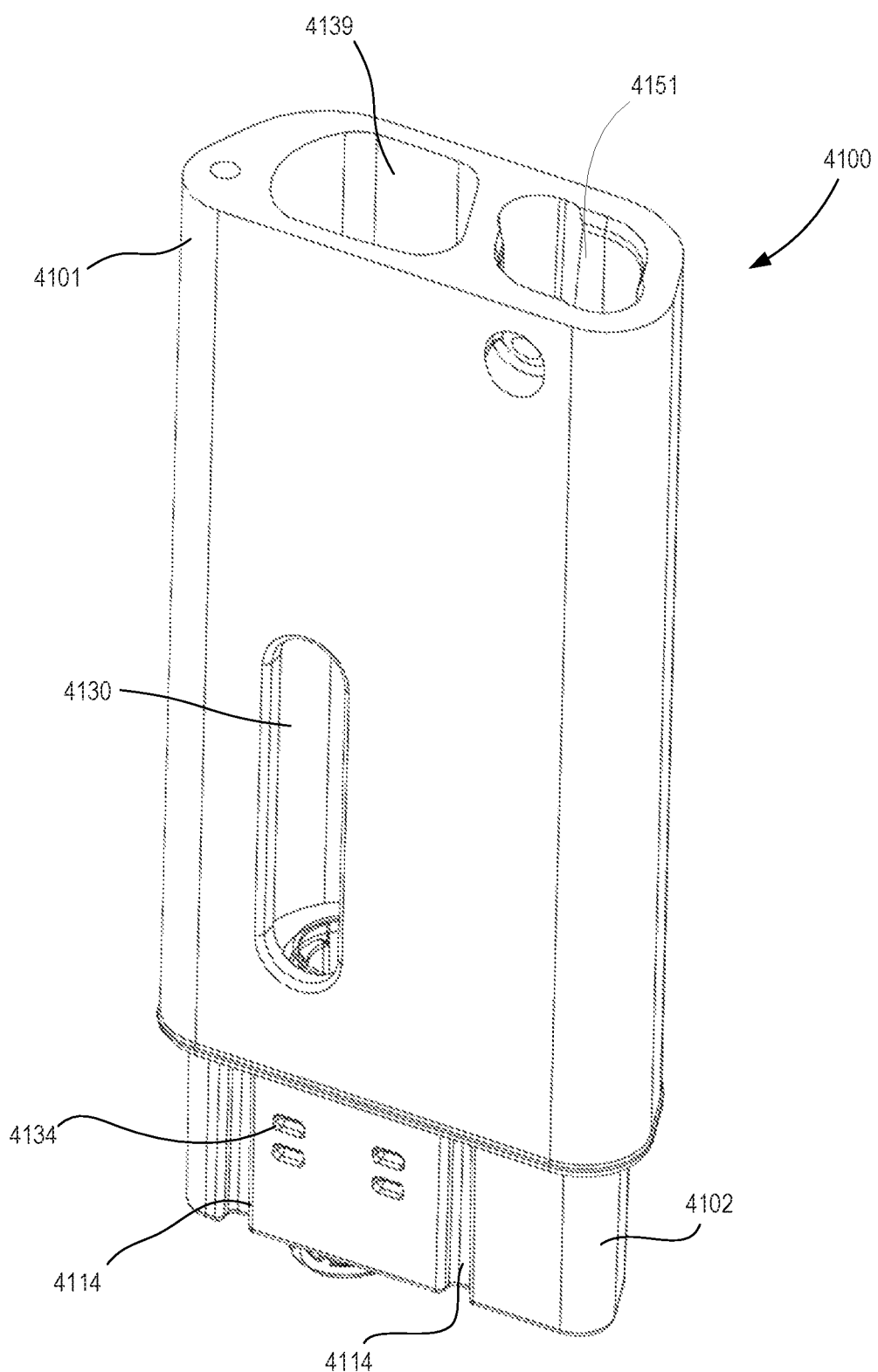
FIG. 5 is a perspective view of a housing of the medical injector illustrated in FIGS. 2 and 3.
Figure 6:
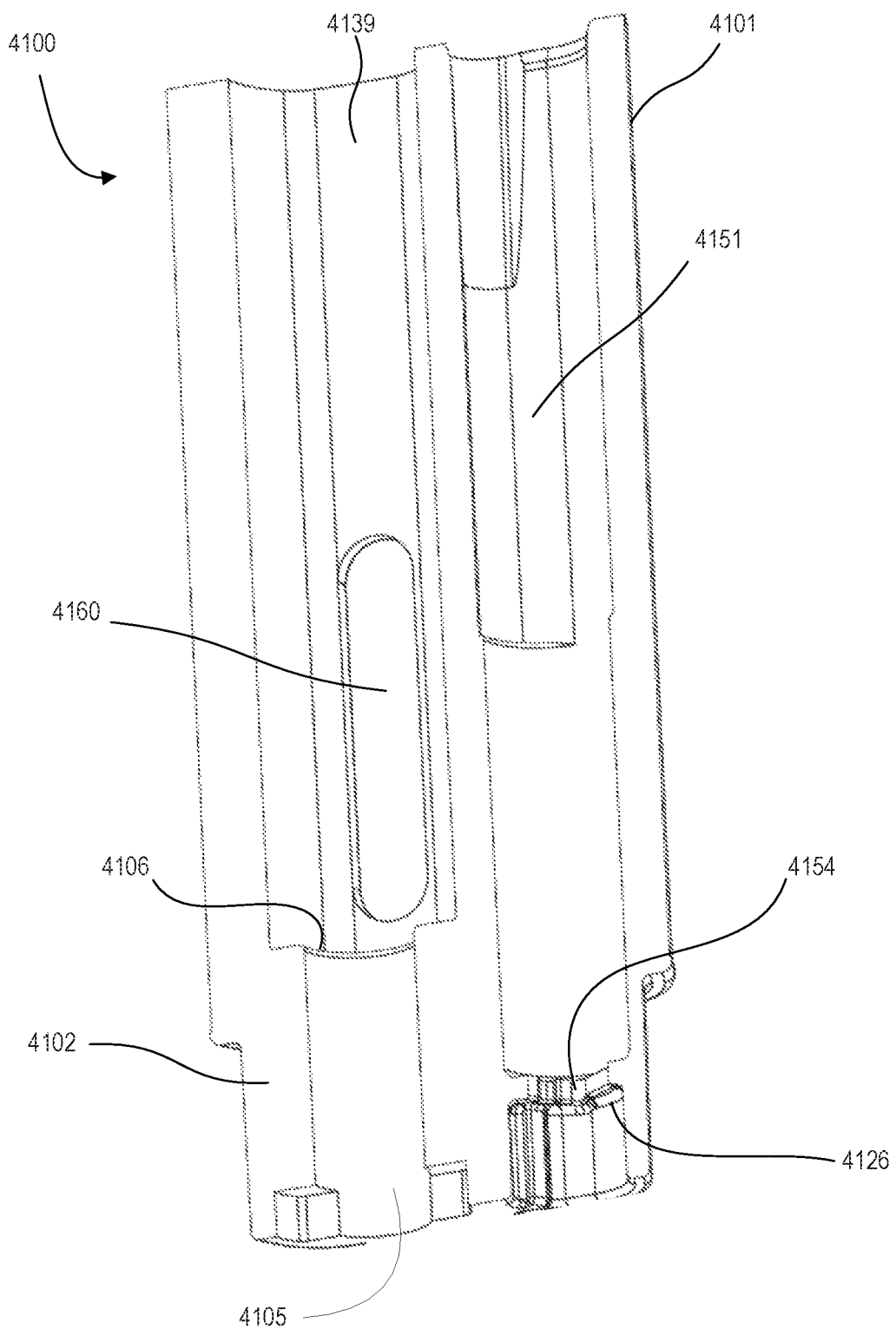
FIG. 6 is a cross-sectional view of the housing illustrated in FIG. 5.
Figure 22:
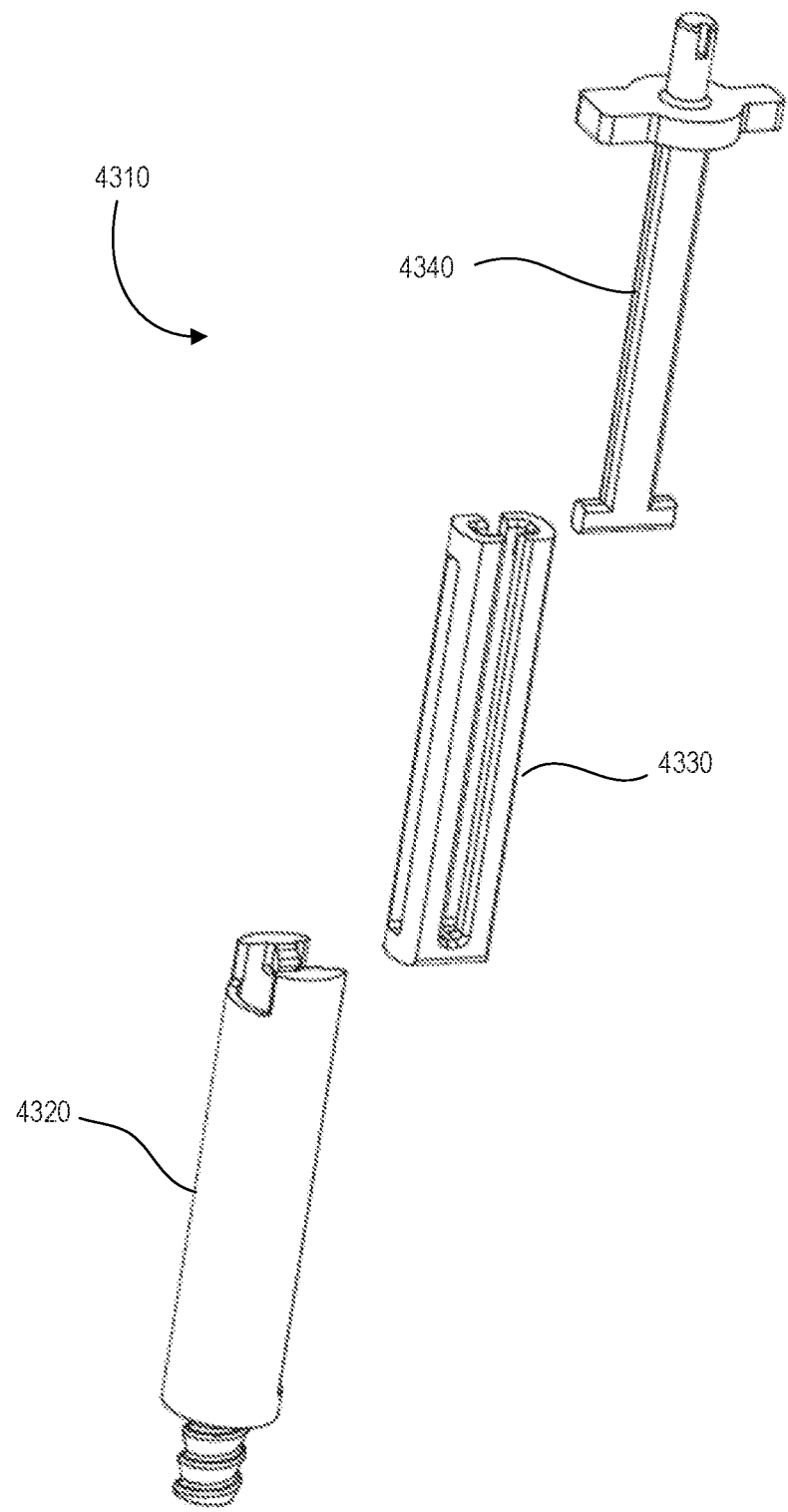
Figure 23:
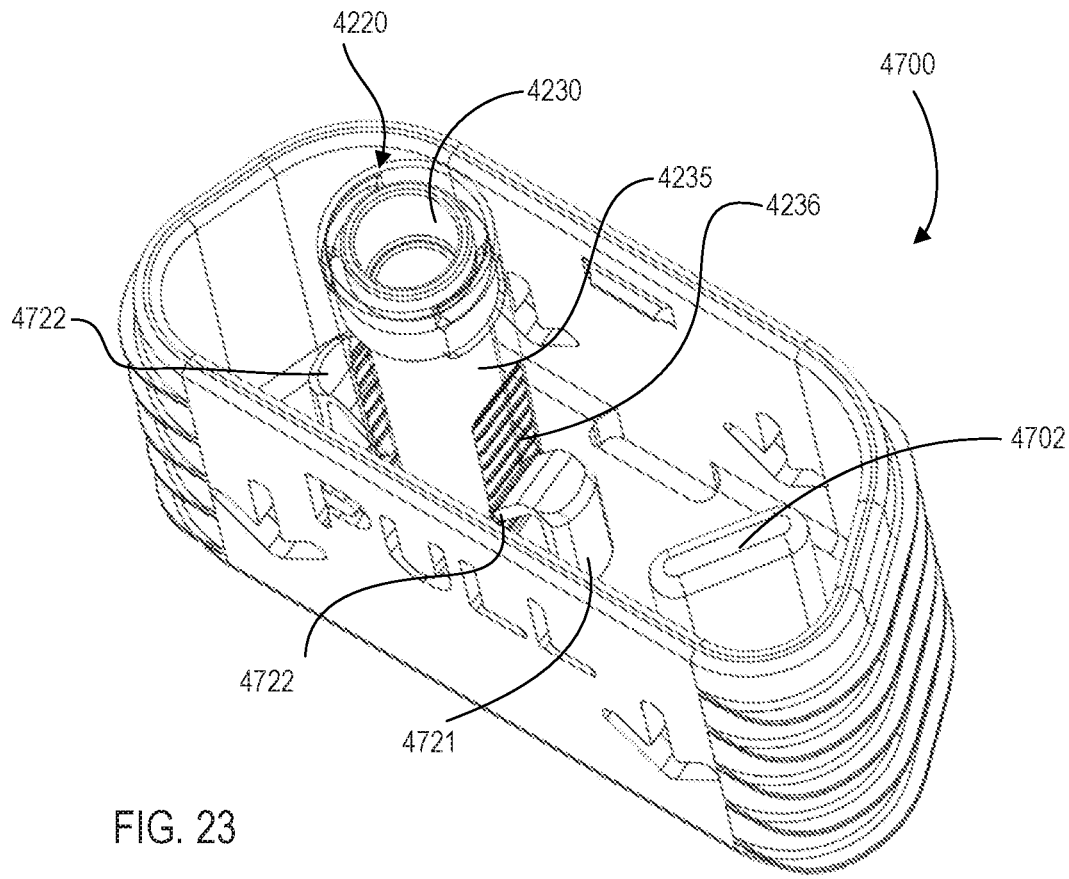
FIGS. 23 and 24 are perspective views of a safety lock of the medical injector shown in FIGS. 2 and 3.
Figure 24:
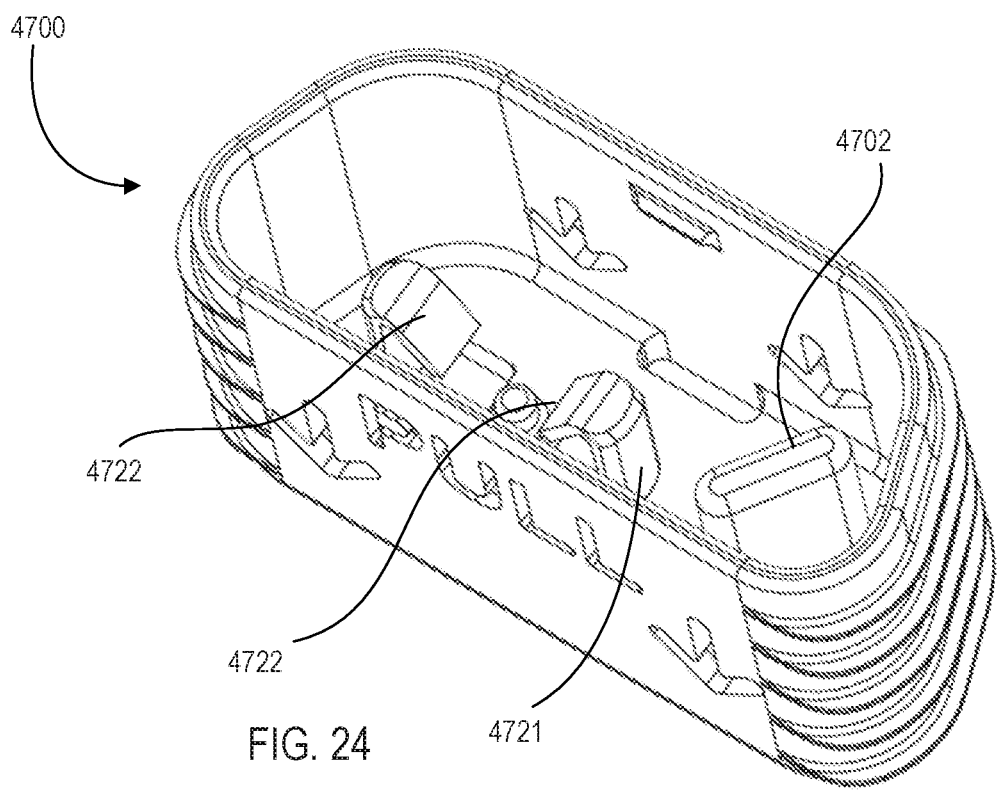

The medical injector 4000 includes a housing 4100 (see e.g., FIGS. 5-6), a system actuation assembly 4500 (see e.g., FIGS. 9-10), a medicament container assembly 4200 (see FIG. 19), a medicament delivery mechanism 4300 (see e.g., FIGS. 15-22), a base 4510 (or actuator, see FIGS. 25 and 26); and a safety lock 4700 (see FIGS. 23-24). As shown in FIGS. 5-6, the housing 4100 has a proximal end portion 4101 and a distal end portion 4102. The housing 4100 defines a first status indicator aperture 4130 and a second status indicator aperture 4160. The first status indicator aperture 4130 defined by the housing 4100 is located on a first side of the housing 4100, and the second status indicator aperture 4160 of the housing 4100 is located on a second side of the housing 4100. The status indicator apertures 4130, 4160 can allow a patient to monitor the status and/or contents of the medicament container 4200, the carrier 4360, and the medicament contained within the housing 4100. For example, by visually inspecting the status indicator apertures 4130, 4160, a patient can determine whether the medicament container 4200 contains a medicament and/or whether the medicament has been dispensed.

In some embodiments, the housing 4100 can include a label or indicia that mask or otherwise accentuates the status indicator apertures 4130, 4160 and/or the contents viewed therethrough. For example, in some embodiments, the housing 4100 can include a label (not shown) having border that surrounds at least a portion of the status indicator aperture 4130, the status indicator apertures 4160 (or both). In some embodiments, a label can include indicator colors that alert user (or assist a user in determining) whether the medicament is properly colored, whether a portion of the carrier 4360 is visible through the window or the like.

Figure 9:
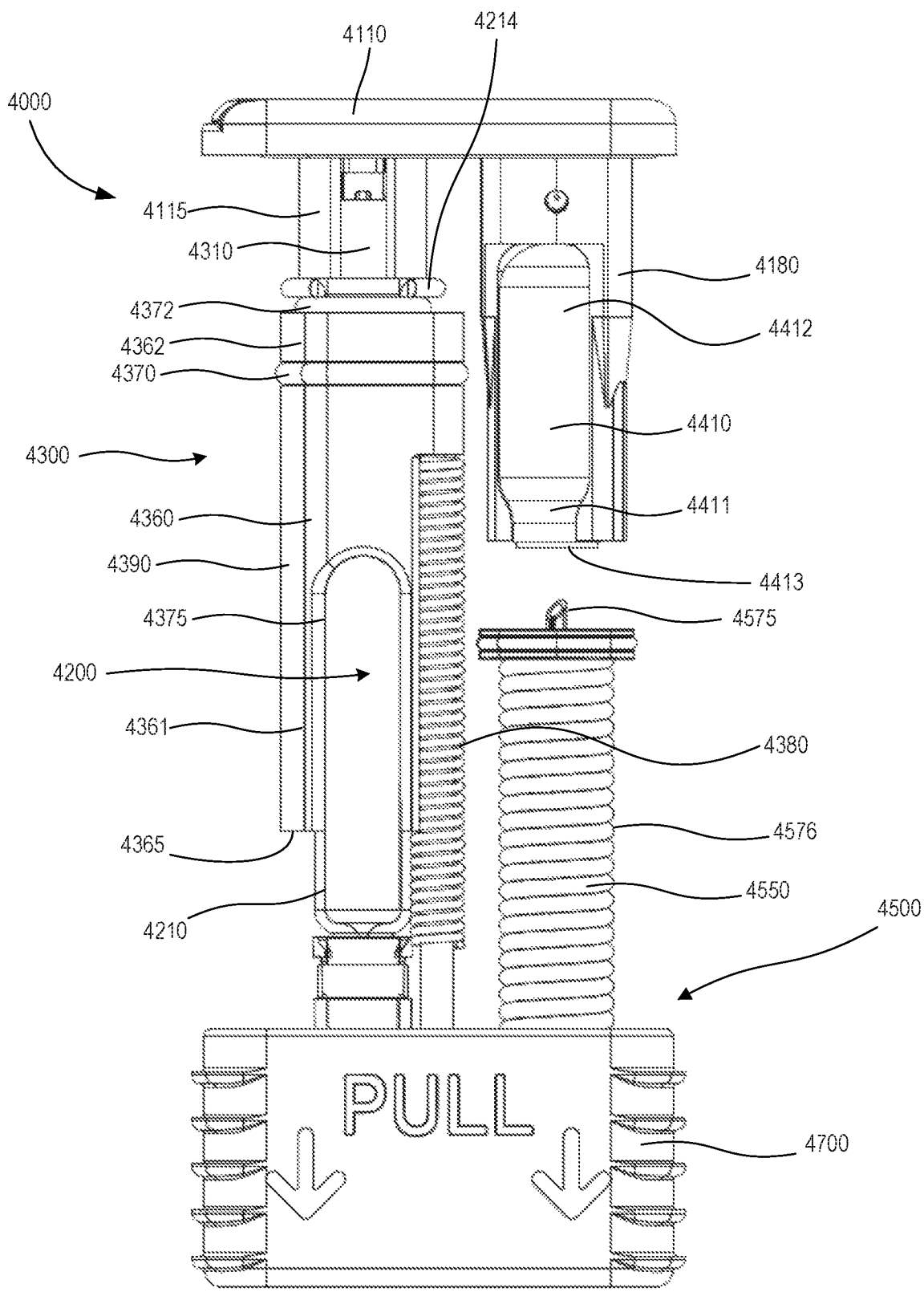
FIGS. 9 and 10 are front views of a medicament delivery mechanism of the medical injector shown in FIGS. 2 and 3.
Figure 10:
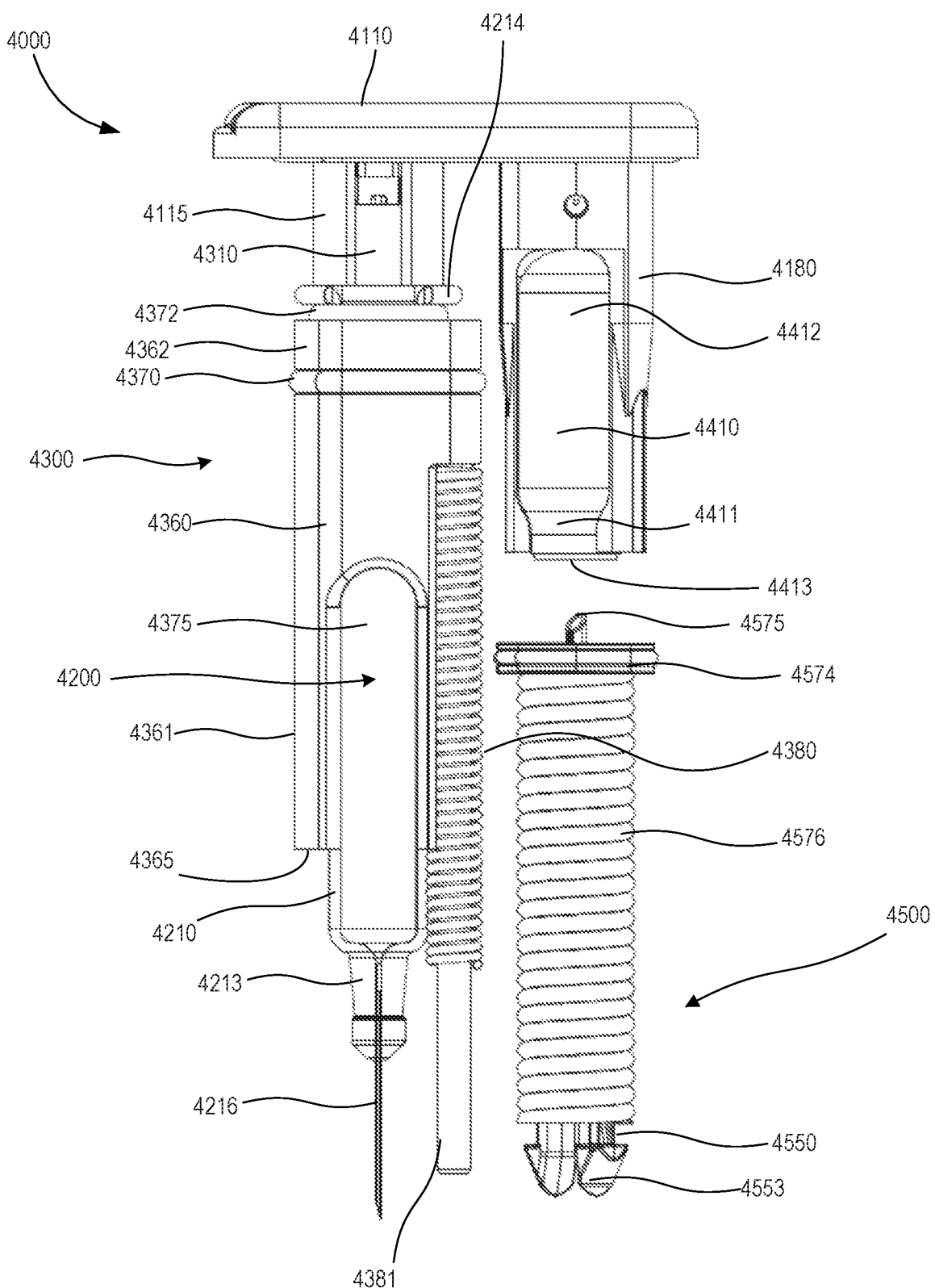

As shown in FIGS. 5 and 6, the housing 4100 defines a gas container cavity 4151 and a medicament cavity 4139. The gas container cavity 4151 is configured to receive the gas container 4410 and a portion of the system actuator assembly 4500 (e.g., a release member 4550 and the spring 4576, as shown in FIGS. 9 and 10). The proximal end portion 4152 of the gas container cavity 4151 is configured to receive the gas container retention member 4580 of a proximal cap 4103 of the housing 4100, as described in further detail herein. The gas container cavity 4151 is in fluid communication with the medicament cavity 4139 via a gas passageway (not shown), as described in further detail herein.

The medicament cavity 4139 is configured to receive the medicament container assembly 4200 and at least a portion of the medicament delivery mechanism 4300. In particular, as described below, the medicament delivery mechanism 4300 includes a carrier assembly 4390 and a gas vent assembly 4310 movably disposed in the medicament cavity 4139. The medicament cavity 4139 is in fluid communication with a region outside the housing 4100 via a needle aperture 4105 and also a vent opening 4112.

Figure 8:
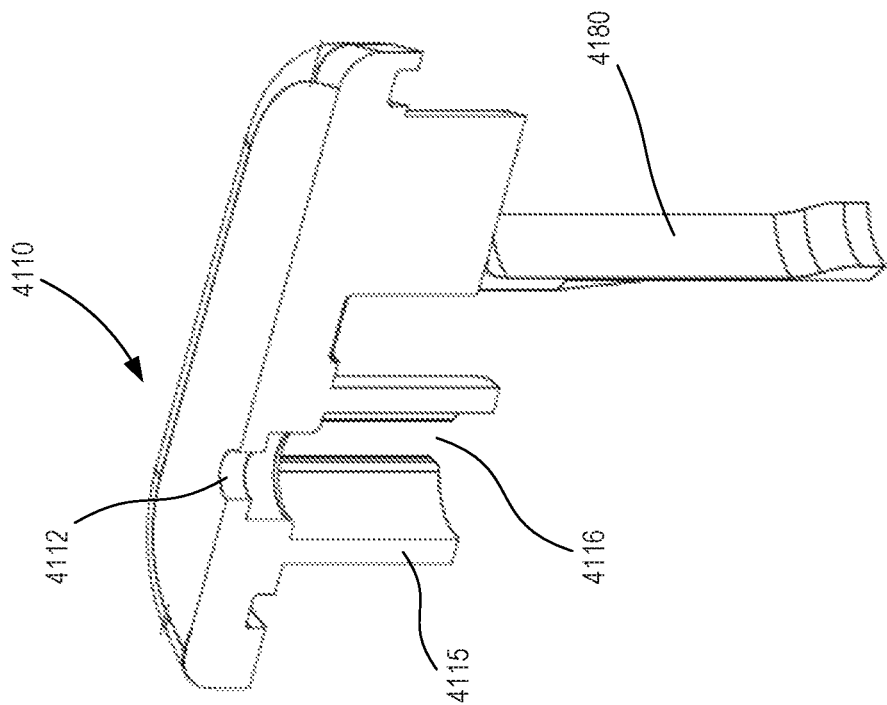
FIGS. 7 and 8 are a perspective view and a cross-sectional view, respectively, of a proximal cap of the medical injector illustrated in FIG. 2.
Figure 7:
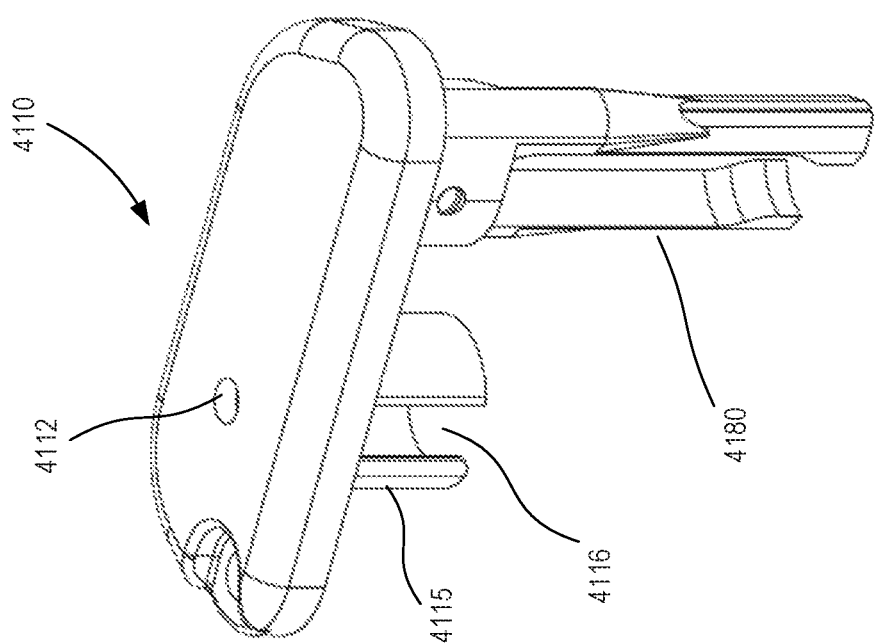
Figure 13:
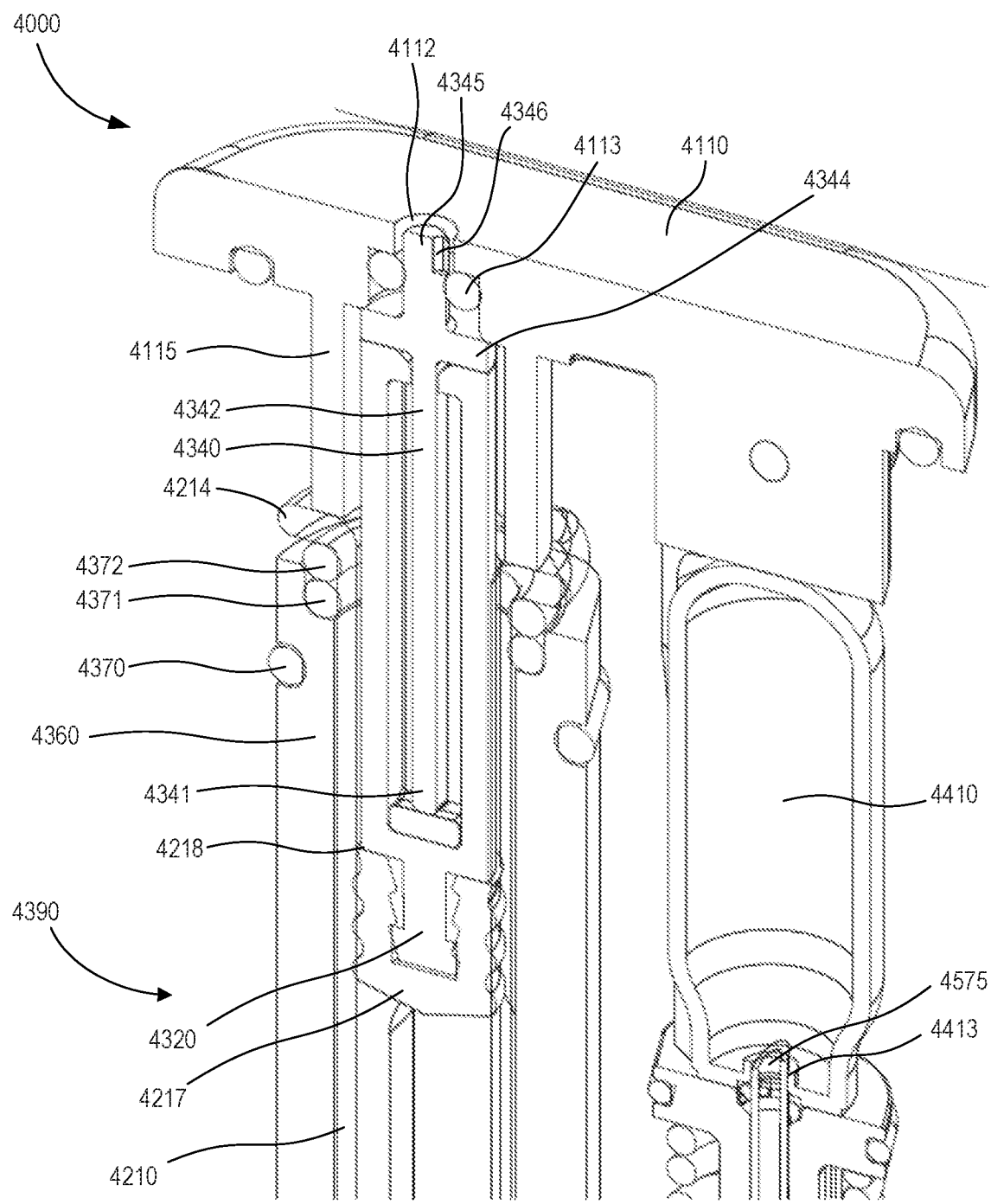
FIG. 13 is an enlarged cross-sectional view of a portion of the medical injector shown in FIGS. 2 and 3, in the first configuration.

The proximal end portion 4101 of the housing 4100 includes a proximal cap 4110 (see e.g., FIGS. 7, 8 and 13).

The proximal cap 4110 includes a gas container retention member 4180 and defines a gas passageway between the medicament cavity 4139 and the gas container cavity 4151. The gas container retention member 4180 is configured to receive and/or retain a gas container 4410 that contains a pressurized gas, as shown in FIGS. 9 and 10. When the medical injector 4000 is actuated, pressurized gas from the gas container 4410 is conveyed from the gas container cavity 4151 to the medicament cavity 4139 via the gas passageway. Said another way, the gas passageway places the gas container cavity 4151 in fluid communication with the medicament cavity 4139. Thus, the proximal portion of the medicament cavity 4139 can be referred to as a gas chamber. Similarly stated, the proximal portion of the medicament cavity 4139 is a volume within which a pressurized gas is conveyed to move the carrier 4360 and inject the medicament, as described herein.

The proximal cap 4110 also includes an O-ring 4113 and defines the vent opening 4112. As described herein, the vent opening 4112 provides the passageway through which pressurized gas is conveyed from the medicament cavity 4139 (or gas chamber portion of the medicament cavity 4139) to a volume outside of the medical injector 4000. In this manner, the force produced by the pressurized gas on the medicament delivery mechanism 4300 and/or the medicament container assembly 4200 can be reduced to allow needle retraction after the injection is completed. As shown in FIG. 13, the O-ring 4113, in conjunction with the valve portion 4345 of the gas vent assembly 4310, selectively seals the vent opening 4112 during needle insertion and delivery of the medicament.

Although the vent opening 4112 is shown as being defined by the proximal cap 4110, and being in a proximal surface thereof, in other embodiments, the vent opening 4112 (and any of the vent openings described herein) can be defined within any suitable portion of the proximal cap or side wall. For example, in some embodiments, the vent opening 4112 (and any of the vent openings described herein) can be defined by the proximal cap, but can have a centerline that is nonparallel to a longitudinal axis of the medical injector 4000. Said another way, in some embodiments, the vent opening 4112 (and any of the vent openings described herein) can open towards a side of the medical injector, rather than opening towards the proximal end, as shown. In other embodiments, the vent opening 4112 (and any of the vent openings described herein) can be defined by any wall and/or surface of the housing 4100.

The proximal cap 4110 includes a guide wall 4115 within which the first (or proximal) member 4340 of the gas vent assembly 4310 moves. Specifically, the guide wall defines a pair of slots 4116 within which the guide surface 4344 of the first member 4340 (see e.g., FIGS. 20, 21) slide during operation. The guide wall 4115 also includes an end surface 4117 against which a flange 4214 of the container body 4210 rests when the medical injector 4000 is in its first configuration (i.e., the "storage" state).

As shown in FIG. 6, the distal end portion 4102 of the housing 4100 includes a shoulder 4106 and defines a needle aperture 4105. The distal end portion 4102 also includes base rail grooves 4114 and base retention recesses 4134 (see FIG. 5). The shoulder 4106 is configured to contact a corresponding surface 4365 of the carrier body 4360 (see e.g., FIG. 13) when the needle 4216 has been inserted a desired distance. In this manner the shoulder 4016 can act as an "end stop" or insertion limiting mechanism. The needle aperture 4105 is the opening through which the needle 4216 is disposed when the medical injector 4000 is actuated, as described in further detail herein.

Figure 14:
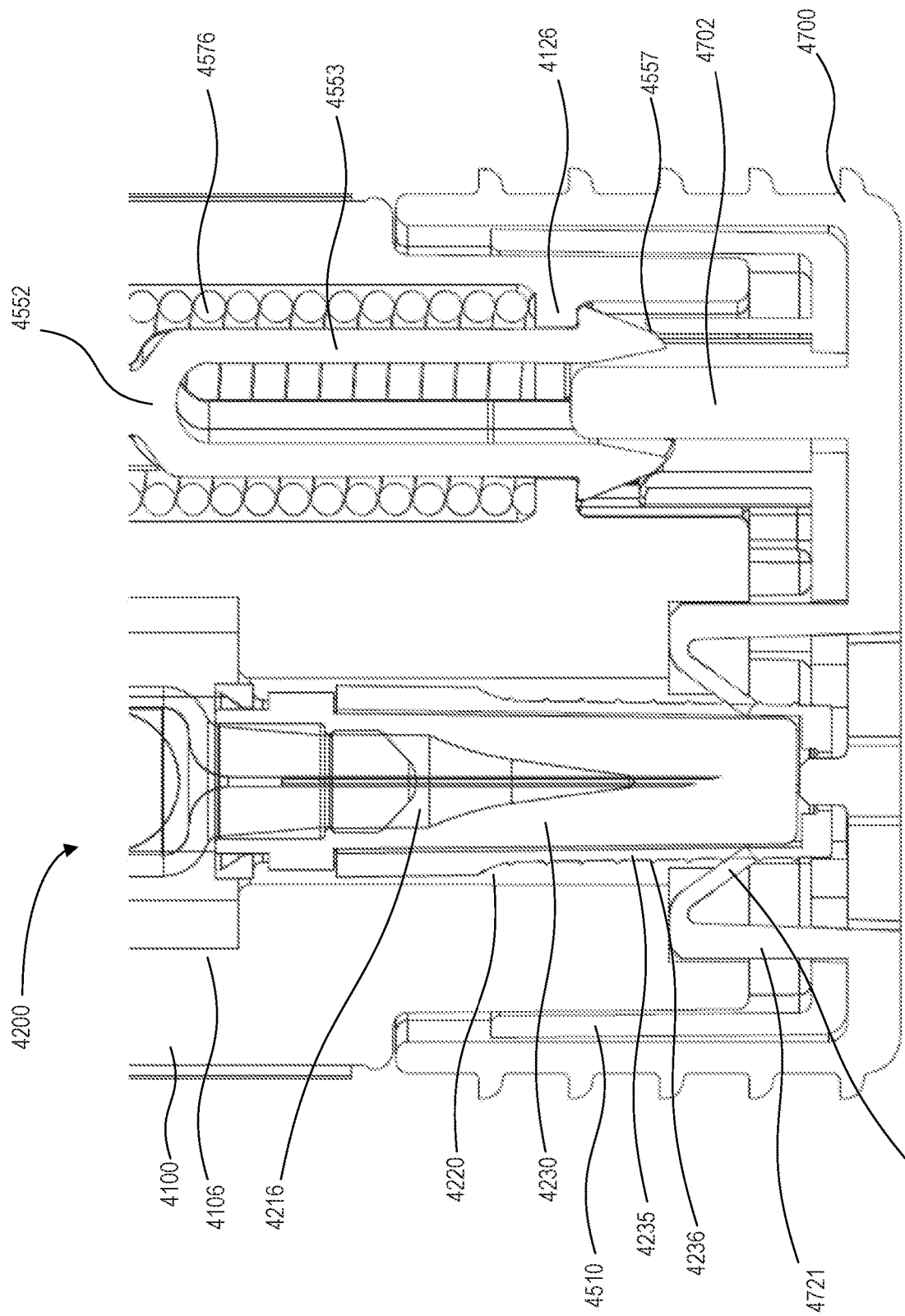
FIG. 14 is an enlarged cross-sectional view of a portion of the medical injector shown in FIGS. 2 and 3, in the first configuration.

The distal end portion 4102 of the housing also include a release member contact surface 4126, and defines the release member aperture. As shown in FIG. 14, the release member aperture 4145 receives a distal end portion 5152 of a release member 4550, such that the extensions 4553 of the release member 4550 engage with the release member contact surface to prevent activation of the medical injector 4000. The safety lock 4700, its components and functions are described in more detail below.

The distal base retention recesses 4134 are configured to receive the base connection knobs 4518 of the actuator 4510 (also referred to herein as "base 4510," see e.g., FIGS. 25 and 26) when the base 4510 is in a first position relative to the housing 4100. The proximal-most pair of base retention recesses 4134 are configured to receive the base connection knobs 4518 of the base 4510 when the base 4510 is in a second (i.e., actuated) position relative to the housing 4100. The base retention recesses 4134 have a tapered proximal sidewall and a non-tapered distal sidewall. This allows the base retention recesses 4134 to receive the base connection knobs 4518 such that the base 4510 can move proximally relative to the housing 4100, but cannot move distally relative to the housing 4100. Said another way, the distal-most set of base retention recesses 4134 are configured to prevent the base 4510 from moving distally when the base 4510 is in a first position and the proximal-most set of base retention recesses 4134 are configured to prevent the base 4510 from moving distally when the base 4510 is in a second position. Similarly stated, the proximal base retention recesses 4134 and the base connection knobs 4518 cooperatively to limit movement of the base to prevent undesirable movement of the base 4510 after the medical injector 4000 is actuated. The proximal base retention recesses 4134 and the base connection knobs 4518 also provide a visual cue to the user that the medical injector 4000 has been used.

Figure 25:
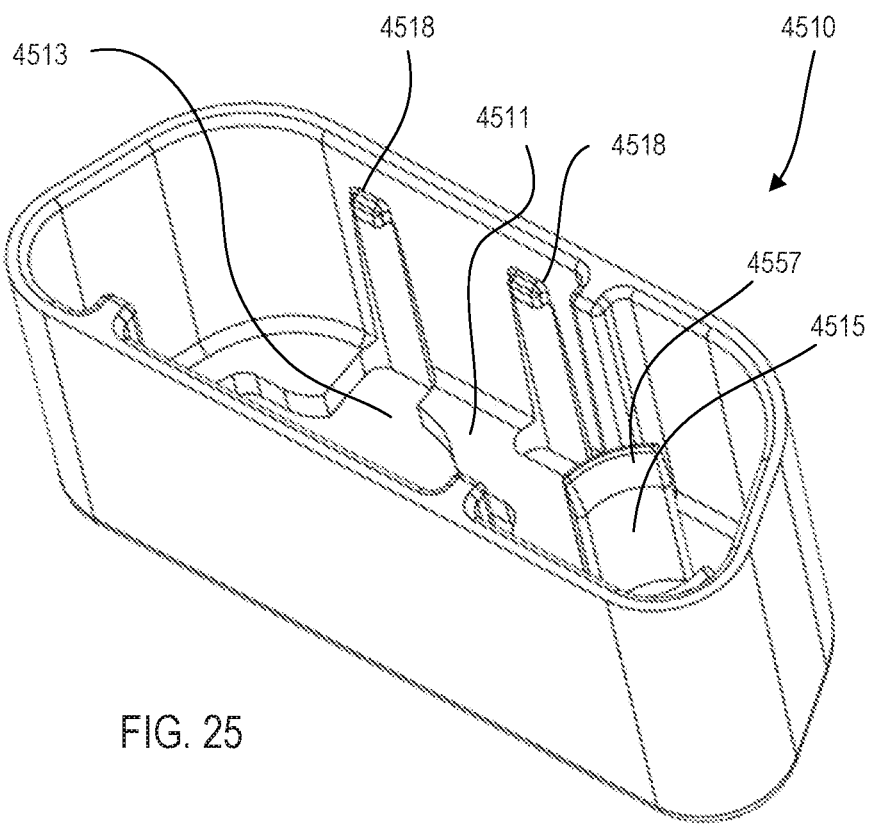
FIGS. 25 and 26 are perspective views of a system actuator of the medical injector shown in FIGS. 2 and 3.
Figure 26:
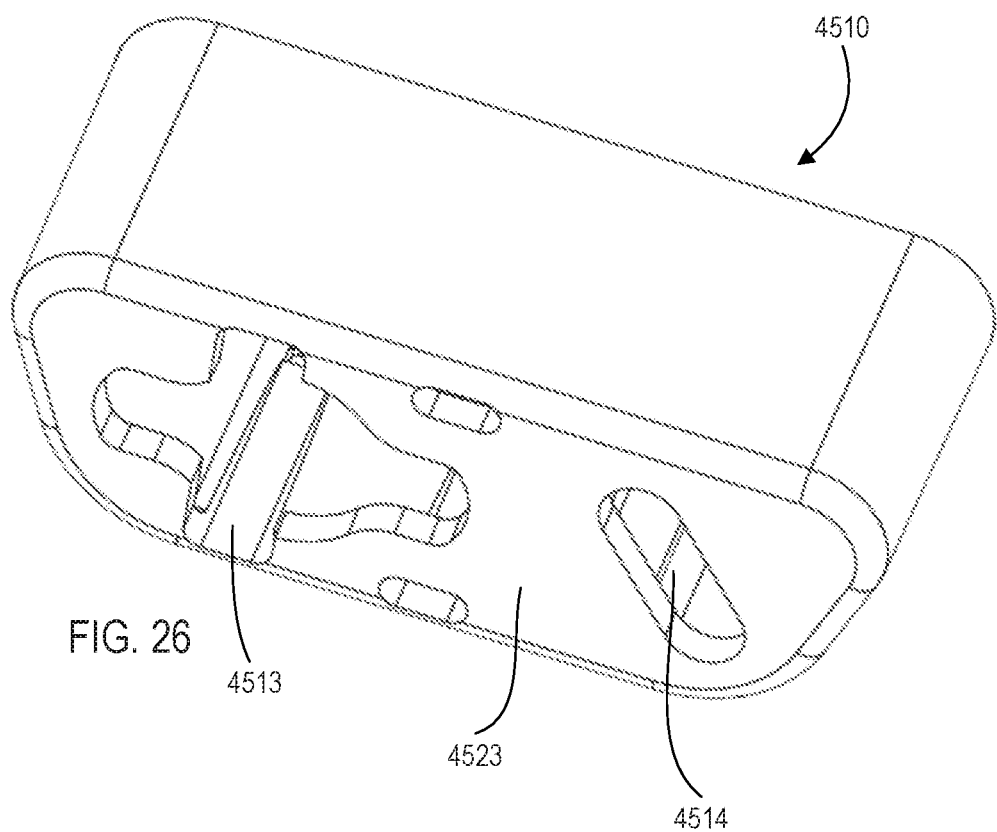

The base rail grooves 4114 receive the guide members 4517 of the base 4510 (see FIGS. 25 and 26). The guide members 4517 of the base 4510 and the base rail grooves 4114 of the housing 4100 engage each other in a way that allows the guide members 4517 of the base 4510 to slide in a proximal and/or distal direction within the base rail grooves 4114 while limiting lateral movement of the guide members 4517. This arrangement allows the base 4510 to move in a proximal and/or distal direction with respect to the housing 4100 but prevents the base 4510 from moving in a lateral direction with respect to the housing 4100.

Figure 19:
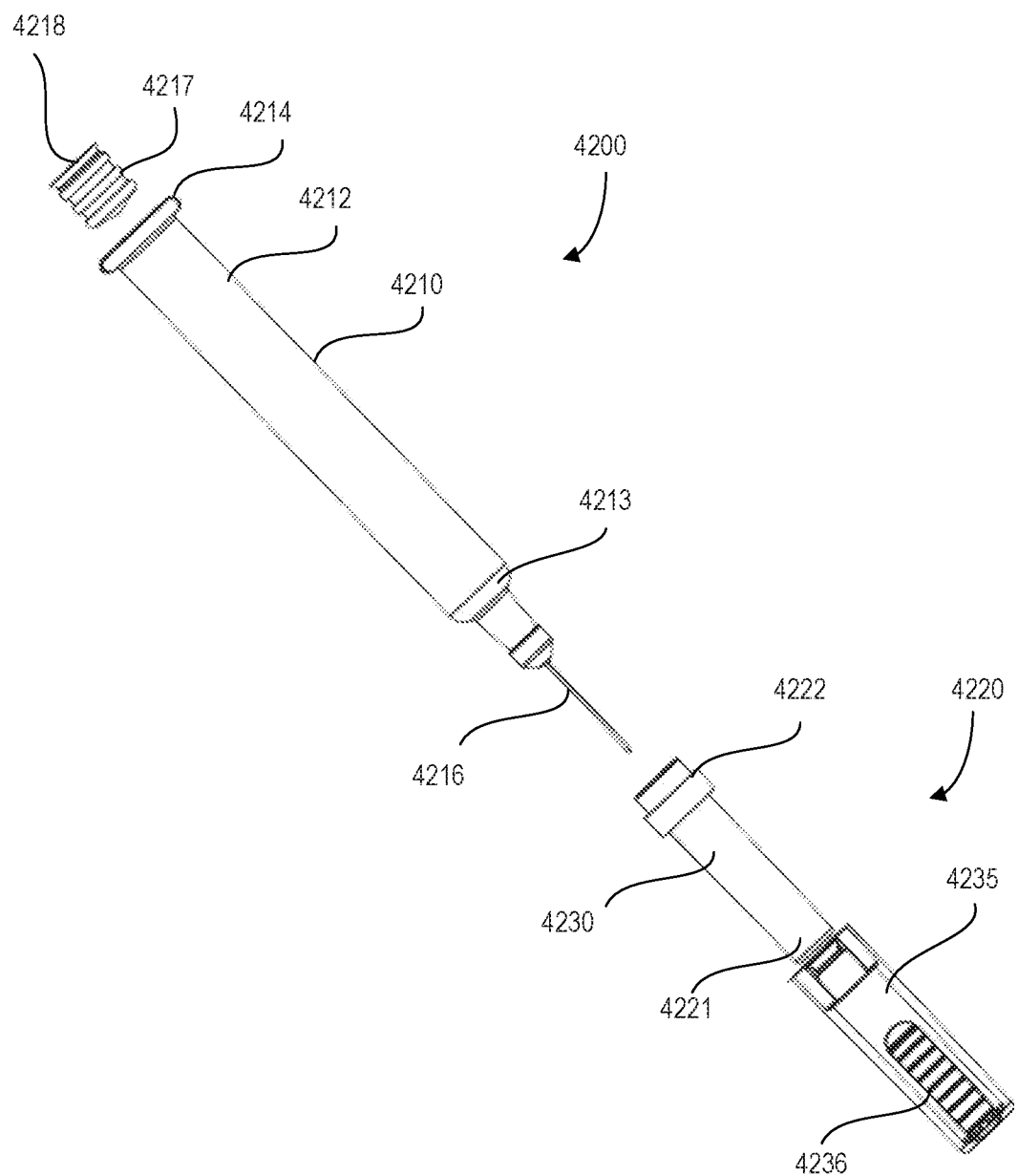
FIG. 19 is an exploded view of a medicament container assembly of the medical injector shown in FIGS. 2 and 3.

FIGS. 9-10 provide an overview of the medicament container assembly 4200, the system actuator assembly 4500, and the medicament delivery mechanism 4300 of the medical injector 4000. Referring to FIG. 19, the medicament container assembly 4200 has a container body 4210 with a distal end portion 4213 and a proximal end portion 4212. The container body 4210 defines a volume that contains (i.e., is filled with or partially filled with) a medicament. The distal end portion 4213 of the medicament container assembly 4200 includes a neck that is coupled to the needle 4216, as described below. The proximal end portion 4212 of the medicament container assembly 4200 includes an elastomeric member 4217 (i.e., a plunger) that seals the medicament within the container body 4210. The elastomeric member 4217 is configured to move within the container body to inject the medicament from the medicament container assembly 4200.

More particularly, as shown in FIG. 13, the elastomeric member 4217 includes a proximal surface 4218 and is coupled to the distal member 4320 of the gas venting assembly 4310. In this manner, as described below, when the pressurized gas is conveyed into the medicament cavity 4139 (or "gas chamber"), the pressure exerts a force on the proximal surface 4218 to move the elastomeric member 4217 within the container body 1210 (i.e., to expel the medicament therefrom). Further, because the elastomeric member 4217 is coupled to the gas venting assembly 4310, movement of the elastomeric member 4217 within the container body 4210 produces movement of at least a portion of the distal member 4320. Similarly stated, when the elastomeric member 4217 is exposed to a force (e.g., produced by the pressurized gas within the gas chamber 4139 acting directly on the proximal surface 4218), movement of the elastomeric member 4217 exerts a force on the distal member 4320. Specifically, distal movement of the elastomeric member 4217 can produce a tensile force on the distal member 4320.

The distal member 4320 can be coupled to the elastomeric member 4217 in any suitable manner. For example, as shown, the proximal surface 4218 receives and/or couples to a protrusion 4323 of the distal member 4320 of the gas venting assembly 4310. In other embodiments, the distal member 4320 can be threadedly coupled to the elastomeric member 4217. In yet other embodiments, the distal member 4320 can be bonded to the elastomeric member 4217 via an adhesive, a weld process, or the like.

The elastomeric member 4217 can be of any design or formulation suitable for contact with the medicament. For example, the elastomeric member 4217 can be formulated to minimize any reduction in the efficacy of the medicament that may result from contact (either direct or indirect) between the elastomeric member 4217 and the medicament. For example, in some embodiments, the elastomeric member 4217 can be formulated to minimize any leaching or out-gassing of compositions that may have an undesired effect on the medicament. In other embodiments, the elastomeric member 4217 can be formulated to maintain its chemical stability, flexibility and/or sealing properties when in contact (either direct or indirect) with the medicament over a long period of time (e.g., for up to six months, one year, two years, five years or longer).

In some embodiments, the elastomeric member 4217 can be constructed from multiple different materials. For example, in some embodiments, at least a portion of the elastomeric member 4217 can be coated. Such coatings can include, for example, polydimethylsiloxane. In some embodiments, at least a portion of the elastomeric member 4217 can be coated with polydimethylsiloxane in an amount of between approximately 0.02 mg/cm$^2$ and approximately 0.80 mg/cm$^2$.

The proximal end portion 4212 of the container body 4210 includes a flange 4214 configured to be disposed within a portion of the carrier body 4360, as described in further detail herein. The flange 4214 can be of any suitable size and/or shape. Although shown as substantially circumscribing the container body 4210, in other embodiments, the flange 4214 can only partially circumscribe the container body 4210.

The medicament container assembly 4200 can have any suitable size (e.g., length and/or diameter) and can contain any suitable volume of the medicament. In some embodiments, the medicament container assembly 4200 (and any of the medicament container assemblies described herein) can be a prefilled (or prefillable) syringe, such as those manufactured by Becton Dickinson, Gerresheimer, Ompi Pharma or others. For example, in some embodiments, the medicament container assembly 4200 (and any of the medicament container assemblies described herein) can be a Becton Dickinson "BD Hypak Physiolis" prefillable syringe containing any of the medicaments described herein. The medical injector 4000 can be configured to inject any suitable dosage such as, for example, a dose of up to 4 mL of any of the medicaments described herein. In other embodiments, the medical injector 4000 can be configured to inject a dose of up to 2 mL, 3 mL, 4 mL, 5 mL, or more of any of the medicaments described herein.

The container body 4210 can be constructed from glass, and can be fitted and/or coupled to any suitable needle. For example, in some embodiments, the container body 4210 can be coupled to a needle having any suitable size. Any of the medicament container assemblies and/or prefilled syringes described herein can be coupled to a needle having a gauge size of 21 gauge, 22 gauge, 23 gauge, 24 gauge, 25 gauge, 26 gauge, 27 gauge, 28 gauge, 29 gauge, 30 gauge, or 31 gauge. Any of the medicament container assemblies and/or prefilled syringes described herein can be coupled to a needle having any suitable length, such as, for example, a length of about 0.2 inches, about 0.27 inches, about 0.38 inches, about 0.5 inches, about 0.63 inches, about 0.75 inches, or more. In some embodiments, for example, any of the medicament containers and/or prefilled syringes described herein can be coupled to a 29 gauge, needle having a length of approximately 0.5 inches.

As shown in FIG. 19, the medicament container assembly 4200 includes a needle sheath assembly 4220, that includes a sheath body 4230 and a sheath cover 4235. The needle sheath assembly 4220 includes a distal end portion 4221 and a proximal end portion 4222. The sheath body 4230 defines a bore that receives the needle 4216 and/or a distal end portion of the 4213 of the medicament container body 4210. The inner portion of the sheath body 4230 defines a friction fit with the distal end portion 4213 of the medicament container body 4210. In this manner, the needle sheath assembly 4220 can protect the user from the needle 4216 and/or can keep the needle 4216 sterile before the user actuates the medical injector 4000.

The sheath cover 4235 is disposed about (and surrounds) the sheath body 4230. The sheath cover 4235 includes a series of ribs 4236 that engage the tabs 4722 of the safety lock 4700 (see e.g., FIGS. 12 and 14). Specifically, the distal end portion 4812 of the sheath assembly 4220 is configured to be inserted into a space defined between the tabs 4722 of the engagement members 4721 of the safety lock 4700. The tabs 4722 are angled and/or bent towards the distal direction to allow the distal end portion 4812 of the sheath assembly 4220 to move between the engagement members 4721 in a distal direction, but not in a proximal direction. Similarly stated, the tabs 4722 include an edge that contacts the ribs 4236 of the sheath cover 4235 to prevent the safety lock 4700 from moving in a distal direction relative to the needle sheath 4810. In this manner, the needle sheath assembly 4220 is removed from the needle 4216 when the safety lock 4700 is moved in a distal direction with respect to the housing 4100.

The delivery mechanism 4300 includes a gas vent assembly 4310 (also referred to as an expandable assembly), but does not rely on a piston or rigid member to move the elastomeric member 4217 within the container body 4210 to inject the medicament. Rather, the elastomeric member 4217 is moved by the force produced by the pressurized gas within the gas chamber (or medicament cavity 4139). Accordingly, the stroke length and/or the dosage amount can be set by the expanded length of the gas vent assembly 4310.

In this manner, the length of the medicament container assembly 4200 and the length of the gas vent assembly 4310 can be configured such the desired dosage amount is delivered. Moreover, because the gas vent assembly 4310 moves from a collapsed to an expanded configuration, the medicament delivery mechanism 4300 can fit within the same housing 4100 regardless of the fill volume, the delivery volume and/or the ratio of the fill volume to the delivery volume. In this manner, the same housing and production tooling can be used to produce devices having various dosages of the medicament. For example, in a first embodiment (e.g., having a fill volume to delivery volume ratio of 0.4), the medicament container has a first length and the second movable member has a first length. In a second embodiment (e.g., having a fill volume to delivery volume ratio of 0.6), the medicament container has a second length shorter than the first length, and the second movable member has a second length longer than the first length. In this manner, the stroke of the device of the second embodiment is longer than that of the device of the first embodiment, thereby allowing a greater dosage. The medicament container of the device of the second embodiment, however, is shorter than the medicament container of the device of the first embodiment, thereby allowing the components of both embodiments to be disposed within the same housing and/or a housing having the same length.

In some embodiments, the device 4000 is configured such that a ratio of the housing length $L_H$ to the container length $L_C$ (which includes the needle extending from the end of the container body) is less than about 1.5. In other embodiments, the device 4000 is configured such that a ratio of the housing length $L_H$ to the container length $L_C$ is less than about 1.25. In yet other embodiments, the device 4000 is configured such that a ratio of the housing length $L_H$ to the container length $L_C$ is less than about 1.1.

In some embodiments, the device 4000 is configured such that a ratio of the housing length $L_H$ to a sum of the container length $L_C$, the carrier distance, and the stroke is less than about 1.1. In other embodiments, the device 4000 is configured such that a ratio of the housing length $L_H$ to a sum of the container length $L_C$, the carrier distance, and the stroke is less than about 1.0. In yet other embodiments, the device 4000 is configured such that a ratio of the housing length $L_H$ to a sum of the container length $L_C$, the carrier distance, and the stroke is less than about 0.9.

Figure 27:
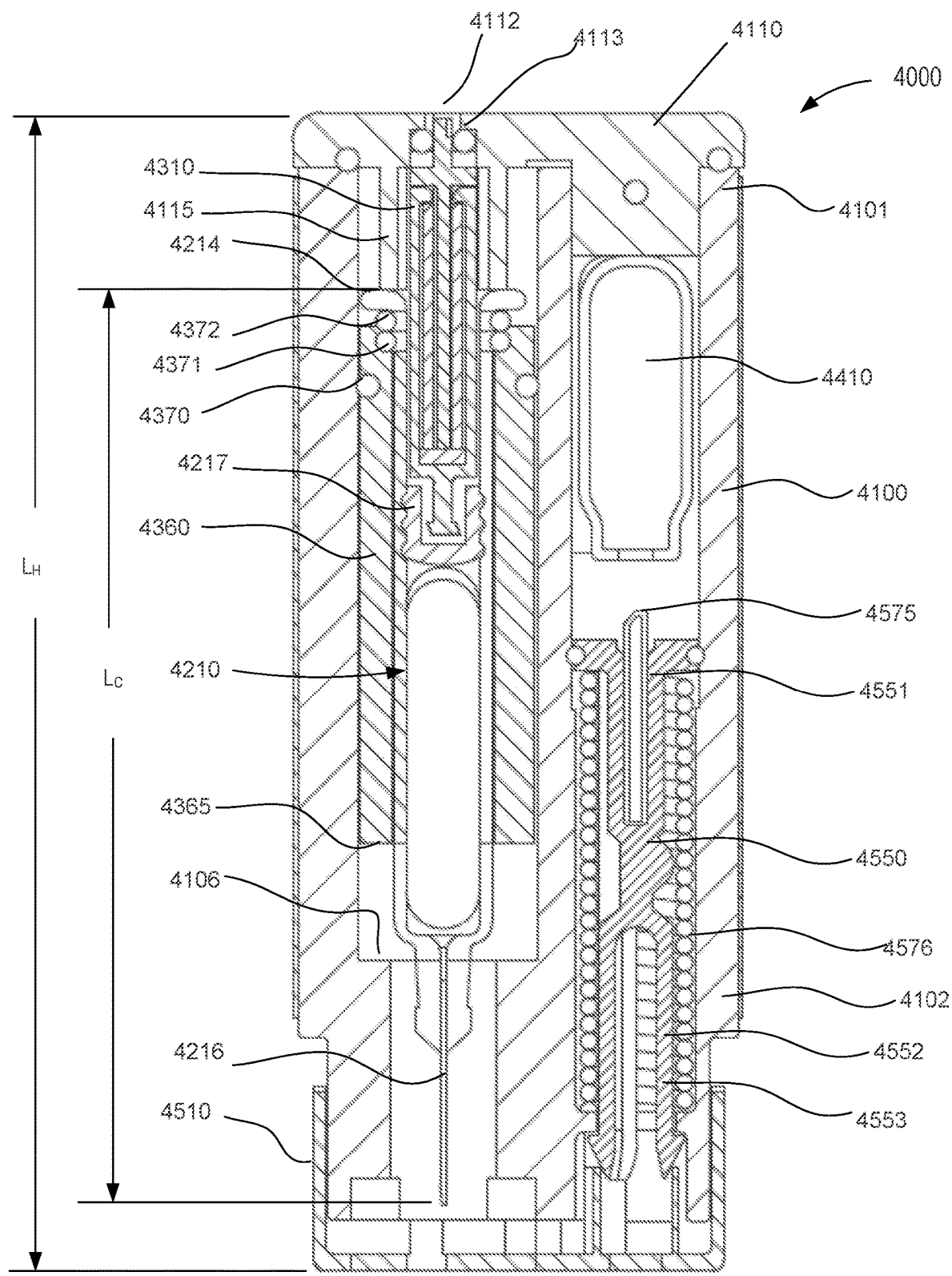
FIG. 27 is a front cross-sectional view of the medical injector shown in FIGS. 2 and 3, in a second configuration (safety lock removed).
Figure 28:
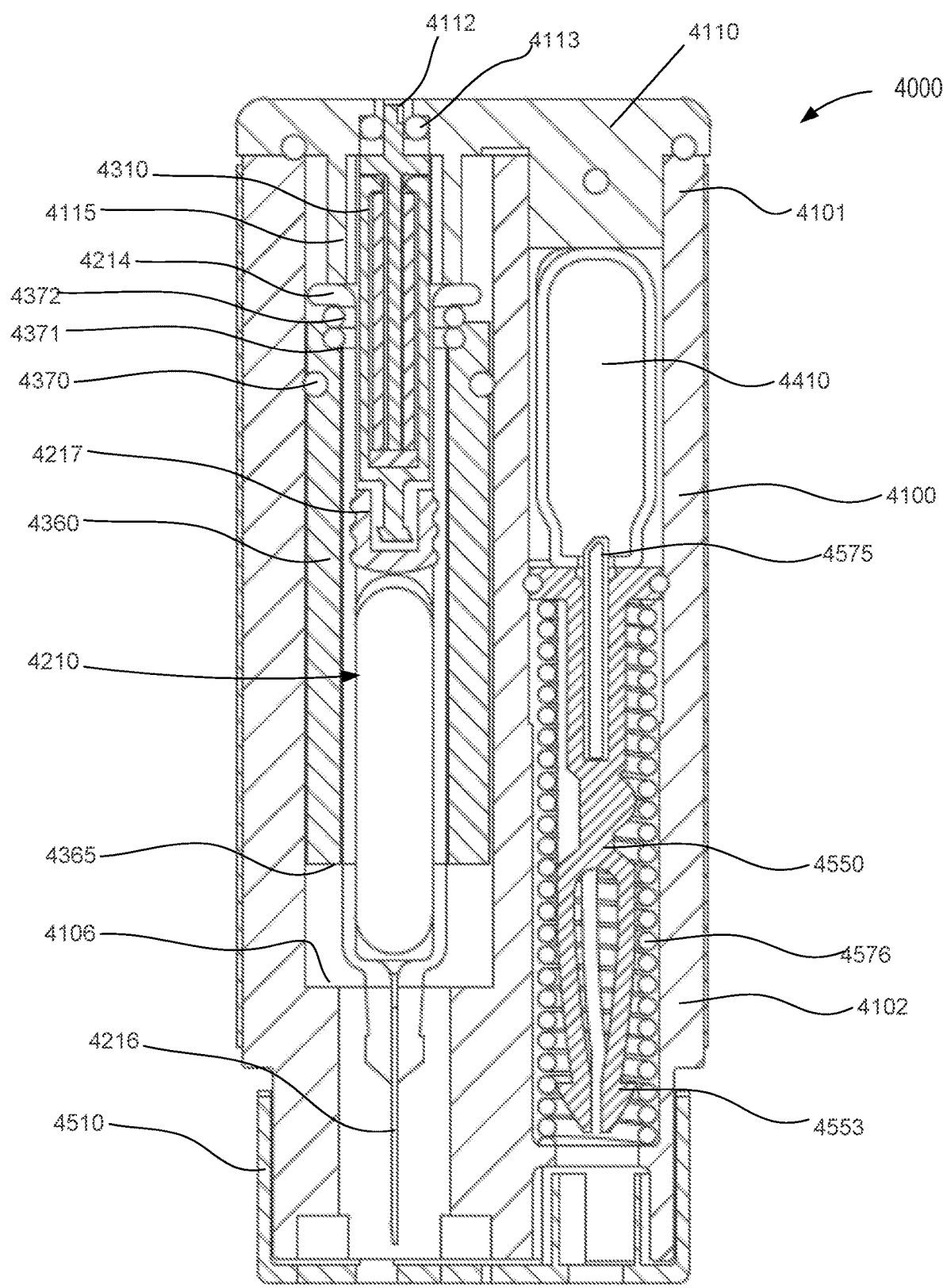
FIG. 28 is a front cross-sectional view of the medical injector shown in FIGS. 2 and 3, in a third configuration (actuated).

As shown in FIGS. 9, 10 and 27, the system actuator assembly 4500 includes the base 4510, a release member 4550 and a spring 4576. FIG. 10 shows certain internal components of the medical injector 4000 without the base 4510 and the safety lock 4700 so that the release member 4550 can be more clearly shown. The release member 4550 has a proximal end portion 4551 and a distal end portion 4552, and is movably disposed within the distal end portion of the gas container cavity 4151. The proximal end portion of the release member 4550 includes a sealing member 4574 and a puncturer 4575. The sealing member 4574 is configured to engage the sidewall of the housing 4100 defining the gas container cavity 4151 such that the proximal end portion of the gas container cavity 4151 is fluidically isolated from the distal end portion of the gas container cavity 4151. In this manner, when gas is released from the gas container 4410, the gas contained in the proximal end portion of the gas container cavity 4151 is unable to enter the distal end portion of the gas container cavity 4151. The puncturer 4575 of the release member 4550 is configured to contact and puncture a frangible seal 4413 on the gas container 4410 when the release member 4550 moves proximally within the gas container cavity 4151.

The distal end portion 4552 of the release member 4550 includes extensions 4553. The extensions 4553 have projections that include tapered surfaces and engagement surfaces. Further, the extensions 4553 define an opening between the adjacent extensions 4553. The engagement surfaces are configured to extend through the release member aperture and contact the release member contact surface of the housing 4100, as shown in FIG. 27. In this manner, the engagement surfaces limit proximal movement of the release member 4550.

The opening defined by the extensions 4553 is configured to receive the safety lock protrusion 4702 of the safety lock 4700 (see e.g., FIGS. 12 and 14) when the safety lock 4700 is coupled to the housing 4100 and/or the base 4510. The safety lock protrusion 4702 is configured to prevent the extensions 4553 from moving closer to each other. Said another way, the safety lock protrusion 4702 is configured to ensure that the extensions 4553 remain spaced apart and the engagement surfaces remain in contact with the release member contact surface of the housing 4100. In some embodiments, for example, the release member 4550 and/or the extensions 4553 can be constructed from any suitable material configured to withstand deformation that may occur when exposed to a load over an extended period of time.

The tapered surfaces of the extensions 4553 are configured to contact corresponding tapered surfaces 4557 of the base 4510 when the base 4510 is moved proximally relative to the housing 4100. Accordingly, when the base 4510 is moved proximally relative to the housing 4100, the extensions 4553 are moved together by the tapered surfaces. The inward movement of the extensions 4553 causes the release member 4550 to disengage the release member contact surface 4126 of the housing 4100, thereby allowing the release member 4550 to be moved proximally along its longitudinal axis as the spring 4576 expands (see FIG. 30).

The gas container 4410 includes a distal end portion 4411 and a proximal end portion 4412, and is configured to contain and/or produce a pressurized gas. The distal end portion 4411 of the gas container 4410 contains a frangible seal 4413 configured to break when the puncturer 4575 of the release member 4550 contacts the frangible seal 4413. The gas container retention member 4180 of the proximal cap 4110 of the housing 4100 is configured to receive and/or retain the proximal end portion 4412 of the gas container 4410. Said another way, the position of the gas container 4410 within the gas container cavity 4151 is maintained by the gas container retention member 4180. As shown in FIGS. 9 and 10, the length of the gas container retention member 4180 and the length of the release member 4550 collectively determine the distance between the puncturer 4575 and the frangible seal 4413 when the medical injector 4000 is in the storage configuration. Accordingly, this distance, which is the distance through which the puncturer 4575 travels when the medical injector 4000 is actuated, can be adjusted by changing the length of the gas container retention member 4180 and/or the length of the release member 4550. In some embodiments, the actuation time and/or the force exerted by the puncturer 4575 on the frangible seal 4413 can be adjusted by changing the distance between the puncturer 4575 and the frangible seal 4413.

Figure 16:
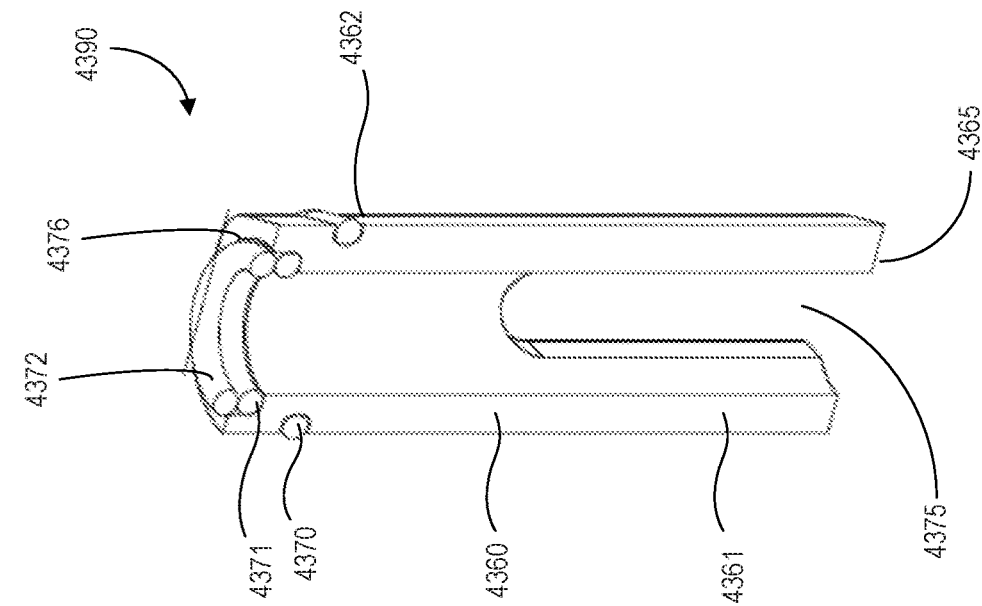
FIGS. 15 and 16 are a perspective view and a cross-sectional view, respectively, of a carrier assembly of the medical injector shown in FIGS. 2 and 3.
Figure 15:
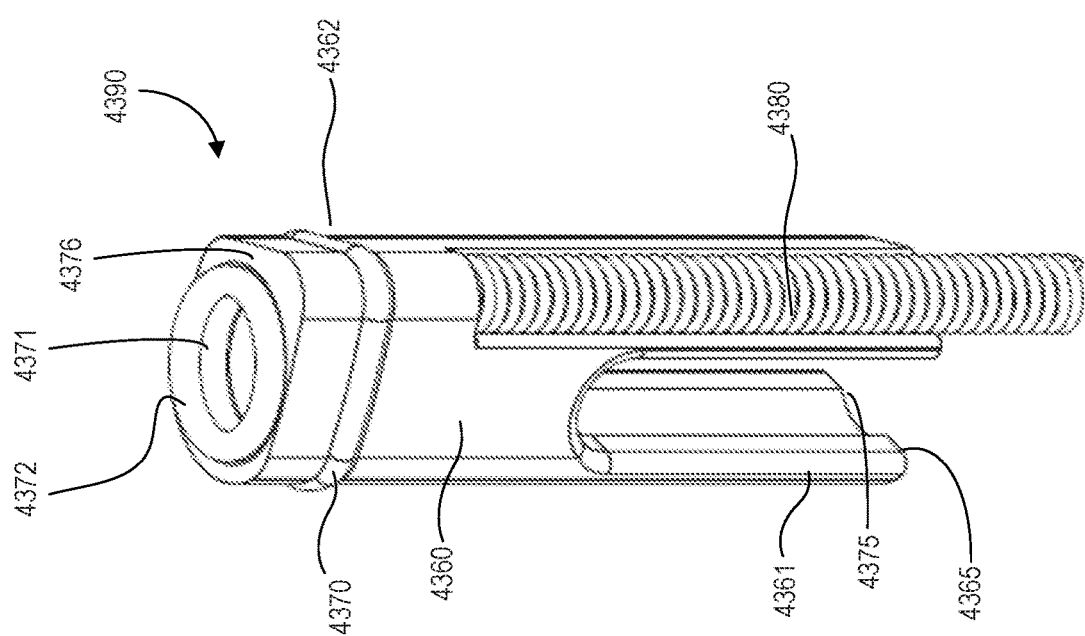
Figure 18:
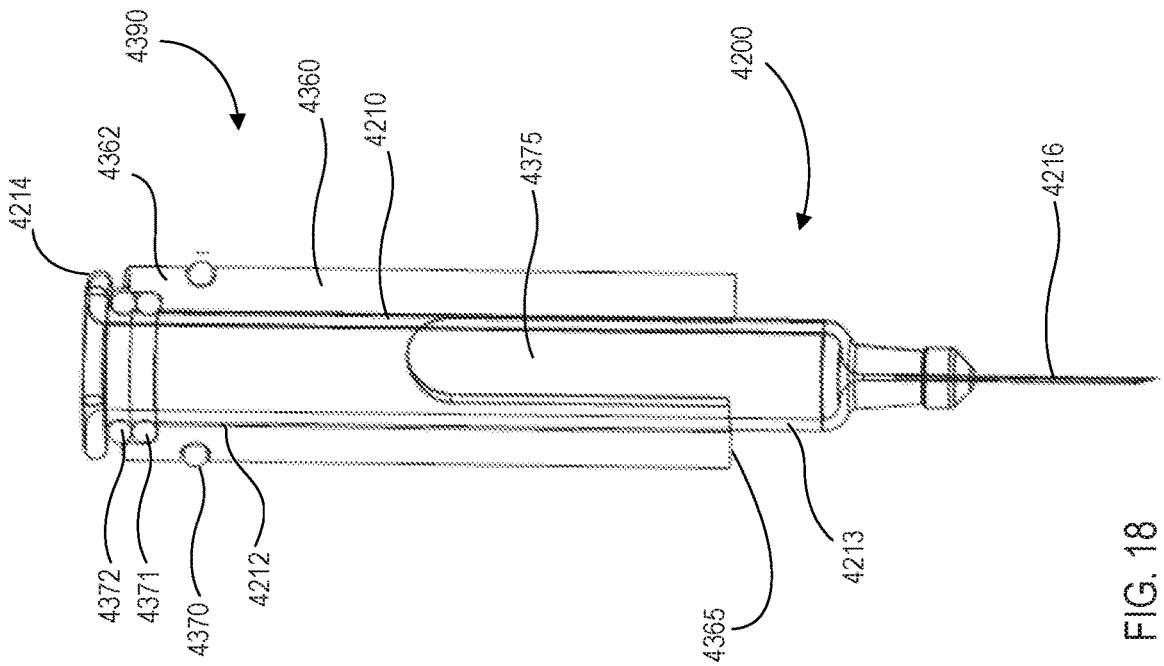
FIG. 18 is a cross-sectional view of the carrier assembly and a medicament container of the medical injector shown in FIGS. 2 and 3.
Figure 17:
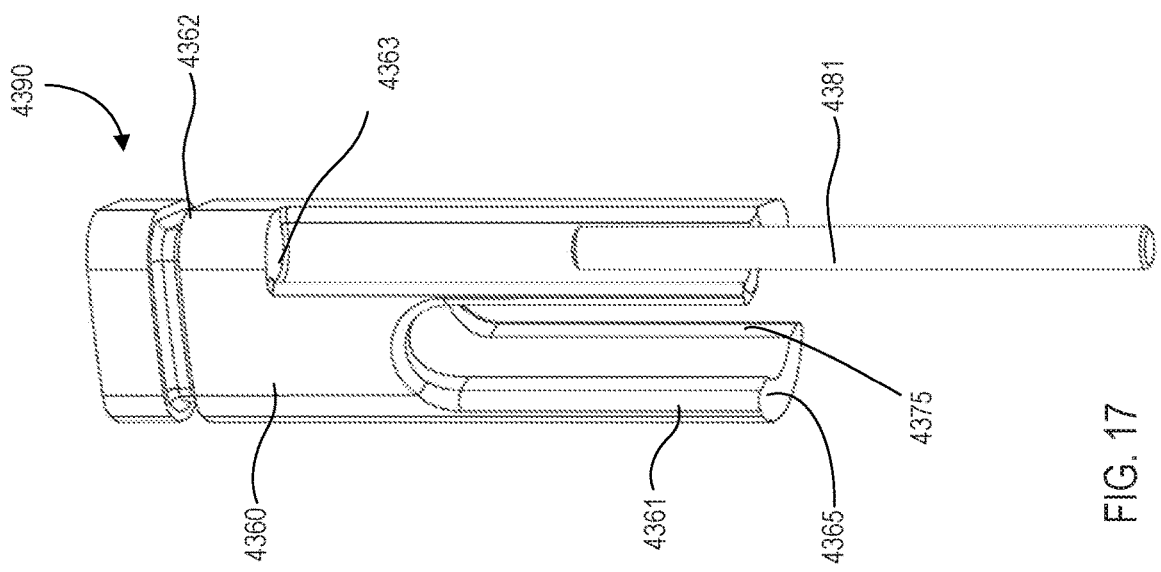
FIG. 17 is a perspective view of the carrier assembly of the medical injector shown in FIGS. 2 and 3.

The medicament delivery mechanism 4300 includes a carrier assembly 4390 and a gas vent assembly 4310. The carrier assembly 4390 and the gas vent assembly 4310 are each movably disposed within the medicament cavity 4139 of the housing 4100. As shown in FIGS. 15-17, the carrier assembly 4390 includes a carrier body 4360 and a retraction spring 4380. The carrier body 4360 includes a proximal end portion 4362 and a distal end portion 4361. The proximal end portion 4362 of the carrier body 4360 defines an opening within which the medicament container body 4210 is disposed. The proximal end portion 4362 also includes a proximal surface 4376, forms a portion of the boundary of the gas chamber (i.e., the portion of the medicament cavity 1139 within which the pressurized gas flows). In this manner, the pressurized gas produces a force on the proximal surface 4376, which moves the carrier assembly 4390 distally within the housing 4110.

An inner surface of the proximal end portion 4362 defines a groove within which a first O-ring 4371 and a second O-ring 4372 are disposed. The first O-ring 4371 and the second O-ring 4372 are disposed between a top surface of the carrier body 4360 and the flange 4214 of the medicament container body 4210. In this manner, the first O-ring 4371 and the second O-ring 4372 form a substantially fluid-tight seal. Accordingly, when pressurized gas flows into the proximal portion of the medicament cavity 4139 (i.e., the gas chamber), the area between the inner surface of the carrier body 4360 and the medicament container body 4210 is sealed. The first O-ring 4371 and the second O-ring 4372 also dampen any impact on the flange 4214.

An outer surface of the carrier body 4360 defines an O-ring groove and includes an outer O-ring 4370. The outer surface is configured to slide within the medicament cavity 4139, and the O-ring 4370 and an inner surface of the housing 4100 define a form a substantially fluid-tight seal. Accordingly, when pressurized gas flows into the proximal portion of the medicament cavity 4139, the area between the outer surface of the carrier body 4360 and the inner surface of the housing 4100 is sealed. The outer O-ring 4370 is in a fixed location relative to each of the inner O-rings 4371, 4372. In other embodiments, however, a carrier assembly can include components that move relative to each other such that an outer seal member moves relative to an inner seal member.

The distal end portion 4361 of the carrier body 4360 has an open end. Thus, as shown in FIGS. 24 and 25, the distal end portion 4213 of the medicament container body 4210 extends beyond the carrier body 4360. Additionally, the distal end portion 4361 of the carrier body 4360 includes two extensions (or "legs") that collectively define an opening 4375. This opening is configured to align with the status apertures 4130, 4160 of the housing to allow viewing of the medicament within the medicament container assembly, the elastomeric member 4217 or the like. The distal end portion 4361 also includes an end surface 4365 configured to contact the shoulder 4106 of the housing 4100 (see e.g., FIG. 30) when the needle 4216 has been inserted a desired distance.

The retraction spring 4380 is disposed within a spring pocket 4363 defined by the outer surface of the carrier body 4360, as shown in FIG. 17. The retraction spring 4380 is disposed about a spring pin 4381 that limits buckling or other lateral movement of the retraction spring 4380 during use.

The gas vent assembly 4310 is configured to expand and/or change configurations during operation of the medical injector 4100, and selectively produces a pathway through which pressurized gas escapes the medicament cavity 4139 after delivery of the medicament. By releasing or removing the force from the carrier body 4360 and/or the medicament container assembly 4200, the retraction spring 4380 can move the carrier body 4360 proximally to retract the needle 4216. Notably, the gas vent assembly 4310 does not exert a distal force on the elastomeric member 4217, but rather, is carried distally by the elastomeric member 4217 during delivery of the medicament. Thus, this arrangement is considered a "pistonless" delivery system, because the force for insertion and medicament delivery is provided by the pressurized gas acting directly upon the medicament container assembly 4200 (e.g., the proximal surface 4218 of the elastomeric member 4217) and/or the carrier assembly 4390 (e.g., the proximal surface 4376 of the carrier body 4360).

Figure 20:
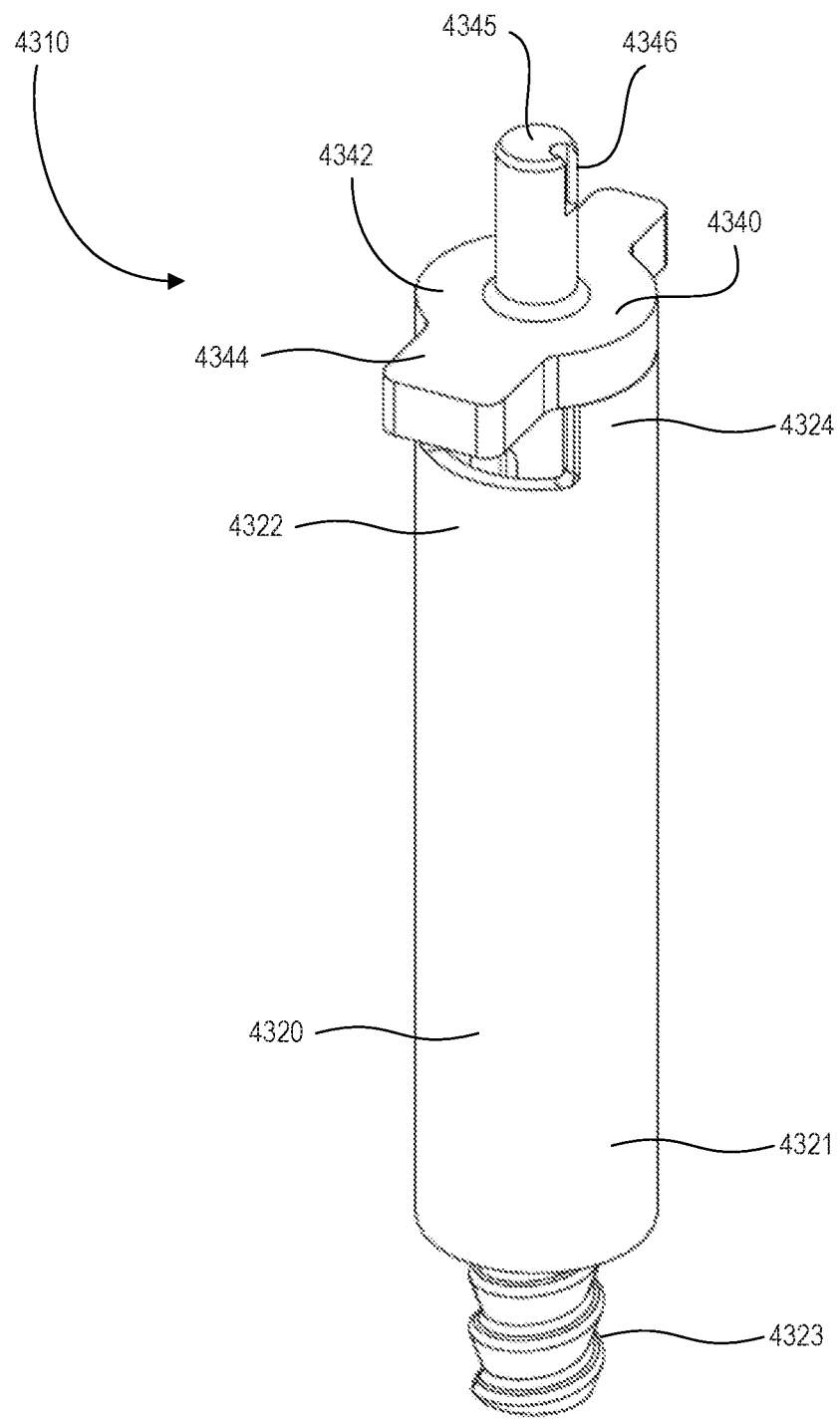
FIG. 20 is a perspective view of a gas vent assembly of the medical injector shown in FIGS. 2 and 3.
Figure 21:
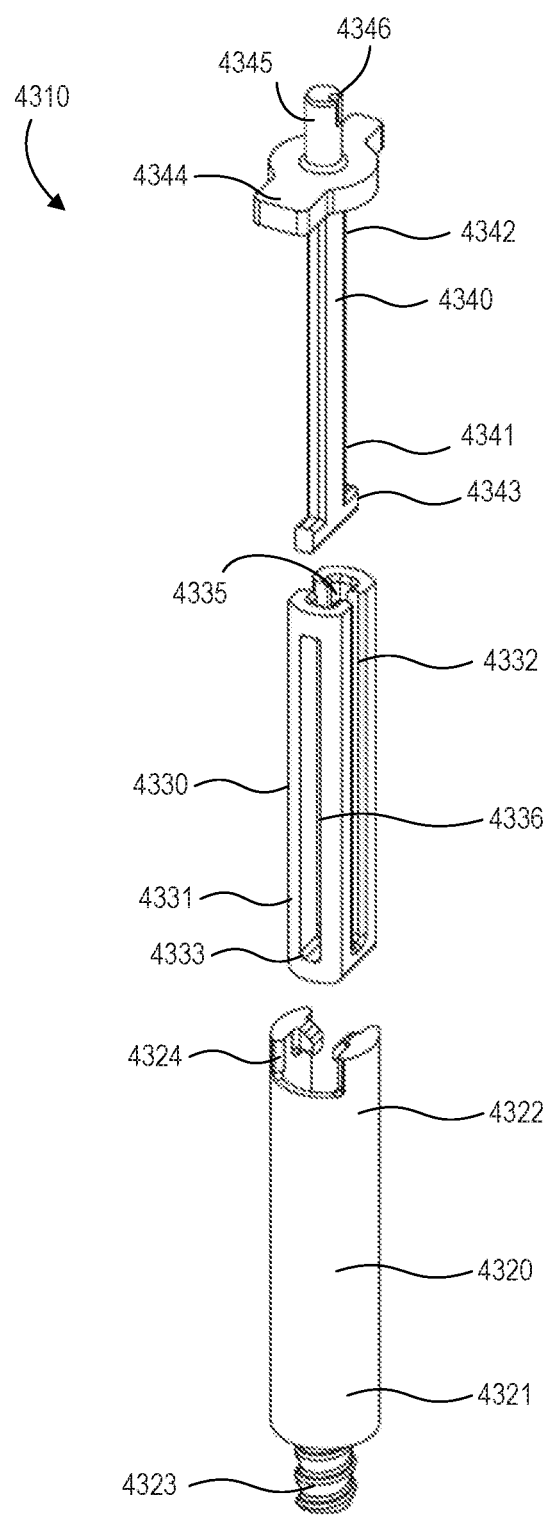
FIGS. 21 and 22 are exploded views of the gas vent assembly of the medical injector shown in FIGS. 2 and 3.

As shown in FIGS. 20-22, the gas vent assembly 4310 includes a first (or distal) member 4320, a second (or central) member 4330 and a third (or proximal) member 4340. These components are nested together such that the gas vent assembly 4310 can be transitioned from a collapsed configuration (FIG. 12) to an expanded configuration (FIG. 33), and a series of partially expanded configurations therebetween. When the gas vent assembly 4310 is in the expanded configuration (FIG. 33, after delivery of the medicament), the opening 4112, the O-ring 4113 and the passageway 4346 collectively allow the gas to escape the medicament cavity 4139, such that needle retraction can occur.

The first member 4320 includes a proximal end portion 4322 and a distal end portion 4321. The distal end portion 4321 includes a protrusion 4323 configured to matingly engage the elastomeric member 4217. In this manner, movement of the elastomeric member 4217 distally causes movement of first member 4320 distally. The proximal end portion 4322 includes a pair of retention walls 4324 configured to engage a corresponding distal end surface 4333 of the second (or central) member 4330. More particularly, the first member 4320 defines an opening within which the second member 4330 can slide. The retention walls 4324 limit movement of the second member 4330.

The second member 4330 includes a proximal end portion 4332 and a distal end portion 4331. The distal end portion 4331 includes the distal end surface 4333 that engages the first member 4320. The second member defines an opening 4335 and a pair of side grooves 4336. The third (or proximal) member 4340 is movably disposed within the opening 4335. In particular, the distal protrusions 4343 of the third member 4340 slide within the side grooves 4336 and contact the proximal end portion 4332 to limit movement of the third member 4340 within the second member 4330.

The third member 4340 includes a proximal end portion 4342 and a distal end portion 4341. The distal end portion 4341 includes the distal protrusions 4343 that engage the second member 4320. The proximal end portion 4342 includes a guide surface 4344 and a valve portion 4345. The guide surface 4344 slides within the slots 4116 of the guide wall 4115. The valve portion 4345 defines a passageway 4346.

Figure 12:
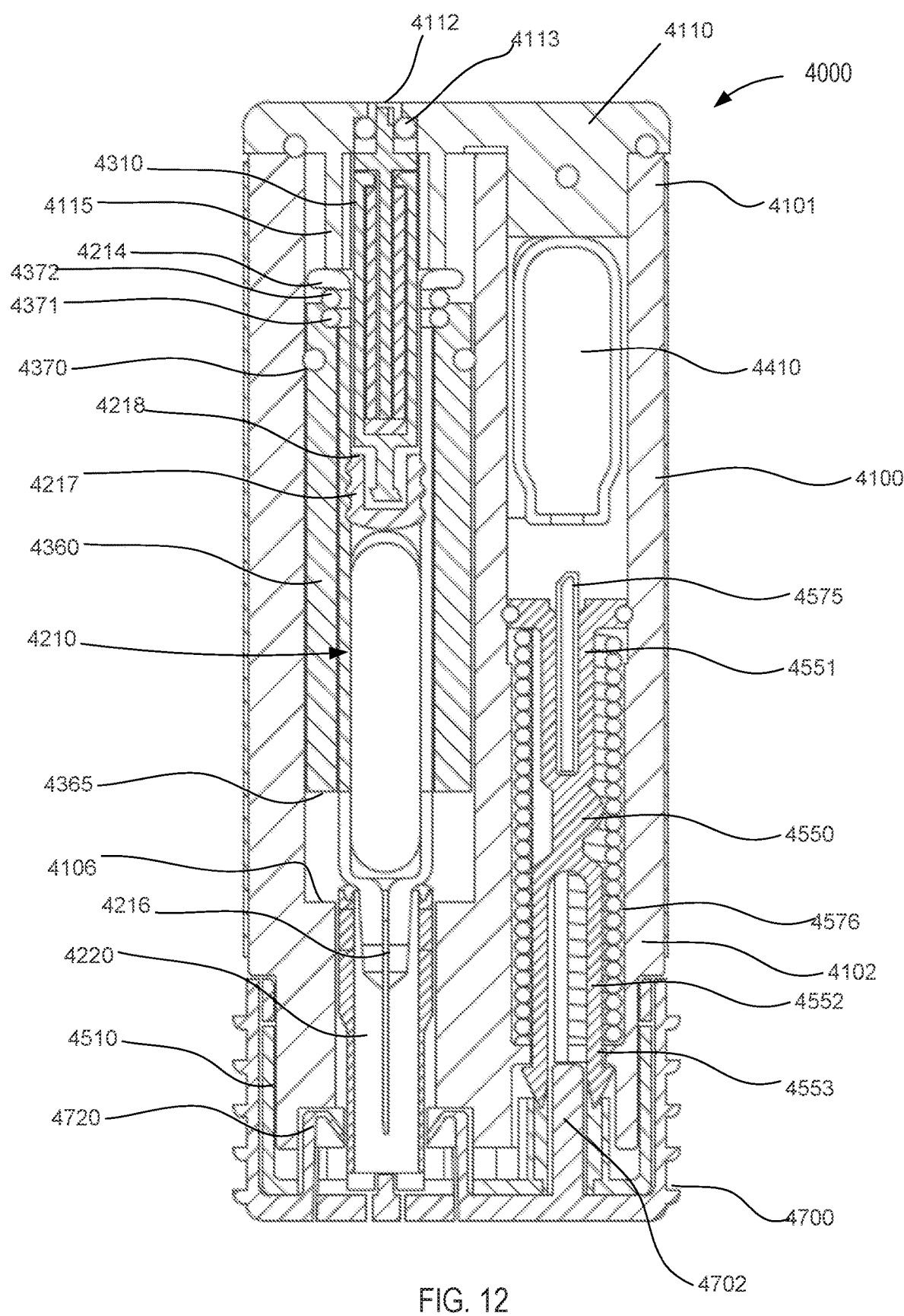
FIG. 12 is a front cross-sectional view of the medical injector shown in FIGS. 2 and 3, in the first configuration.

As shown in FIGS. 12, 23 and 24, the safety lock 4700 includes a safety lock protrusion 4702 and an engagement portion 4720. As described above, when the safety lock 4700 is in a first (locked) position, the safety lock protrusion 4702 is configured to be disposed in the opening defined by the extensions 4553 of the release member 4550. Accordingly, the safety lock protrusion 4702 is configured to prevent the extensions 4553 from moving closer to each other, thereby preventing proximal movement of the release member 4550 and/or delivery of the medicament.

The engagement portion 4720 of the safety lock 4700 includes engagement members 4721 that extend in a proximal direction. The engagement members 4721 have tabs 4722 that extend from a surface of the engagement members. The tabs 4722 engage the ribs 4236 of the sheath cover 4235 to limit relative movement between the safety lock 4700 and the needle sheath assembly 4220, as described above. In this manner, the needle sheath assembly 4220 can protect the user from the needle 4216 and/or can keep the needle 4216 sterile before the user actuates the medical injector 4000, and the needle sheath assembly 4220 can be removed from about the needle 4216 when the safety lock 4700 is removed.

The outer surface of the safety lock 4700 include a grip portion (lateral ribs) and indicia thereon. The grip portion provides an area for the user to grip and/or remove the safety lock 4700 from about the housing 4100. The indicia provide instruction on how to remove the safety lock 4700. In some embodiments, for example, indicia can indicate the direction the user should pull the safety lock 4700 to remove the safety lock 4700.

FIGS. 25 and 26 show the base (or actuator) 4510 of the medical injector 4000. The base 4510 includes a proximal (or inner) surface 4511, a distal (or outer) surface 4523 and base connection knobs 4518. The distal surface 4523 is disposed against a target surface (not shown) during use of the injector 4000. As described below, the housing 4100 is moved distally relative to the base 4510 and/or the distal surface 4523, thereby causing the base 4510 to move proximally relative to the housing 4100 to actuate the medical injector 4000. The base 4510 defines a needle aperture 4513 and a safety lock protrusion aperture 4514. The needle aperture 4513 is configured to receive the needle 4216 when the medical injector 4000 is actuated. The safety lock protrusion aperture 4514 of the base 4510 receives the safety lock protrusion 4702 of the safety lock 4700 when the safety lock 4700 is coupled to the housing 4100 and/or the base 4510.

The proximal surface 4511 of the base 4510 includes guide members (not shown) and protrusions 4515. The guide members of the base 4510 engage and/or slide within the base rail grooves 4114 of the housing 4100, as described above. The protrusions 4515 of the base 4510 engage the tapered surfaces of the extensions 4553 of the release member 4550. As described in further detail herein, when the safety lock 4700 is removed and the base 4510 is moved in a proximal direction with respect to the housing 4100, the protrusions 4515 of the base 4510 are configured to move the extensions 4553 of the release member 4550 closer to each other, actuating the medicament delivery mechanism 4300. As described above, the base connection knobs 4518 engage the base retention recesses 4134 in a way that allows proximal movement of the base 4510 but limits distal movement of the base 4510.

Figure 11:
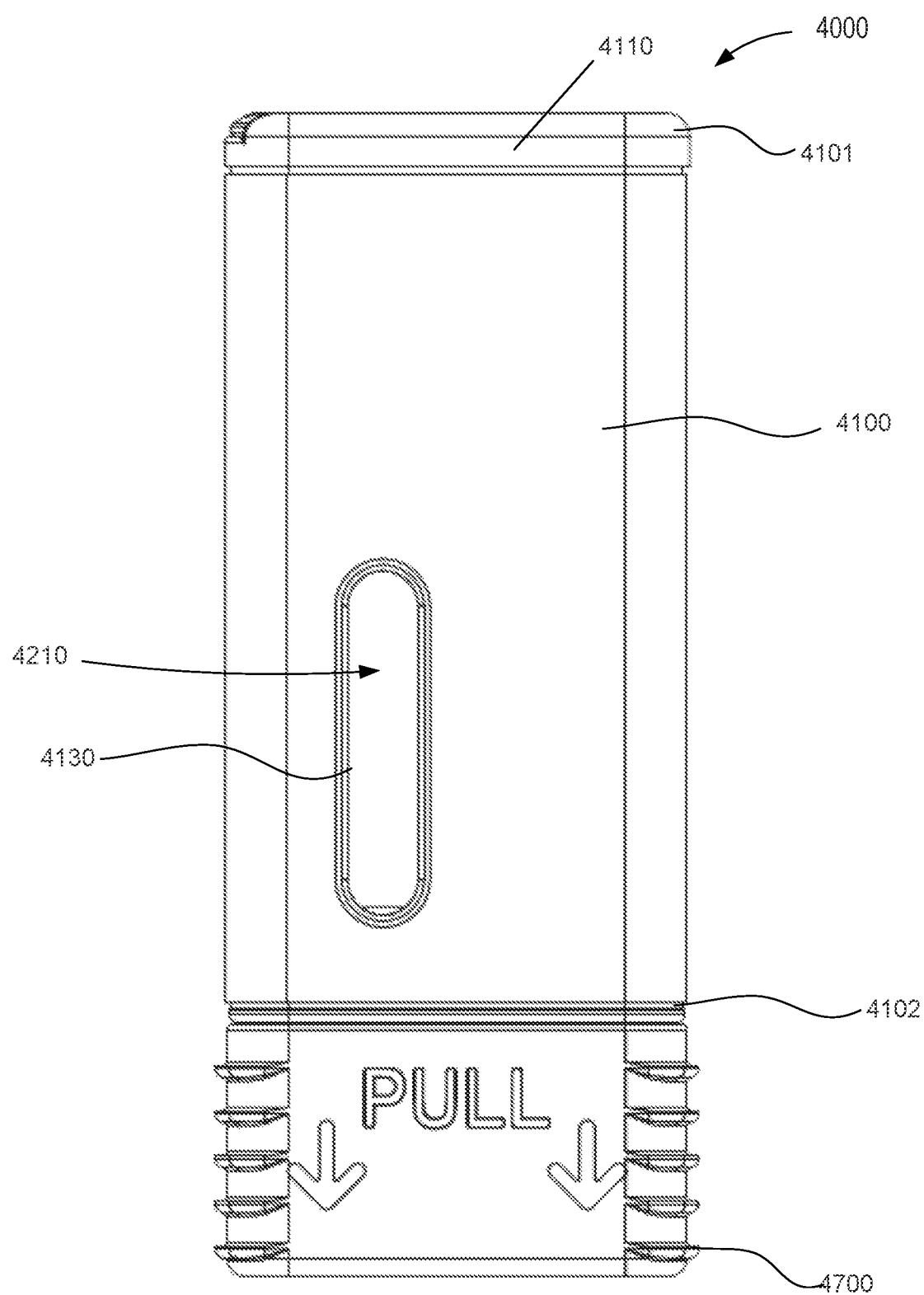
FIG. 11 is a front view of the medical injector shown in FIGS. 2 and 3, in the first configuration.

The medical injector 4000 can be moved from the first configuration (FIGS. 11 and 12) to a second configuration (FIG. 27) by moving the safety lock 4700 from a first position to a second position. The safety lock 4700 is moved from a first position to a second position by moving and/or removing the safety lock 4700 distally with respect to the housing 4100. When the safety lock 4700 is moved from the first position to the second position, the safety lock protrusion 4702 is removed from between the extensions 4553 of the release member 4550, thereby enabling the medicament delivery mechanism 4300. As shown in FIG. 11, prior to actuation, a portion of the medicament container assembly 4200 can be viewed via the status aperture 4130. Specifically, the container body 4210 and the contents therein (e.g., the medicament) can be viewed. As described above, in some embodiments, the housing 4100 can include a label or other indicia providing a color strip (against which the medicament can be compared), instructions for viewing or the like. Although not shown in FIG. 11, in some embodiments, a portion of the elastomeric member 4217 is visible via the status aperture 4130.

After the safety lock 4700 is moved from the first position to the second position, the medical injector 4000 can be moved from the second configuration (FIG. 27) to a third configuration (FIG. 28) by moving the base 4510 from a first position to a second position. Similarly stated, the medical injector 4000 can be actuated by the system actuator assembly 4500 by moving the base 4510 proximally relative to the housing 4100. The base 4510 is moved from its first position to its second position by placing the medical injector 4000 against the body of the patient and moving the base 4510 with respect to the housing 4100. Specifically, as described above the base includes a "contact portion" (i.e., the distal surface 4523) that can be placed against and/or in contact with the target location. Moving the base 4510 from the first position to the second position causes the base 4510 to engage the extensions 4553 of the release member 4550, thereby moving the extensions 4553 together. The inward movement of the extensions 4553 causes engagement surface of the release member 4550 to become disengaged from the housing 4100, thereby allowing the release member 4550 to be moved proximally along its longitudinal axis as the spring 4576 expands.

Figure 29:
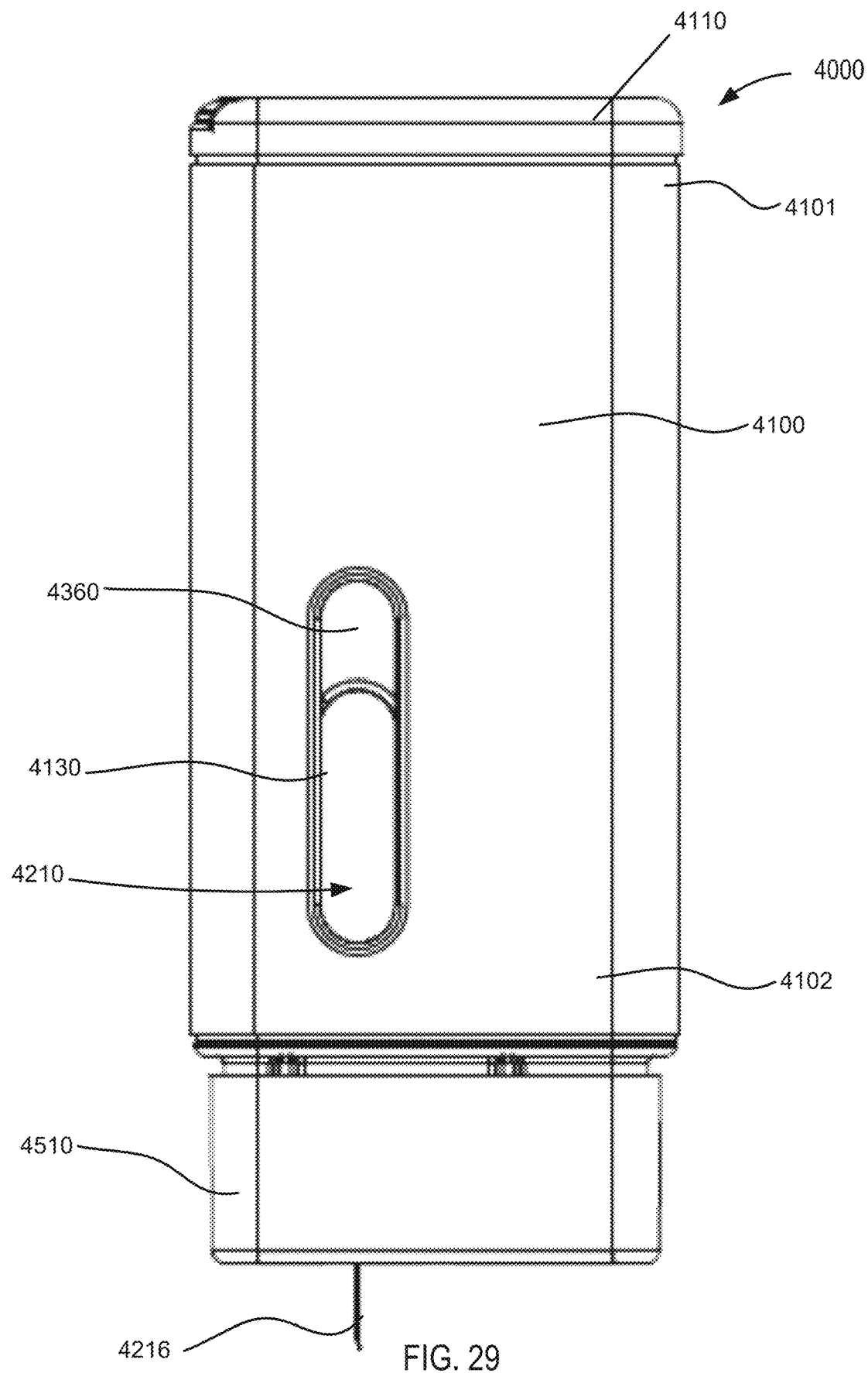
FIG. 29 is a front view of the medical injector shown in FIGS. 2 and 3, in a fourth configuration (needle inserted).
Figure 30:
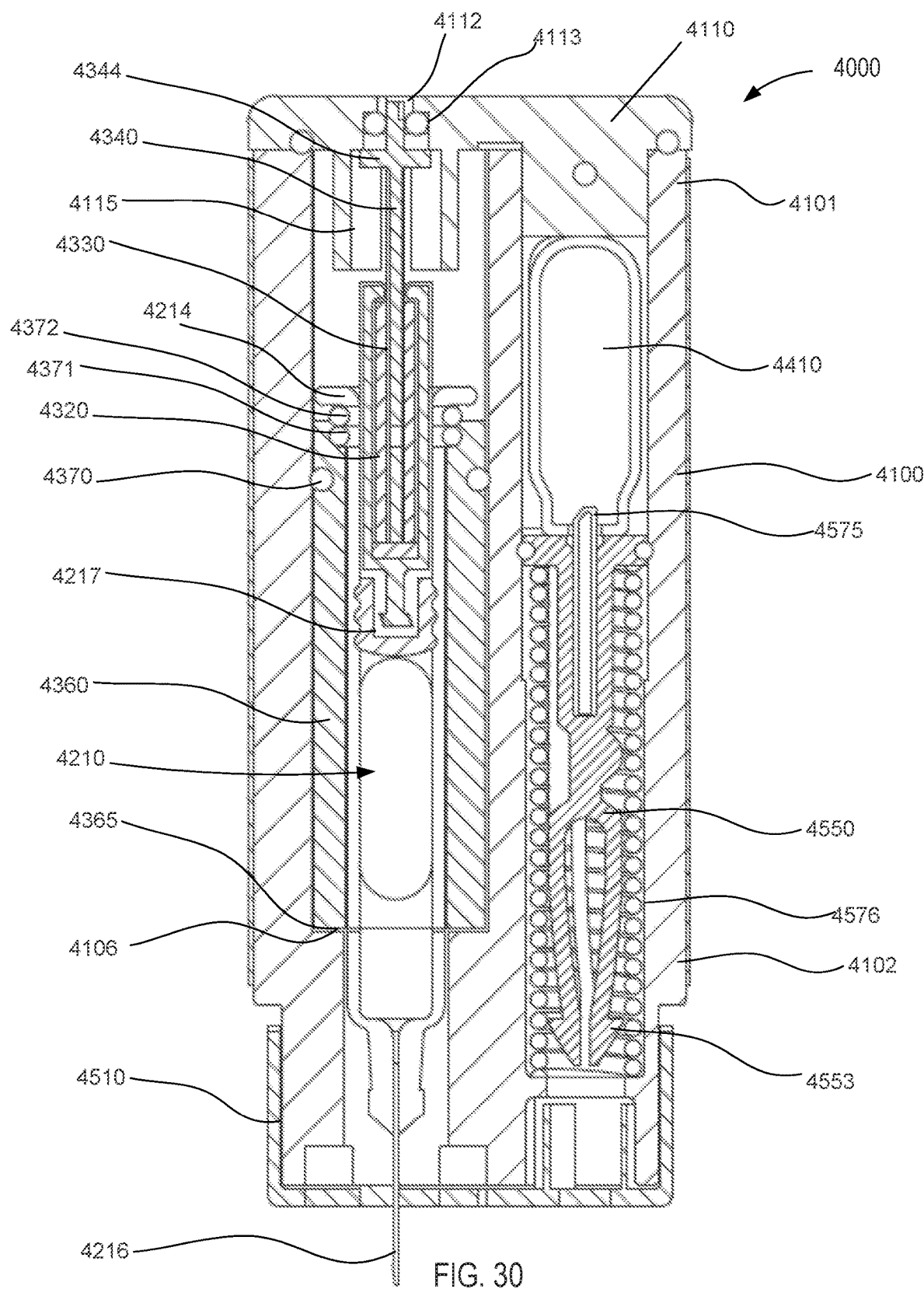
FIG. 30 is a front cross-sectional view of the medical injector shown in FIGS. 2 and 3, in the fourth configuration (needle inserted).
Figure 31:
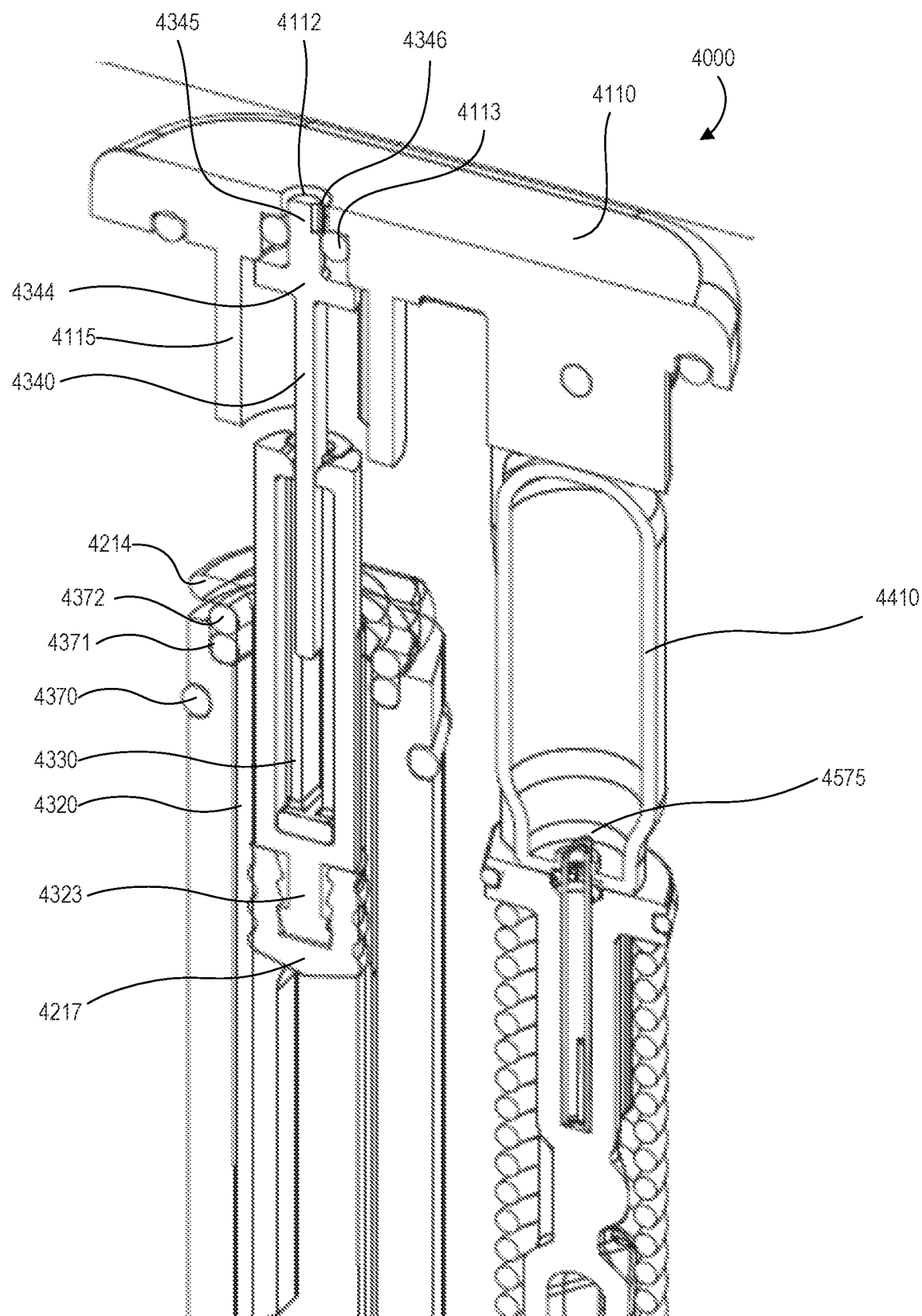
FIG. 31 is an enlarged cross-sectional view of the medical injector shown in FIGS. 2 and 3, in the fourth configuration.

When the base 4510 is moved from the first position to the second position, the system actuator assembly 4500 actuates the medicament delivery mechanism 4300, thereby placing the medical injector 4000 in its fourth configuration (i.e., the needle insertion configuration), as shown in FIGS. 29 and 30. More particularly, when the medical injector 4000 is in its fourth configuration, the puncturer 4575 of the release member 4550 is in contact with and/or disposed through the frangible seal 4413 of the gas container 4410.

After the frangible seal 4413 has been punctured, an actuating portion of a compressed gas flows from the gas container 4410, via the gas passageway and into the medicament cavity 4139. The gas applies gas pressure to flange 4214 of the medicament container and/or the top surface of the carrier body 4360. Because the seals 4371, 4372 and the outer seal 4370 maintain the medicament cavity 4139 fluidically isolated from the exterior of the device, the gas pressure exerts a force to move the carrier assembly 4390 distally within the medicament cavity 4139, as shown in FIG. 30. In this manner, the movement of the needle 4216 in a distal direction causes the distal end portion of the needle 4216 to exit the housing 4100 and enter the body of a patient prior to administering the medicament.

As shown in FIG. 30, when the device moves from the third configuration to the fourth configuration, the gas vent assembly expands from its collapsed configuration (FIGS. 18, 34) to a partially expanded configuration. Notably, in the partially expanded configuration, the valve portion 4345 is maintained in a sealed position within the opening 4112 and the O-ring 4113. Thus, the medicament cavity 4139 is maintained in fluidic isolation.

When the needle 4216 has extended by a desired distance, the distal surface 4365 of the carrier body 4360 contacts the surface 4106 of the housing 4100 to limit further distal movement of the carrier assembly 4390 within the housing 4100. When the distal movement of the carrier assembly 4390 is prevented, the gas within the medicament cavity 4139 (i.e., the gas chamber) continues to apply gas pressure to the elastomeric member 4217. This causes the elastomeric member 4217 (and therefore the first member 4320 of the gas vent assembly 4310) to move in the distal direction with the medicament container body 4210. Distal movement of the elastomeric member 4217 generates a pressure upon the medicament contained within the medicament container assembly 4200, thereby allowing at least a portion of the medicament to flow out of the medicament container 4200 via the needle 4216. The medicament is delivered to a body of a user via the medicament delivery path defined by the medicament container 4200 and the needle 4216. At the end of injection, the medical injector is in its fifth configuration (FIG. 33).

Figure 32:
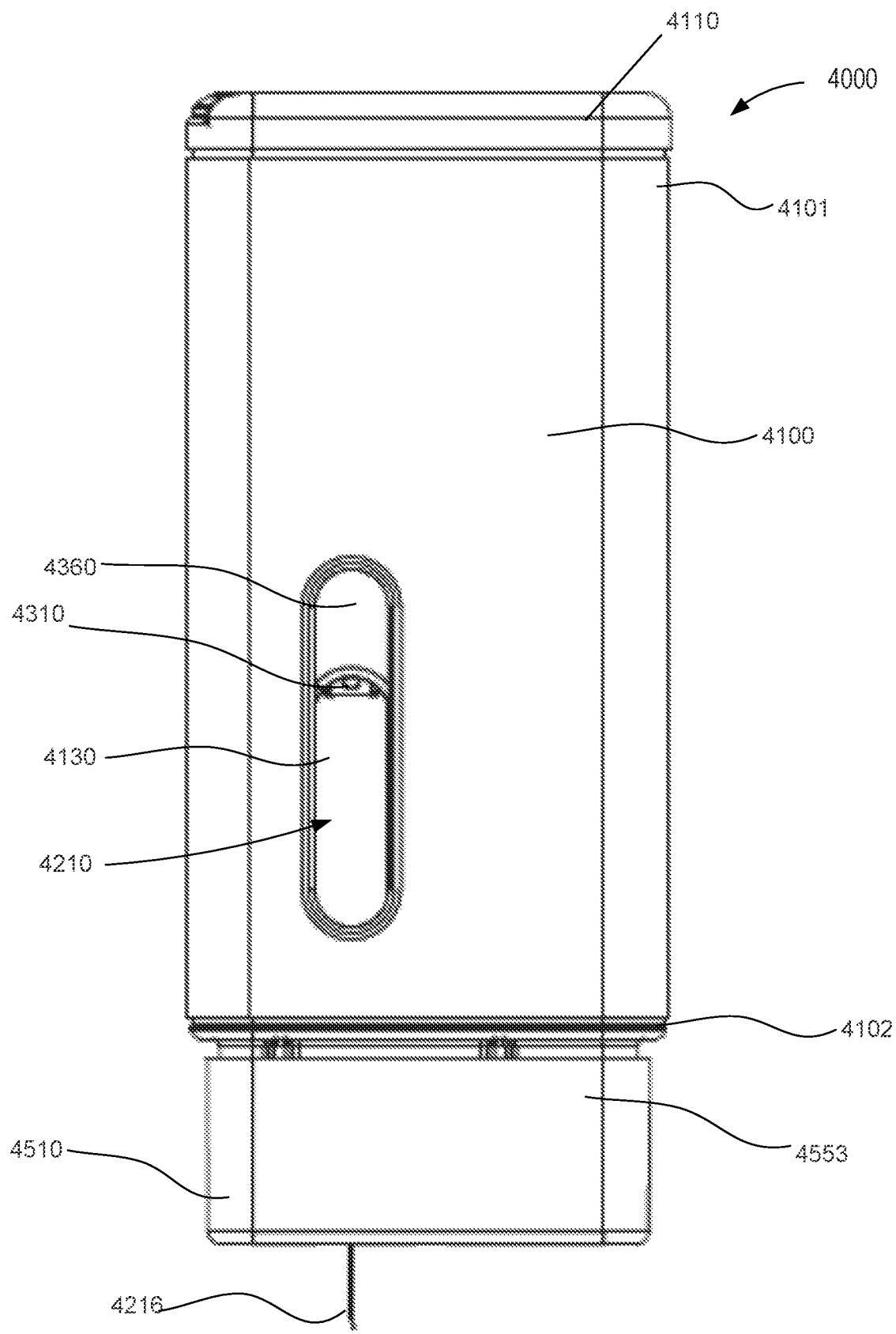
FIG. 32 is a front view of the medical injector shown in FIGS. 2 and 3, in a fifth configuration (medicament delivered).

As shown in FIG. 32, when the medical injector 4000 is in its fifth configuration, a portion of the medicament container assembly 4200, a portion of the carrier body 4360, and a portion of the gas vent assembly 4310 can be viewed via the status aperture 4130. As described above, in some embodiments, the housing 4100 can include a label or other indicia providing a color strip to assist the user in identifying the carrier, providing instructions for viewing, or the like. Although not shown in FIG. 11, in some embodiments, a portion of the elastomeric member 4217 is visible via the status aperture 4130 when the medical injector 4000 is in its fifth configuration.

Figure 33:
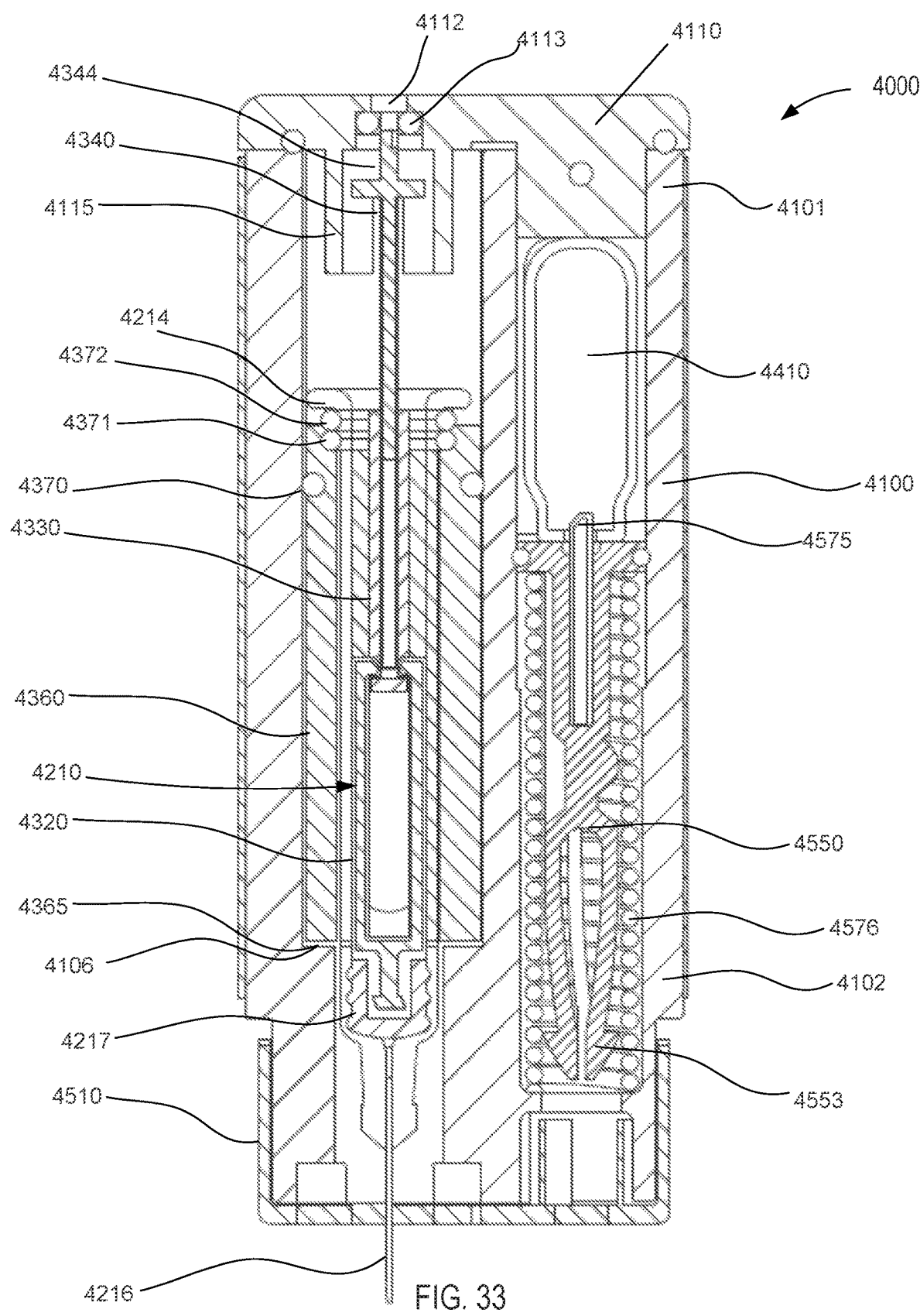
FIG. 33 is a front cross-sectional view of the medical injector shown in FIGS. 2 and 3, in the fifth configuration (medicament delivered).
Figure 34:
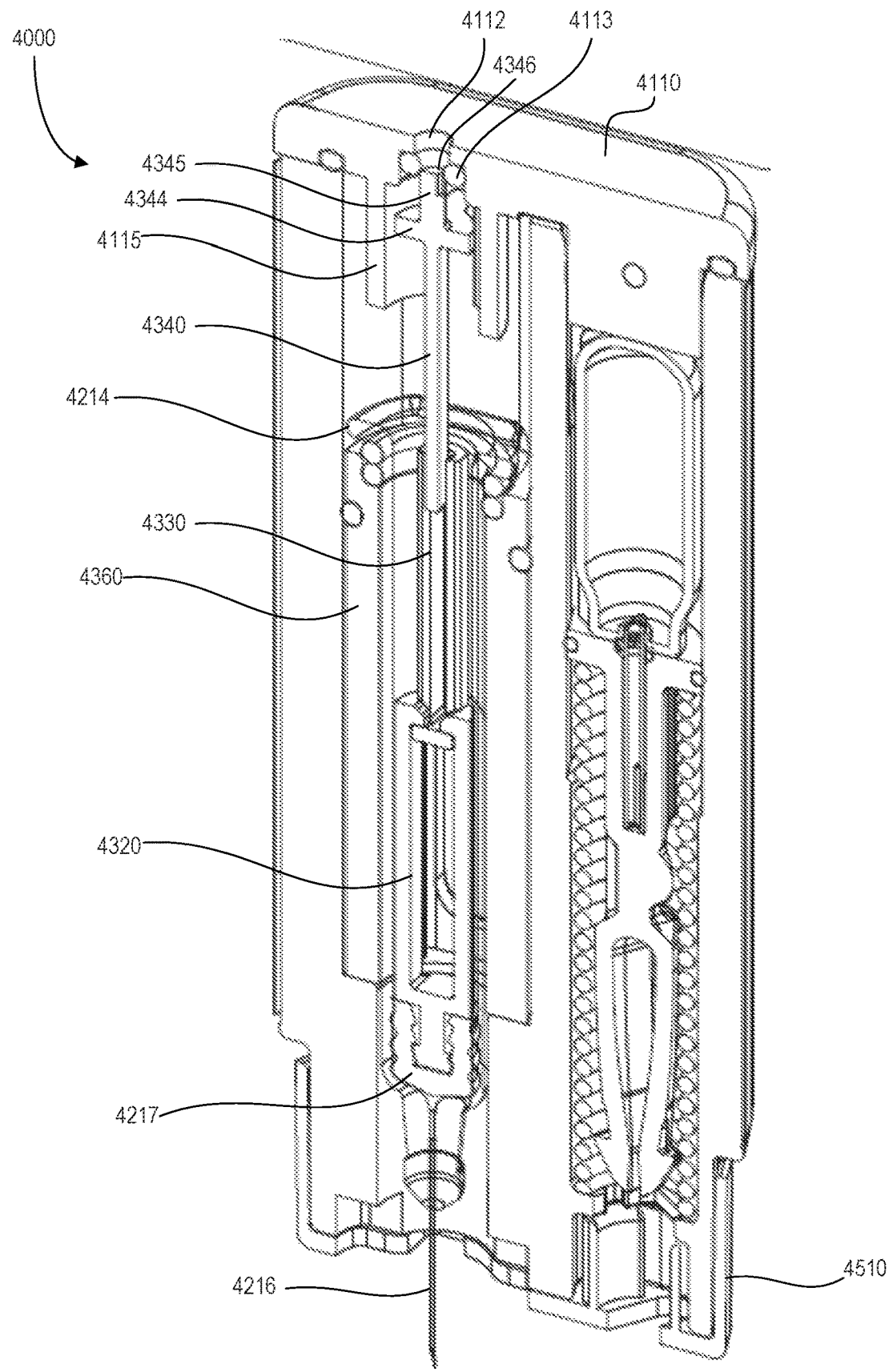
FIG. 34 is a perspective cross-sectional view of the medical injector shown in FIGS. 2 and 3, in the fifth configuration (medicament delivered).

As shown in FIGS. 33 and 34, as the elastomeric member 4217 moves distally, the gas vent assembly 4310 continues to move to its fully expanded configuration. After the elastomeric member 4217 has moved a predetermined distance within the medicament container body 4210 (corresponding to the desired dose), the valve portion 4345 is moved from within the opening 4112 thereby allowing the pressurized gas contained within the gas chamber (i.e., the volume within the medicament cavity 4139 between the proximal end of the housing 4100 and the surface of the carrier 4360) to escape via the passageway 4346 and the opening 4112. After the gas pressure within the medicament cavity 4139 decreases below a certain level, the force exerted by the retraction spring 4380 on the carrier body 4360 is sufficient to cause the carrier body 4360 to move proximally within the housing 4100 (i.e., to retract). This places the medical injector in its sixth configuration (FIGS. 35 and 36).

Figure 35:
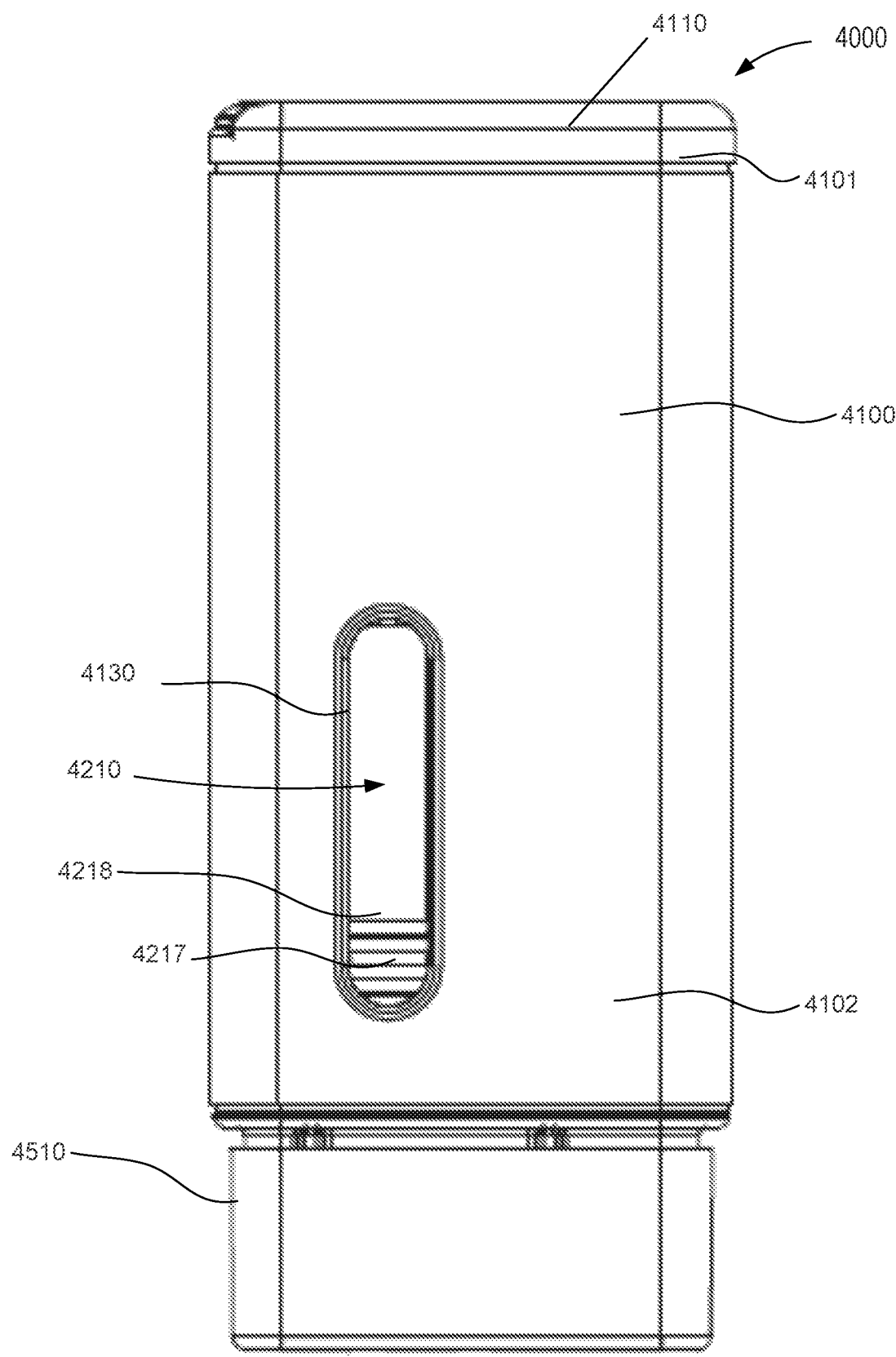
FIG. 35 is a front view of the medical injector shown in FIGS. 2 and 3, in a sixth configuration (needle retracted).
Figure 36:
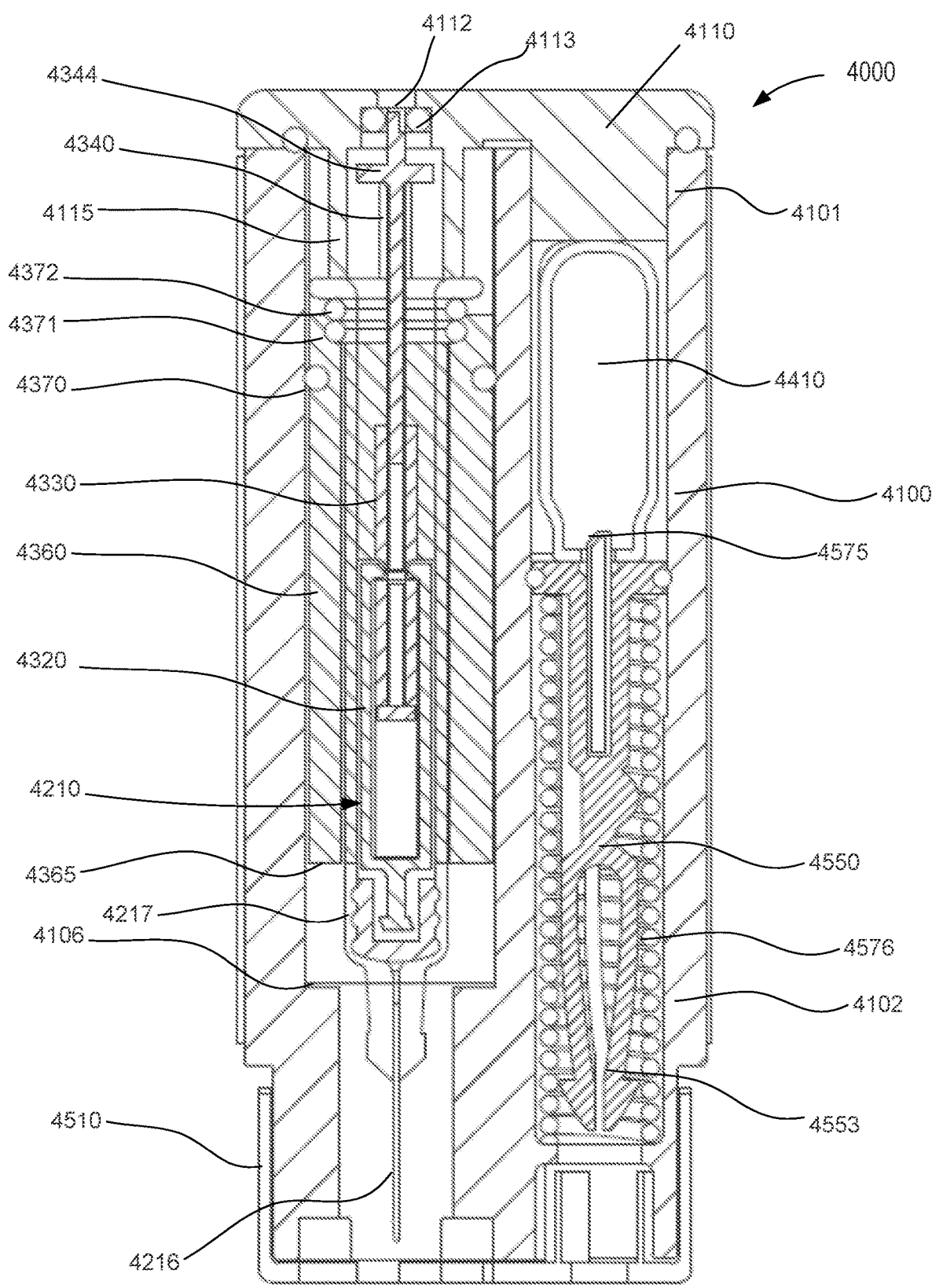
FIG. 36 is a front cross-sectional view of the medical injector shown in FIGS. 2 and 3, in a sixth configuration (needle retracted).

As shown in FIG. 35, when the medical injector 4000 is in its sixth configuration, a portion of the medicament container assembly 4200 can be viewed via the status aperture 4130. Specifically, as shown, the container body 4210 and a portion of the elastomeric member 4217 are visible via the status aperture 4130. As described above, in some embodiments, the housing 4100 can include a label or other indicia providing a color strip to assist the user in identifying the elastomeric member, providing instructions for viewing, or the like. Although not shown in FIG. 11, in some embodiments, a portion of the carrier 4360 is visible via the status aperture 4130 when the medical injector 4000 is in its sixth configuration.

As described above, the medicament delivery mechanism 4300 is considered to be a "pistonless" system. With a pistonless gas-powered auto-injector, the force exerted by the gas can move the medicament container relative to the housing and similarly, can move the elastomeric member 4217 relative to (e.g., within) the container body 4210. In some embodiments, by not including a movable mechanism, a piston, and/or the like, a height of the medical injector 4000 can be reduced relative to, for example, the height of a device that includes a rigid, single length piston.

In some embodiments, any of the devices shown and described herein can include an electronic circuit system to provide user instruction and/or feedback. In some embodiments the electronic circuit system can be integral to the device (e.g., included within the housing, such as the housing 4100). In other embodiments, the electronic circuit system can be an external, discrete component that is affixed to the device. For example, FIGS. 37-43 show various views of a medical injector 5000 that includes an electronic circuit system 5900. The medical injector 5000 is contained within a cover 5190 and includes a housing 5100, a system actuation assembly (not shown), a medicament container assembly (not shown), a medicament delivery mechanism (not shown), a base 5510 (FIGS. 41 and 42), a safety lock 5700, and an electronic circuit system 5900. Although not shown, the system actuation assembly is similar to the system actuation assembly 4500 described above with respect to the medical injector 4000 (see FIGS. 9-10). Thus, the system actuation assembly of the medical injector 5000 is not described in detail herein. Although not shown, the medicament container assembly is similar to the medicament container assembly 4200 described above with respect to the medical injector 4000 (see FIG. 12). Thus, the medicament container assembly of the medical injector 5000 is not described in detail herein. Although not shown, the medicament delivery mechanism is similar to the medicament delivery mechanism 4300 described above with respect to the medical injector 4000 (see FIGS. 15-22). Thus, the medicament delivery mechanism of the medical injector 5000 is not described in detail herein.

Figure 43:
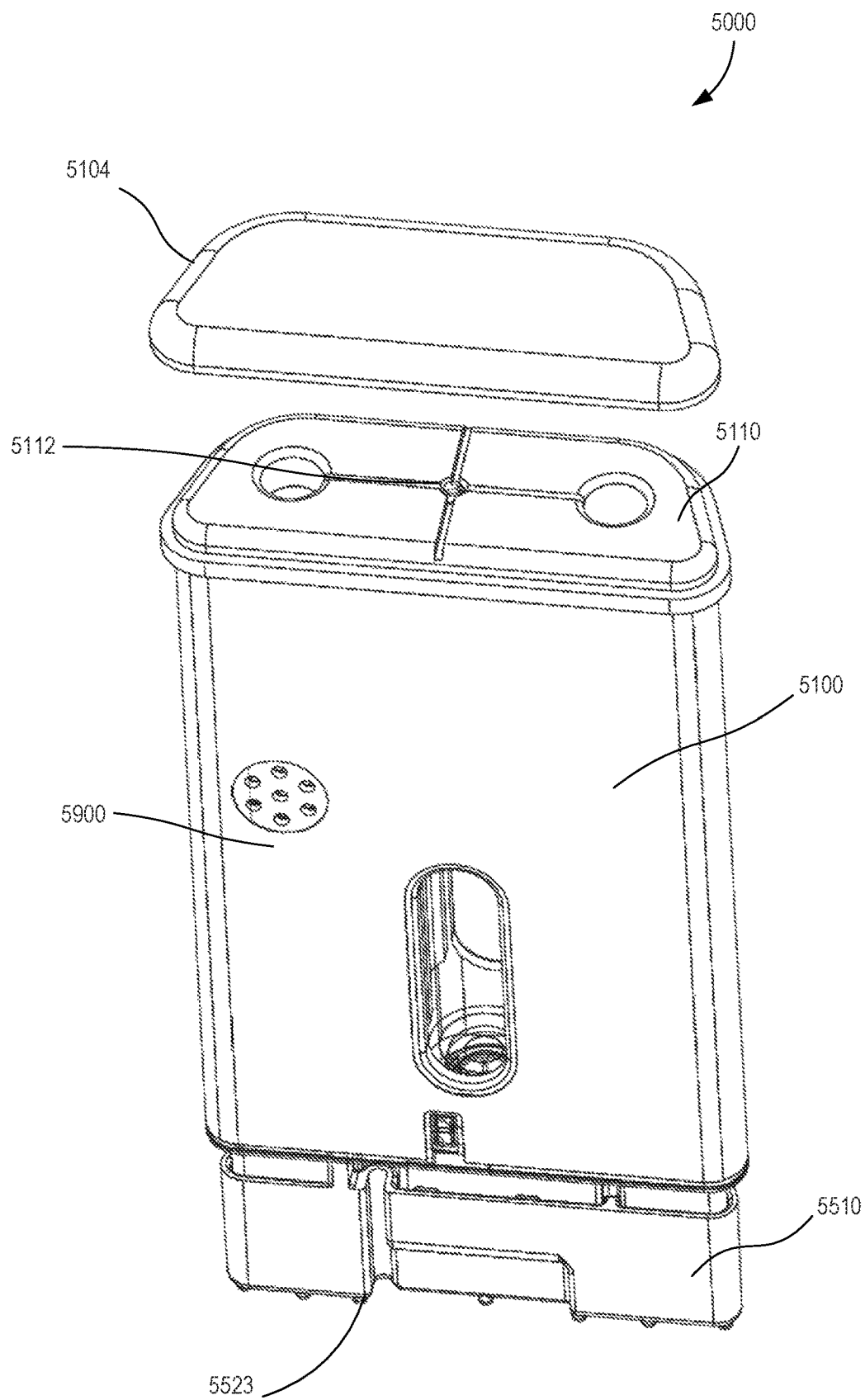
FIG. 43 is a perspective, partially exploded view of the medical injector shown in FIG. 37 showing the vent opening.
Figure 44:
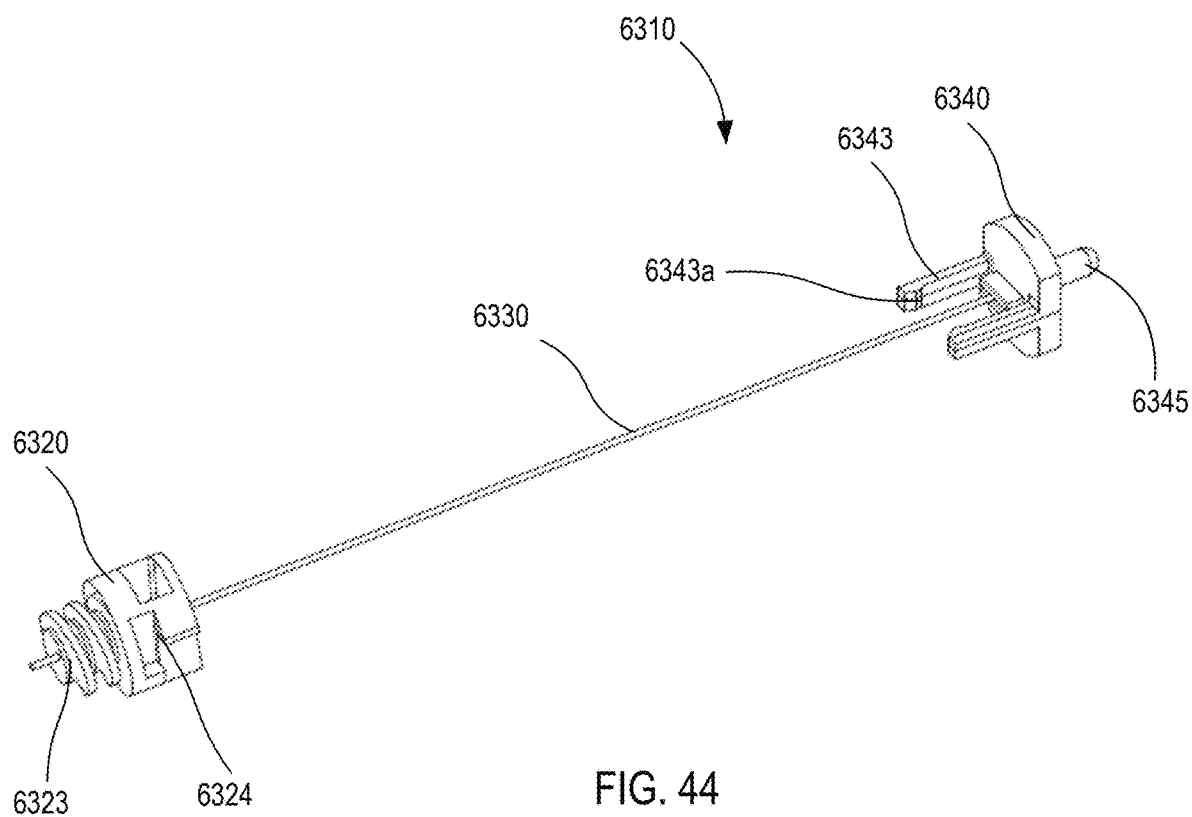
FIG. 44 is a perspective view of a gas vent assembly according to an embodiment.
Figure 45:
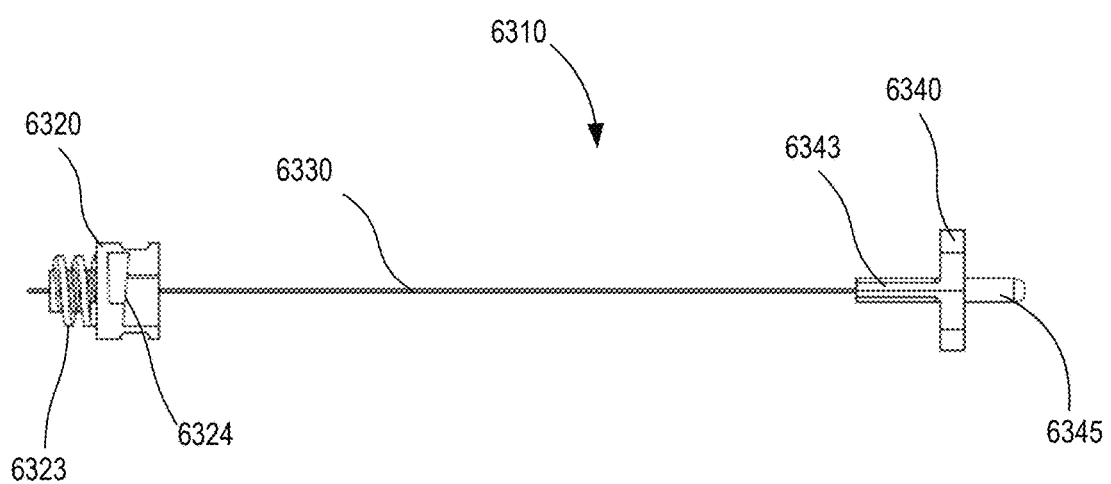
FIG. 45 is a front view of the gas vent assembly shown in FIG. 44.

As shown, the housing 5100 has a proximal end portion that includes a cap 5110 that defines the vent opening 5112 (see FIG. 43). The vent opening 5112 can be similar to the vent opening 4112 described above and provides the passageway through which pressurized gas is conveyed from the gas chamber within the housing 5100 to a volume outside of the medical injector 5000. In this manner, the force produced by the pressurized gas on the medicament delivery mechanism and/or the medicament container assembly can be reduced to allow needle retraction after the injection is completed. In some embodiments, a valve member (similar to the third member 4340 or the valve member 6340 described below) can be moved within the vent opening 5112 to allow pressurized gas to escape through the vent opening 5112 before or during an injection event. For example, in some embodiments, a valve member can be selectively moved to slightly uncover the vent opening 5112 to reduce the gas pressure in a controlled manner, thereby "slowing down" the injection event (see e.g., FIG. 1 and the discussion related thereto). This arrangement can, for example, ensure that an injection event is maintained as a subcutaneous event and does not exceed injection pressures that might produce an intramuscular injection event.

Figure 37:
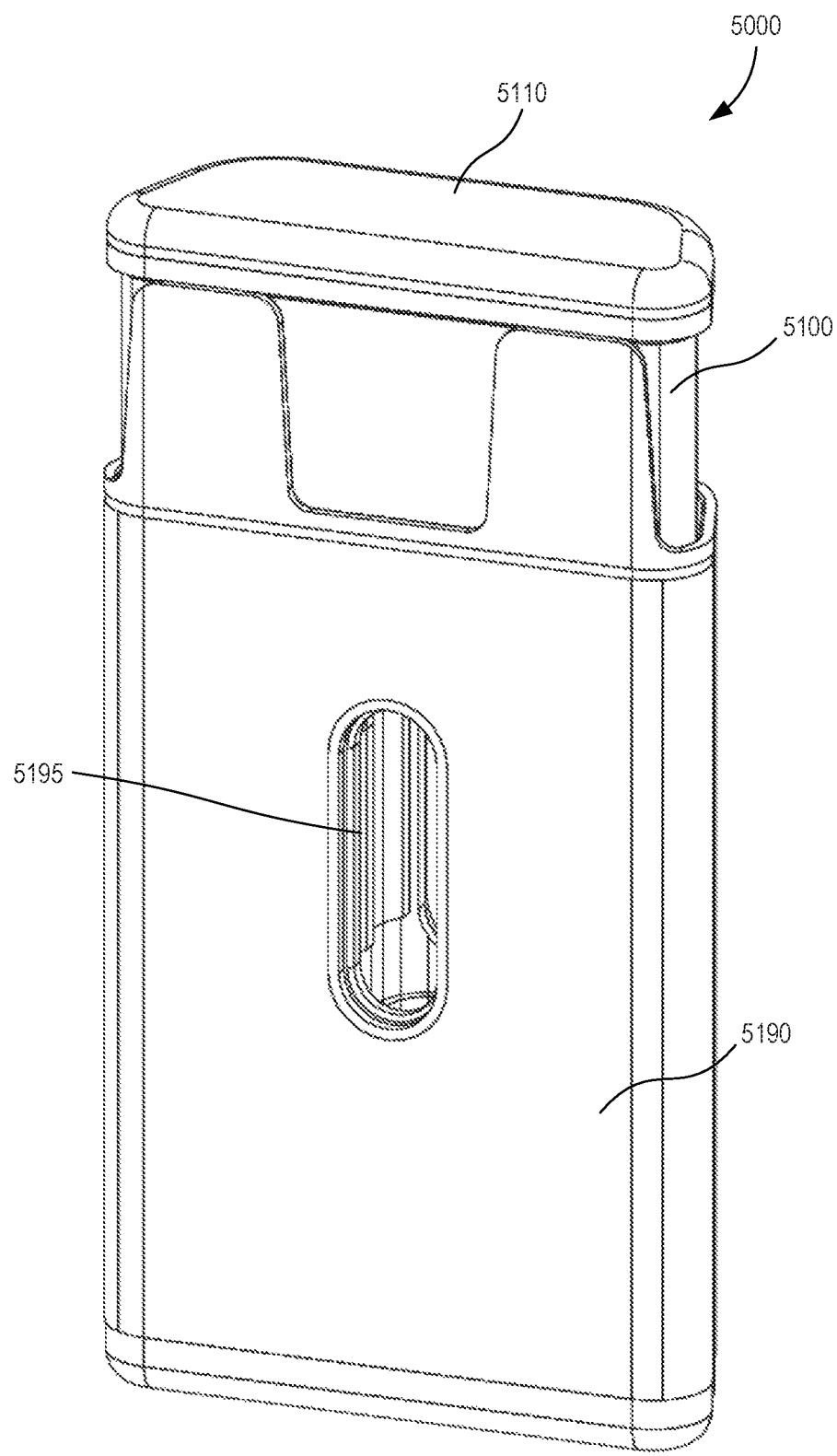
FIG. 37 is a perspective front view of a medical injector according to an embodiment.
Figure 38:
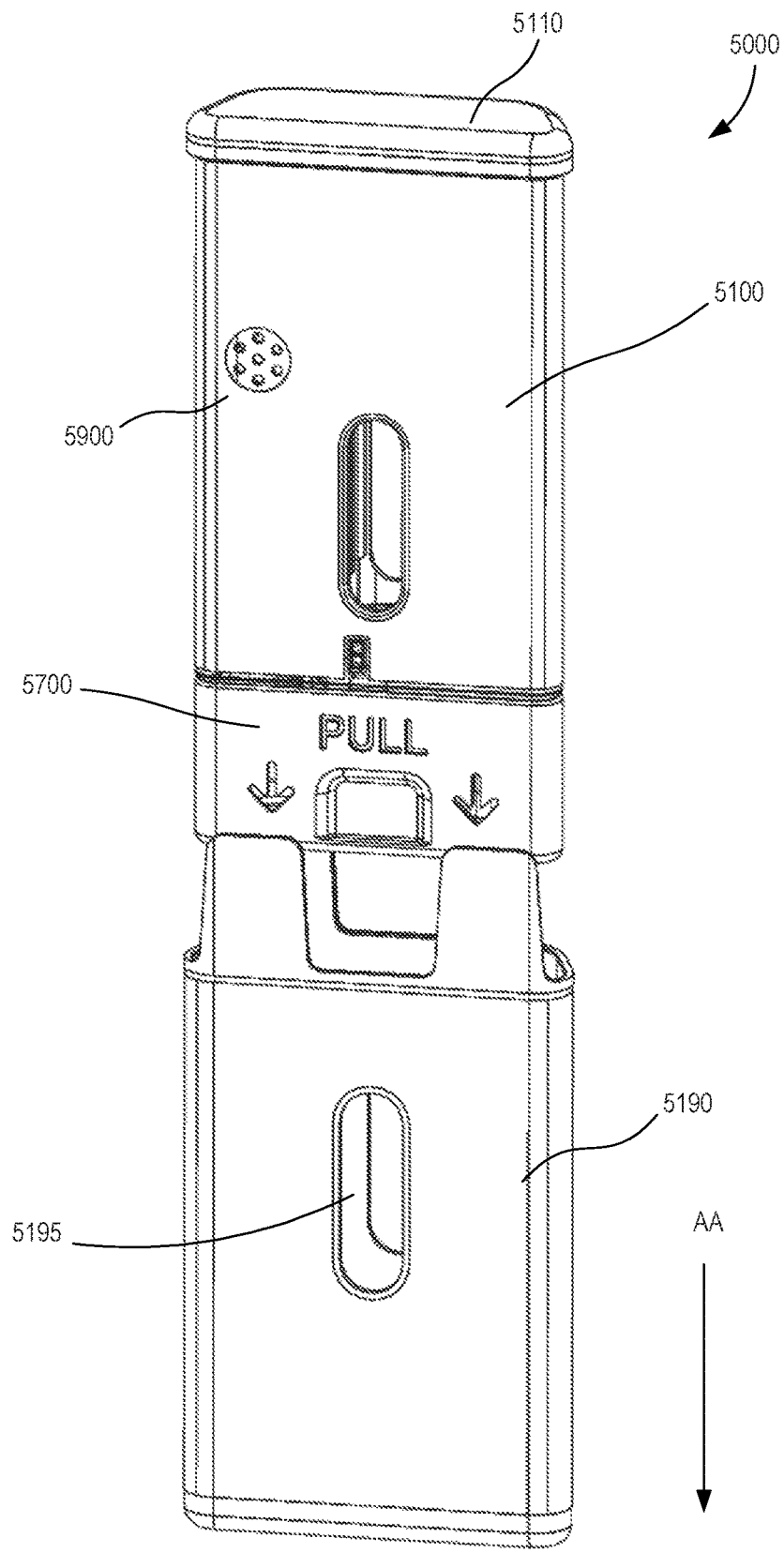
FIG. 38 is a perspective front view of the medical injector shown in FIG. 37 with the cover removed.

The housing 5100 defines a first status indicator aperture (on the first or front side) and a second status indicator aperture (not shown, on the second or back side). The status indicator aperture can allow a patient to monitor the status and/or contents of the medicament container, the carrier, and the medicament contained within the housing 5100. For example, by visually inspecting the status indicator apertures, a patient can determine whether the medicament container contains a medicament and/or whether the medicament has been dispensed. As shown in FIG. 37, the cover 5190 also includes status openings 5195 that are aligned with the status apertures of the housing 5100. In this manner, the user can monitor the status of the medicament without removing the housing 5100 from the cover 5190. In some embodiments, the status openings 5195 are covered by a clear material that is coated to limit transmission of specific wavelengths of light. For example, in some embodiments, the status openings 5195 can be coated with a material that limits transmission of ultraviolet radiation. This arrangement can reduce degradation of certain medicament formulations (i.e., due to exposure to light).

Figure 39:
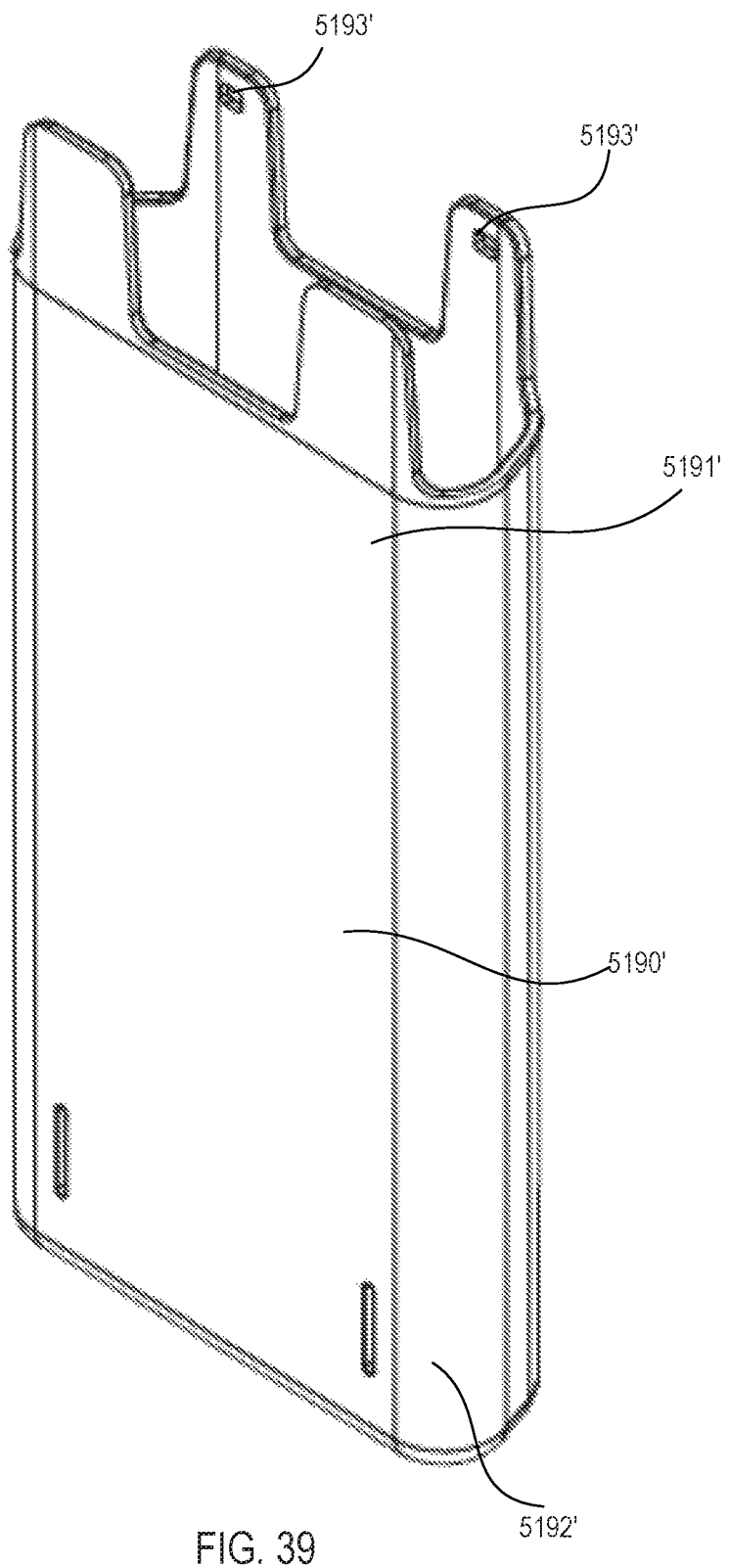
FIGS. 39 and 40 are perspective views of a cover of a medical injector, according to an embodiment.
Figure 40:
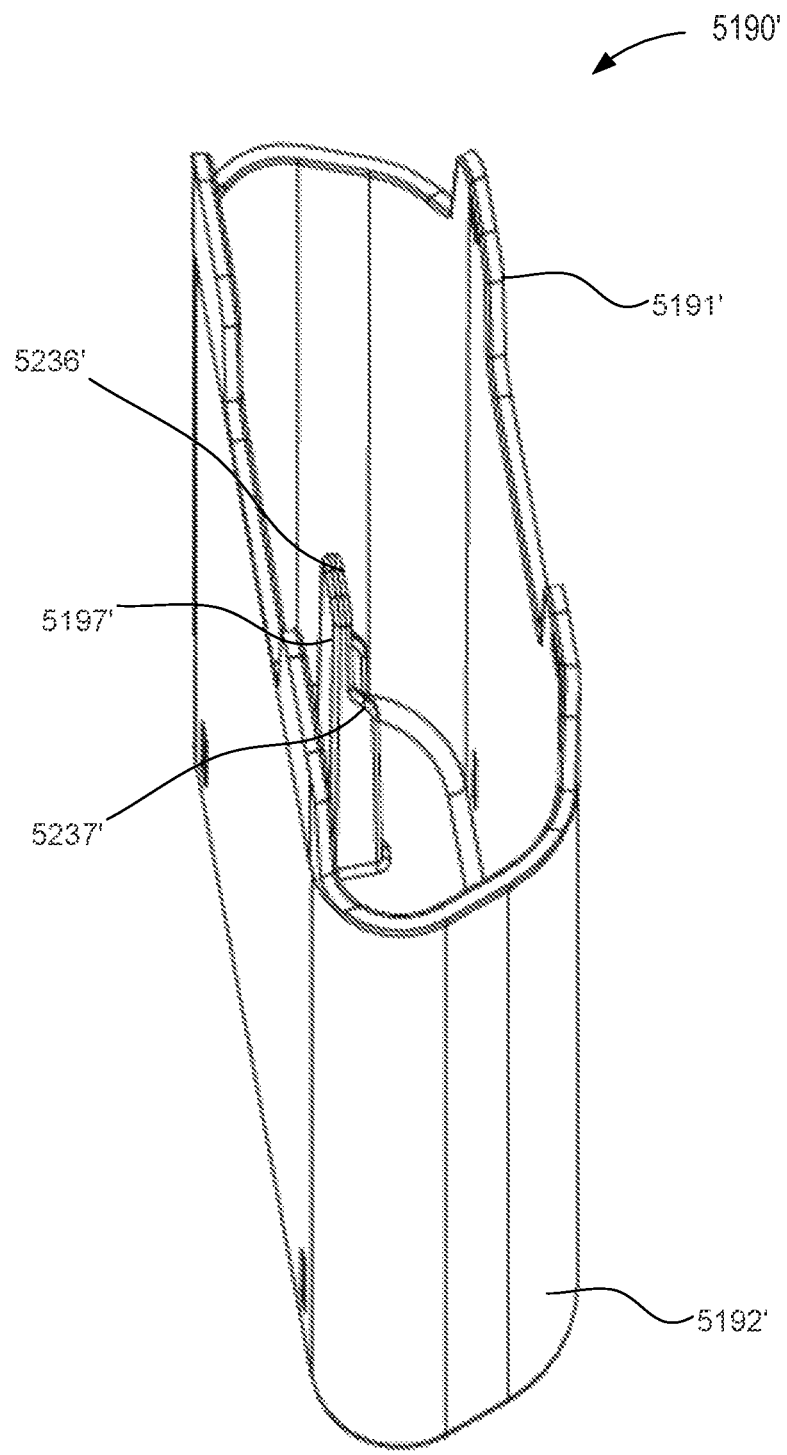
Figure 41:
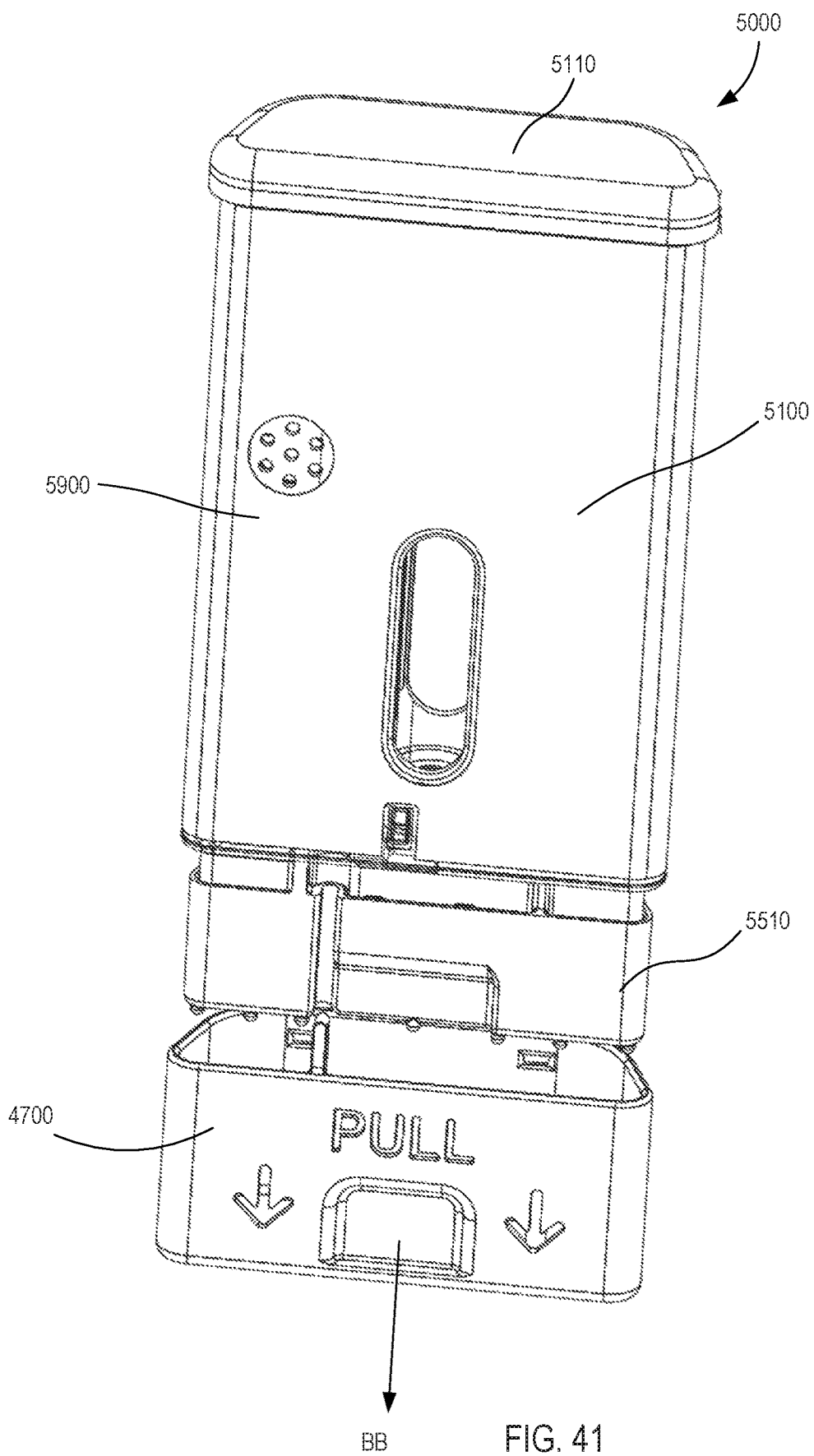
FIGS. 41 and 42 are perspective front views of the medical injector shown in FIG. 37 with the safety member removed.

FIGS. 39 and 40 show an alternate cover 5190' that can be used with the medical injector 5000. The cover 5190' is similar to the cover 5190 but does not include the status openings 5195. As shown in FIGS. 39 and 40, the cover 5190' includes a proximal end portion 5191' and a distal end portion 5192', and defines a cavity 5196'. The cavity 5196' of the cover 5190' is configured to receive at least a portion of the housing 5100. Thus, when the portion of the housing 5100 is disposed within the cover 5190', the cover 5190' blocks an optical pathway between the medicament container and a region outside of the housing 5100. Similarly stated, when the portion of the housing 5100 is disposed within the cover 5190', the cover 5190' obstructs the status indicator apertures to reduce the amount of light transmitted to the medicament. In this manner, the life of the medicament can be extended by the prevention and/or reduction of degradation to the medicament that may be caused by ultra-violet radiation. The proximal end portion 5191' of the cover 5190' defines apertures 5193' configured to receive the retention protrusions (not shown) of the housing 5100. In this manner, the apertures 5193' and the retention protrusions of the housing 5100 removably retain the cover 5190' about at least a portion of the housing 5100.

As described below, the electronic circuit system 5900 can be actuated when the housing 5100 is at least partially removed from the cover 5190 or the cover 5100'. More particularly, the distal end portion 5192' of the cover 5190' includes the battery isolation protrusion 5197'. The battery isolation protrusion 5197' includes a proximal end portion 5236' and a tapered portion 5237'. The proximal end portion 5236' of the battery isolation protrusion 5197 is configured to be removably disposed between a portion of a power source.

As shown in FIG. 43, the housing 5100 includes a proximal cover 5104 that covers the proximal cap (or proximal portion) 5110. The proximal cover 5104 covers the exit portion of the vent opening 5112, and thus prevents a user from inadvertently covering the opening (e.g., with their finger or thumb) during use. The proximal cover 5104 also prevents contaminants or other particles from disrupting the gas release through the vent opening 5112.

The medical injector 5000 includes an electronic circuit system 5900 configured to control, actuate, and/or otherwise produce an output associated with a portion of the medical injector 5000. The electronic circuit system of the medical injector 5000 can be similar to any of the electronic circuit systems shown and described herein, in the 6413 PCT, and in the '849 patent. As described above, in some embodiments, the electronic circuit system 5900 can be actuated when the housing 5100 is at least partially removed from the cover 5190 (or the cover 5190'). For example, in some embodiments, the cover 5190 can include a switch protrusion or battery isolation protrusion 5197'. When the cover 5190 is removed, as shown by the arrow AA in FIG. 38), the protrusion can actuate the electronic circuit system 5900.

The safety lock 5700 includes a protrusion 5745, which functions similar to a safety lock protrusion(s), described in detail in the '6413 PCT. In particular, the protrusion 5745 extends into the housing 5100 and selectively actuates the electronic circuit system when the safety lock 5700 is removed (as shown by the arrow BB in FIG. 41). The protrusion 5745 can actuate the electronic circuit system 5900 by isolating a power source (e.g., a battery) from the remaining portions of the electronic circuit system 5900, by actuating a switch (not shown) of the electronic circuit system, or the like. Specifically, in some embodiments, the protrusion 5745 engages a circuit board or otherwise contacts a switch or sensor (not shown) to produce an electronic output. Thus, removal of the safety lock 5700 results in (1) removal of a needle sheath (similar to the sheath assembly 4220 described above), and (2) actuating the electronic circuit system, thus producing an electronic output.

The base 5510 also includes a protrusion (not shown), which functions similar to the base protrusion(s) (e.g., protrusion 54311), described in detail in the '6413 PCT. In particular, the base protrusion can extend into the housing 5100 and selectively actuate the electronic circuit system when the base is moved to actuate the injector 5000. The base protrusion can actuate the electronic circuit system 5900 by isolating a power source (e.g., a battery) from the remaining portions of the electronic circuit system 5900, by actuating a switch (not shown) of the electronic circuit system, or the like. Specifically, in some embodiments, the base protrusion engages a circuit board or otherwise contacts a switch or sensor (not shown) to produce an electronic output.

In some embodiments, the electronic circuit system 5900 (and any of the electronic circuit systems described herein) can include an audio output device configured to output audible sound to a user in response to use of the medical injector 5000. In some embodiments, the audible output device can be a speaker. In some embodiments, the audible sound can be, for example, associated with a recorded message and/or a recorded speech. In other embodiments, the audible instructions can be an audible beep, a series of tones and/or or the like.

In some embodiments, the electronic circuit system 5900 (and any of the electronic circuit systems described herein) can include a light output device configured to output a visual signal to a user in response to use of the medical injector 5000. In some embodiments, the light output device can be a light emitting diode (LED). In some embodiments, the visual signal can be, for example, a series of flashes, a sequence of lights, or the like.

In some embodiments, the electronic circuit system 5900 (and any of the electronic circuit systems described herein) can include a network interface device (not shown) configured to operatively connect the electronic circuit system 5900 to a remote device (not shown) and/or a communications network (not shown). In this manner, the electronic circuit system 5900 can send information to and/or receive information from the remote device. The remote device can be, for example, a remote communications network, a computer, a compliance monitoring device, a cell phone, a personal digital assistant (PDA) or the like. Such an arrangement can be used, for example, to download replacement processor-readable code from a central network to the electronic circuit system 5900. In some embodiments, for example, the electronic circuit system 5900 can download information associated with a medical injector 5000, such as an expiration date, a recall notice, updated use instructions or the like. Similarly, in some embodiments, the electronic circuit system 5900, can upload information associated with the use of the medical injector 5000 via the network interface device (e.g., compliance information or the like).

In addition to providing user instruction and/or feedback via the electronic circuit system, the medical injector 5000 can also provide user feedback and/or instruction via a visual status window. The status window and/or a portion of the housing are configured such that various portions of the medicament delivery mechanism and/or the medicament container are visible therethrough during various stages of operation. For example, in some embodiments, all or portions of a medicament container assembly and/or movable mechanism (e.g., a prefilled syringe, an elastomeric member or plunger, a carrier, a movable mechanism, etc., as shown and described in the '849 patent) can be visible through the status window.

In some embodiments, the medical injector 5000 can provide non-electronic user feedback and/or instruction via a sound produced by the pressurized gas, by the interface between components during actuation, or the like. In this manner, the medical injector 5000 can include both electronic outputs (e.g., via lights and/or sound) and non-electronic outputs (e.g., via the status window and/or an acoustic noise output). In some embodiments, for example, the gas release valve 5112 (similar to the gas relief opening 4112 and the gas venting assembly 4310 described above) can include an orifice or chamber such that the escaping gas produces a sound or "whistle." In some embodiments, the orifice or flow path can be configured such that the sound is within a desired frequency range or loudness. In other embodiments, the non-electronic output can be a clicking sound, a snapping sound, a clapping sound, a cracking sound, and/or any other suitable audible output. In other embodiments, the base can produce a distinct snapping sound when it contacts a locking feature of the housing during actuation.

Figure 42:
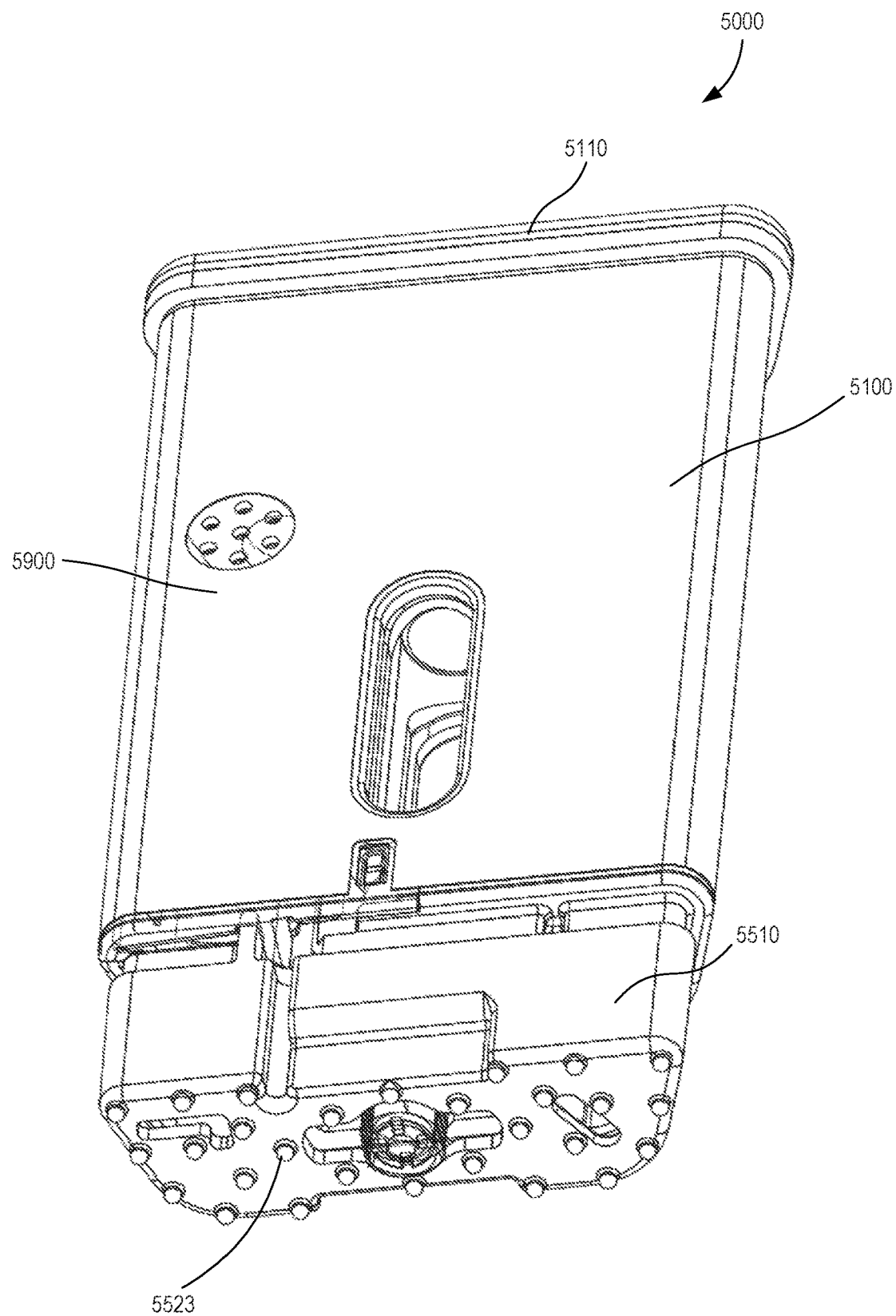

Referring to FIG. 42, the base 5510 includes a distal (or outer) surface 5523 that is disposed against a target surface (not shown) during use of the injector 5000. The distal surface 5523 includes a series of dimples or protrusions that are configured to exert localized forces against the target location when the injector 5000 is actuated. By producing localized forces, the protrusions can reduce the pain sensation felt by the user during injection. Specifically, the localized forces can act to produce inhibitory signal within the nerves of the patient, thereby reducing pain signal transmission during the needle insertion and injection event. Similarly stated, the protrusion can function according to the gate control theory to limit pain associated with medicament delivery.

Although the gas vent assembly 4310 is shown and described as including three rigid members that are nested when in the collapsed configuration and that move relative to each other when in the expanded configuration, in other embodiments, any of the medicament delivery devices described herein can include any suitable gas vent assembly that facilitates a "pistonless" design. For example, in some embodiments, a gas vent assembly can include a flexible member (e.g., a filament, cord, string, ribbon, or band) that moves between a collapsed (e.g., coiled, folded, rolled, or spooled) configuration, in which the flexible member has a first effective length, and an expanded (e.g., straightened) configuration, in which the flexible member has a second effective length that is greater than the first effective length. FIGS. 44-47 are various views of a gas vent assembly 6310, according to an embodiment. The gas vent assembly 6310 can be used in any of the devices described herein, including the medical injector 4000, as well as any of the devices described in the '4345 PCT and the '6413 PCT. For example, the gas vent assembly 6310 can be included within the medical injector 6000, shown in FIGS. 48-51, which show a medical injector in various states of deployment.

The gas vent assembly 6310 is configured to expand and/or change configurations during operation of the medical injector (e.g., the medical injector 4100), and selectively produces a pathway through which pressurized gas escapes the medicament cavity before, during, and/or after delivery of the medicament. By releasing or removing the force from the carrier body (e.g., the carrier body 4360) and/or the medicament container assembly (e.g., the medicament container assembly 4200) after injection, a retraction spring can move the carrier body proximally to retract the needle. Notably, the gas vent assembly 6310 does not exert a distal force on the elastomeric member (not shown, but similar to the elastomeric member 4217), but rather, is carried or pulled distally by the elastomeric member during delivery of the medicament. Thus, this arrangement is considered a "pistonless" delivery system, because the force for insertion and medicament delivery is provided by the pressurized gas acting directly upon the medicament container assembly and/or the carrier assembly, as described above. Thus, in some embodiments, by releasing or removing the force from the carrier body (e.g., the carrier body 4360) before and/or during injection, the rate of injection can be reduced. This can ensure that the substance can be injected in the desired manner (e.g., subcutaneously).

As shown in FIGS. 44-47, the gas vent assembly 6310 includes a distal coupling member 6320, a flexible member 6330, and a valve member 6340. These components are nested together such that the gas vent assembly 6310 can be transitioned from a collapsed, coupled configuration to an expanded, decoupled configuration, and a series of partially expanded configurations therebetween, as generally shown in FIGS. 46A-46C.

The distal coupling member 6320 includes a protrusion 6323 configured to matingly engage the elastomeric member. In some embodiments, the protrusion 6323 includes a threaded screw portion for insertion into a corresponding threaded member of an elastomeric member (not shown). In some embodiment, the protrusion 6323 includes a self-tapping threaded portion for piercing and threading into an elastomeric member (not shown). In this manner, movement of the elastomeric member distally causes movement of distal coupling member 6320 distally. The distal coupling member 6320 includes a retention structure 6324 configured to engage a corresponding protrusion 6343 of the valve member 6340. More particularly, when the gas vent assembly 6310 is in the collapsed configuration (FIG. 46A), the distal coupling member 6320 can be coupled to the valve member 6340. In some embodiments, the distal coupling member 6320 includes a proximal portion with a storage chamber 6326 for housing the flexible member 6320 at its first effective length in the collapsed configuration. In some embodiments, the distal coupling member 6320 and the valve member 6340 define a storage volume therebetween for housing a rolled, coiled, or spooled flexible member 6320.

Figure 49:
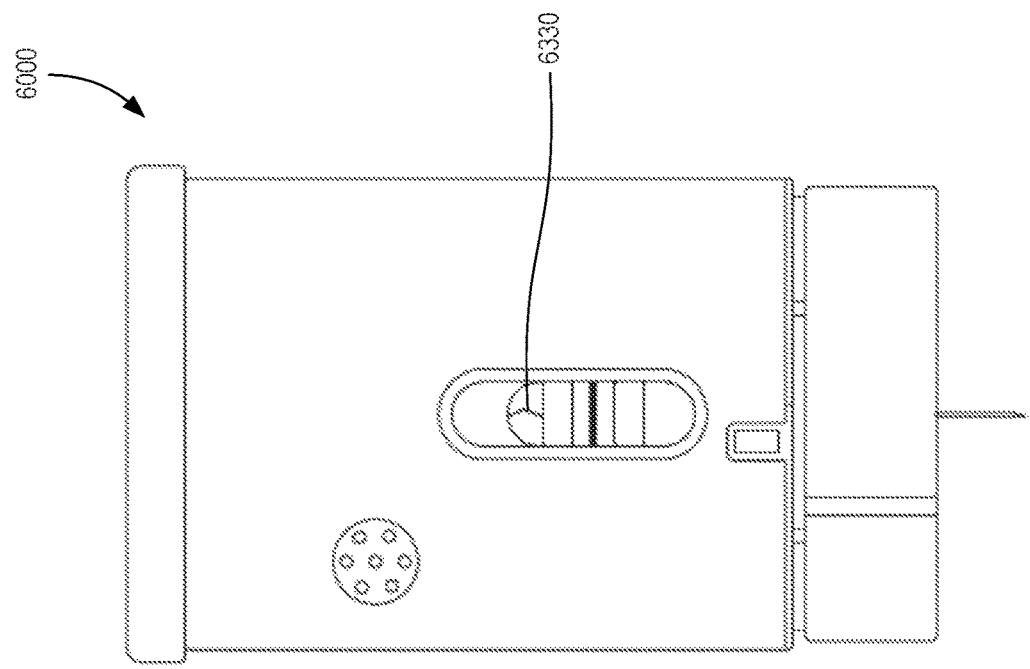
FIGS. 48-51 are front views of a medical injector according to an embodiment in various stages of operation.
Figure 48:
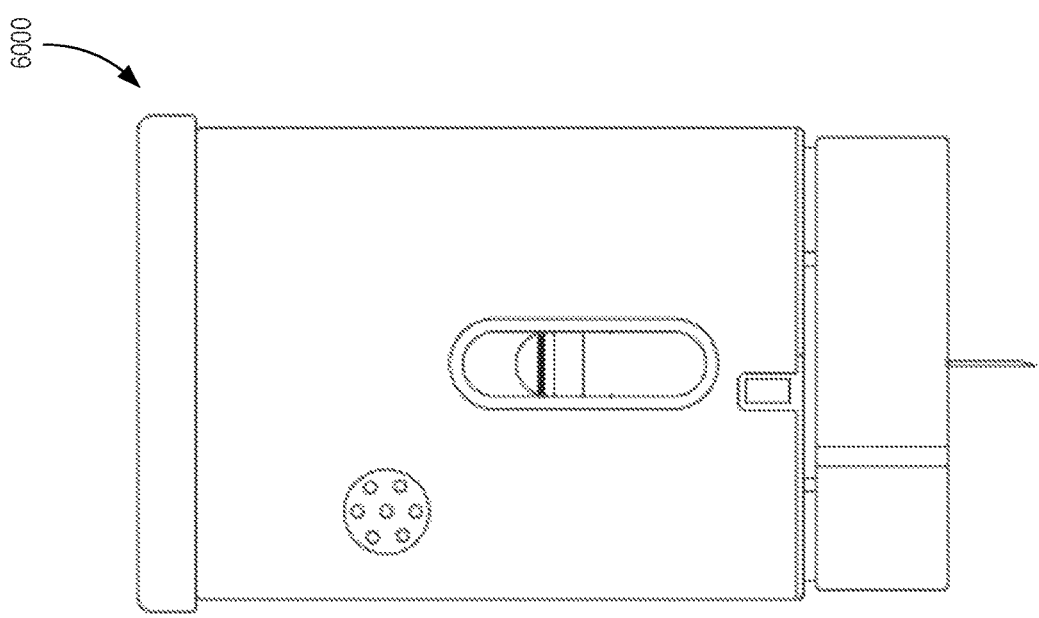
Figure 51:
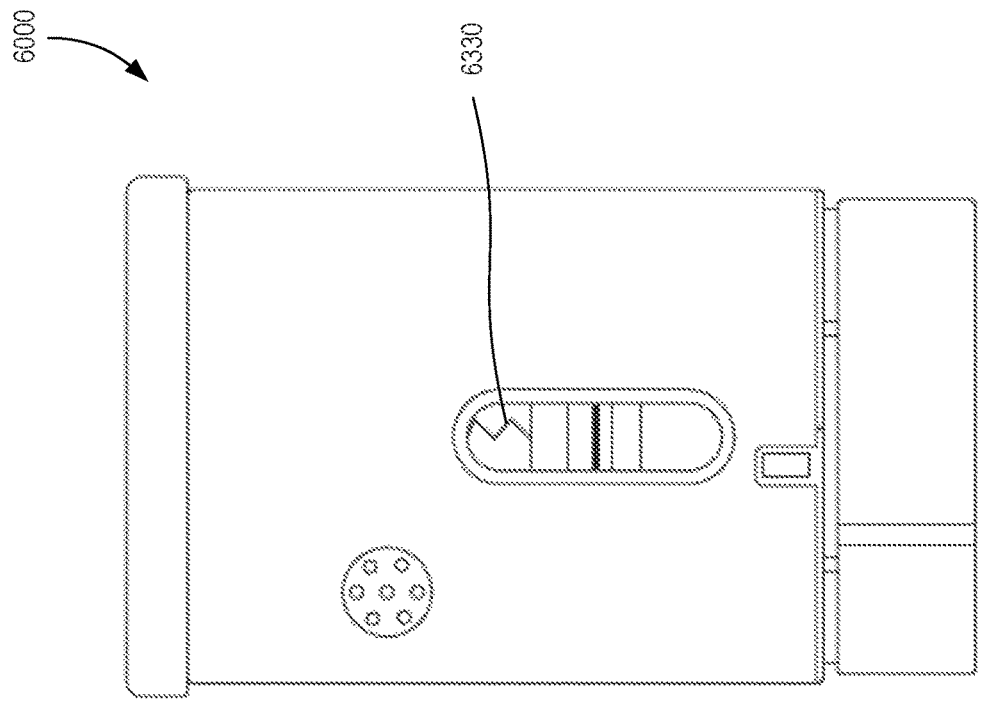
Figure 50:
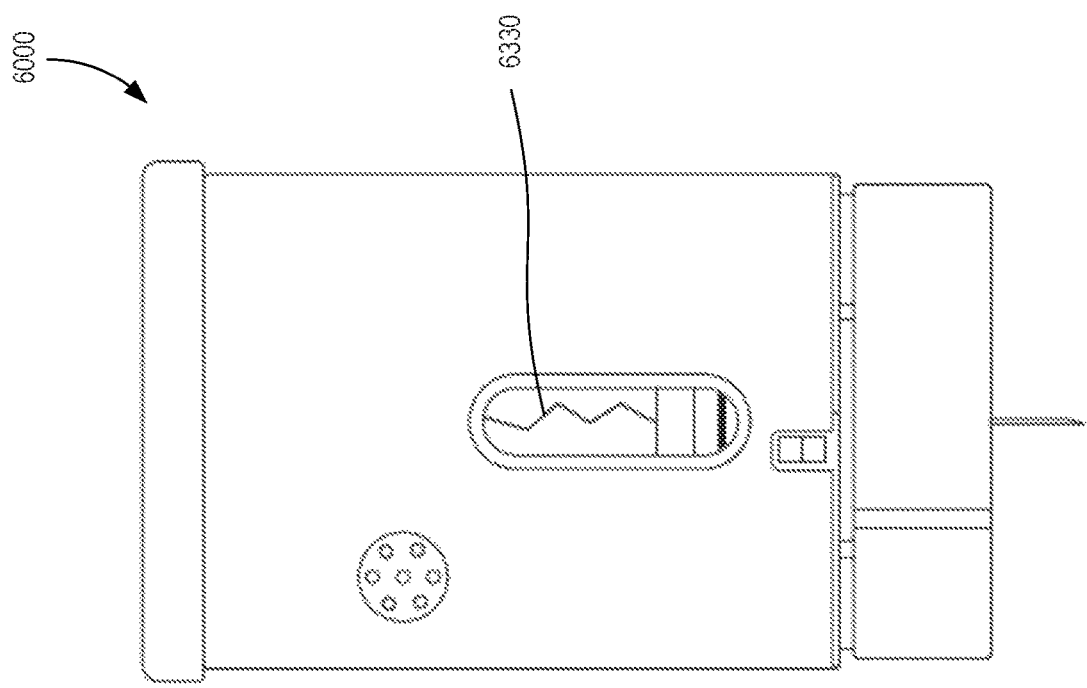
Figure 52:
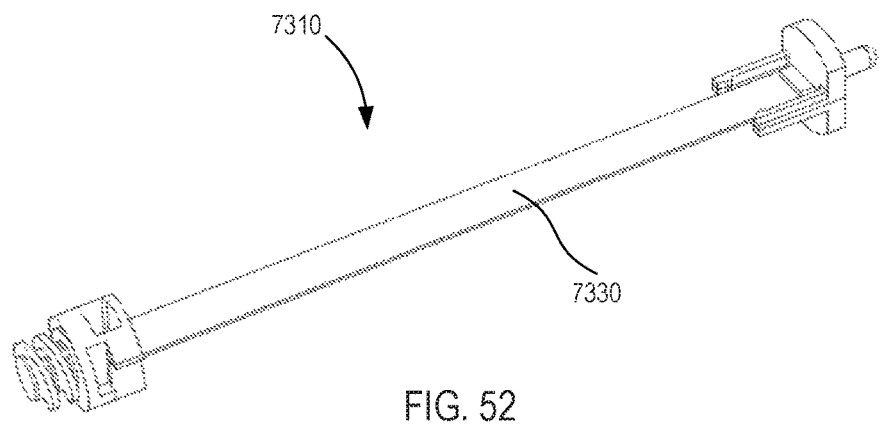
FIG. 52 is a perspective view of a gas vent assembly according to an embodiment.
Figure 53:
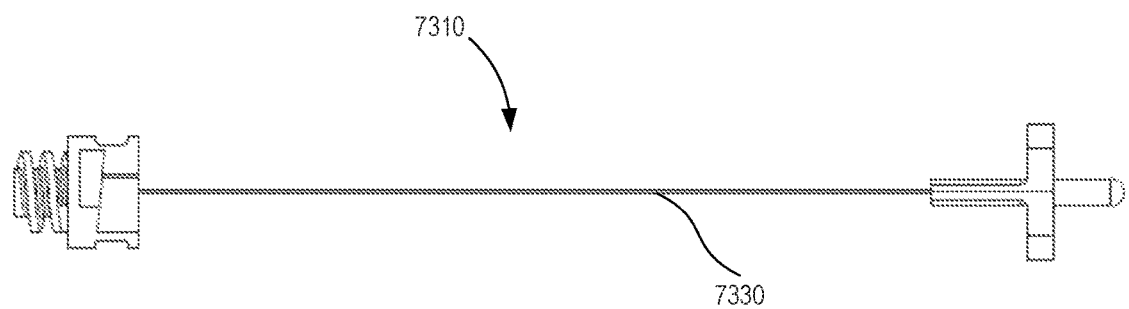
FIGS. 53-54 are a front view (FIG. 53) and a top view (FIG. 54) of the gas vent assembly shown in FIG. 52.
Figure 54:
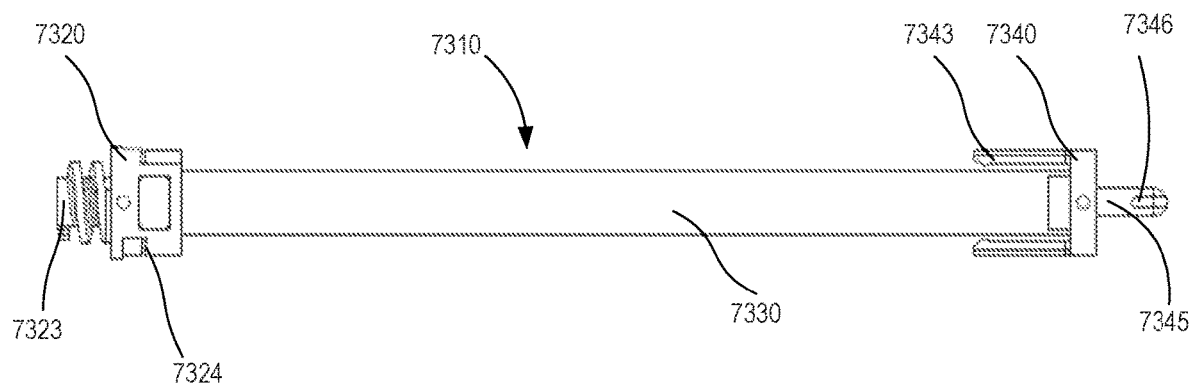

The flexible member 6330 includes a proximal end portion coupled to the valve member 6340 and a distal end portion coupled to the distal coupling member 6320. The flexible member can be a filament, wire, cord, string, or any other suitable member that can deform between a collapsed configuration (FIG. 46A) and an expanded configuration (FIG. 46C), and any number of partially-expanded configurations (e.g., FIG. 46B). In some embodiments, the flexible member 6330 can be an overmolded filament. For example, FIGS. 49 and 51 show the flexible member 6330 in a collapsed (or partially collapsed) configuration.

The valve member 6340 includes a pair of distal protrusions or arms 6343 that engage the distal coupling member 6320. The pair of distal protrusion or arms 6343 each include a latch portion 6343a that extend radially inward relative to a central axis of the valve member 6340. The latch portion

6343a is configured to engage the retention structure 6324 to keep the distal coupling member 6320 and the valve member 6340 coupled during installation, assembly, and storage of the injector 6000. The valve member 6340 includes a guide surface 6344 and a valve protrusion 6345. The guide surface 6344 is configured to slide within the slots of a guide wall, as described herein. The valve protrusion 6345 defines a passageway 6346 and the passageway 6346 is configured to place the gas chamber in fluid communication with an external environment once the valve member 6340 becomes unseated relative to the guide wall.

Figure 46A:
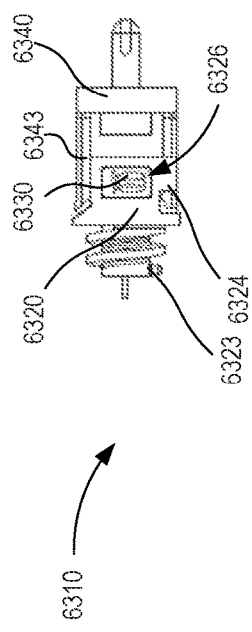
FIG. 46A is a top view of the gas vent assembly shown in FIG. 44 in a collapsed state of operation.
Figure 46B:
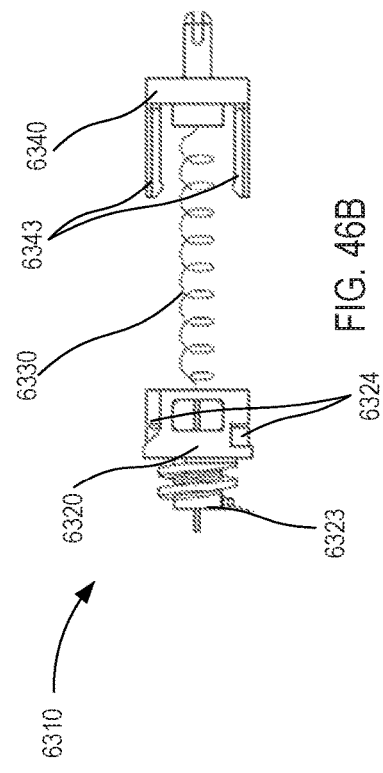
FIG. 46B is a top view of the gas vent assembly shown in FIG. 44 in a partially-expanded state of operation.
Figure 46C:
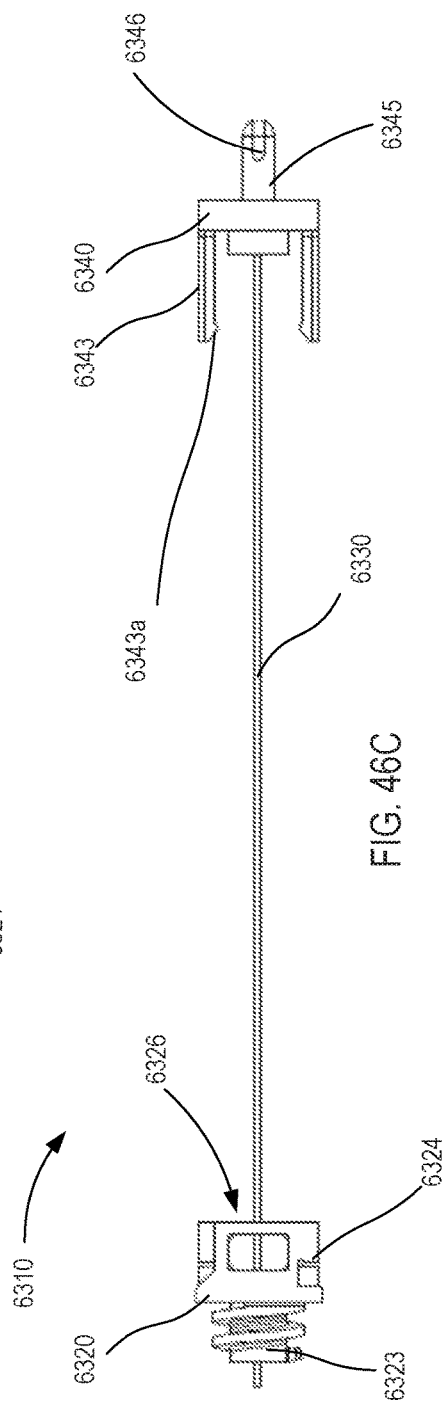
FIG. 46C is a top view of the gas vent assembly shown in FIG. 44 in a fully-expanded state of operation.
Figure 47:
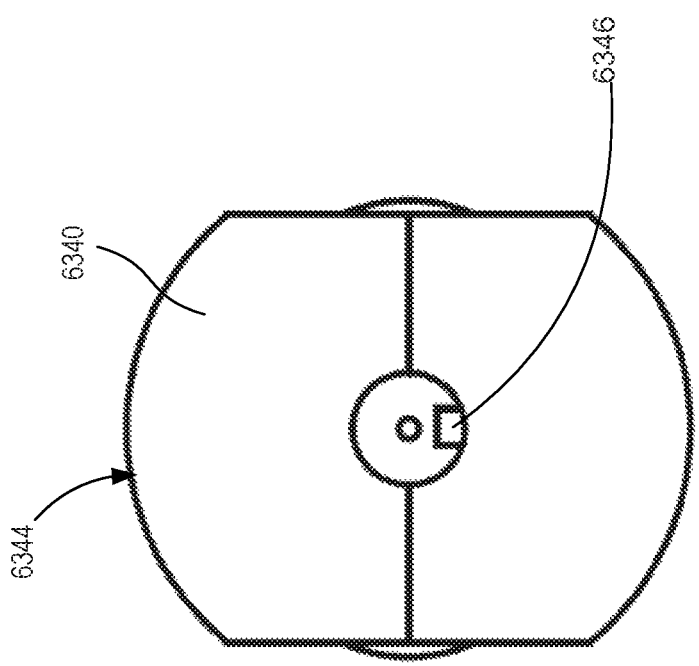
FIG. 47 is a right-side view of the gas vent assembly shown in FIG. 44

When pressurized, gas within a gas chamber (e.g., similar to the gas chamber described above for the medical injector 4000) acts on a proximal surface of the elastomeric member (e.g., the elastomeric member 4217) to cause the elastomeric member to move distally within a container body, as described herein, the distal coupling member 6320 begins to move together with the elastomeric member. The force applied by the pressurized gas on the elastomeric member causes the distal coupling member 6320 to decouple from the valve member 6340. In particular, the initial force applied on the elastomeric member pulls the distal coupling member 6320 in a distal direction (e.g. in the left-hand direction in the orientation as shown in FIGS. 46A-46C). The pull on the distal coupling member 6320 is sufficient to cause the pair of arms 6343 to flex and expand radially outwardly from the central axis of the valve member 6340. The flexing of the arms 6343 enables the latch portions 6343a to ride over the retention structure 6324 of the distal coupling member 6320 thereby enabling the distal coupling member 6320 to decouple from the valve member 6340. To maintain a position of the valve member 6340 during the initial decoupling, a force applied by the pressurized gas on an exposed surface area of the valve member 6340 (together with frictional forces acting between the O-ring and the valve protrusion 6345) is greater than a decoupling force applied by the retention structure 6324 on the latch portions 6343a as the distal coupling member 6320 decouples from the valve member 6340. This arrangement ensures that the valve member does not move distally out of the vent opening (e.g., vent opening 4112) during the decoupling of the distal coupling member 6320 and the valve member 6340. In some embodiments, a force applied by the pressurized gas on a proximal surface of the elastomeric member is about 8 to 10 lb-f (or about 44.5 N) and a force applied by the pressurized gas on a distal surface of the valve member 6340 is about 1 to 2 lb-f (or about (4.5 to 9.0N). In some embodiments, a force required to decouple the latch portions 6343a from the retention structure 6324 is less than about 1 to 2 lb-f (or about (4.5 to 9.0N). In some embodiments, a ratio of a proximal surface area of the elastomeric member exposed to the pressurized gas to a distal surface area of the valve member 6340 exposed to the pressurized gas is about 3:1. In some embodiment, the ratio of surface areas is 4:1. In some embodiments, the pressurized gas is at about 100 psi (or about 690 kPa) when initially applying force on the proximal surface of the elastomeric member and is at about 20 psi (or about 138 kPa) prior to actuating the valve member 6340, as discussed below.

As the distal coupling member 6320 continues to move distally away from the valve member 6340, the flexible member 6330 begins to unspool and lengthen along the central axis of the valve member 6340. Once the elastomeric member has traveled a first distance within the container body, which may correspond to a first predefined dosage of medicament, the flexible member 6330 reaches a fully expanded length (i.e., second effective length) and is taut between the distal coupling member 6320 and the valve member 6340. The elastomeric member then travels a second distance within the container body, as the flexible member 6330 becomes fully expanded, to actuate the valve member 6340.

As the elastomeric member travels the second distance, a tensile force is applied on the flexible member 6330 which is in turn transmitted to the valve member 6340. The tensile force (or release force) causes the valve member 6340 to move distally. The distal movement causes the valve member 6340 to unseat and places the passageway 6346 in fluid communication with the pressurized gas in the gas chamber. For example, when the valve member 6340 is unseated, the vent opening (e.g., the opening 4112), the O-ring (e.g., the O-ring 4113), and the passageway 6346 (see FIGS. 46C and 47) collectively allow the gas to escape the medicament cavity, such that needle retraction can occur and/or the injection rate can be reduced (or the injection stopped). Once the passageway 6346 is in fluid communication, pressurized gas escapes the medicament cavity and no longer acts on the proximal surface of the elastomeric member to advance the elastomeric member distally. As the elastomeric member pauses and/or reverses to travel in the proximal direction, tensile force is no longer transmitted by the flexible member 6330 to the valve member 6340. Because of the flexible nature of the flexible member 6330, both the valve member 6340 and the valve protrusion 6345 remain in their current location relative to the guide wall even if the elastomeric member reverses and begins to travel in the proximal direction. In some embodiments, frictional forces between the O-ring and the valve protrusion 6345 prevents the valve member 6340 from being fully withdrawn and removed from the O-ring (i.e., the valve protrusion 6345 remains retained within the slots of the guide wall).

As described above, when the elastomeric member moves distally, the gas vent assembly 6310 (and more particularly, the flexible member 6330) continues to move to its fully expanded configuration. After the elastomeric member has moved a predetermined distance within the medicament container body (corresponding to the desired dose), the valve protrusion 6345 is moved from within the vent opening thereby allowing the pressurized gas contained within the gas chamber to escape via the passageway 6346 and the opening. After the gas pressure within the medicament cavity decreases below a certain level, the force exerted by a retraction spring (not shown) can cause the carrier body and/or medicament container to move proximally within the housing (i.e., to retract).

Although FIGS. 44-47 show the gas vent 6310 as including a filament, in other embodiments, a gas vent assembly can include other flexible structures. For example, FIGS. 52-55C show a gas vent assembly 7310 that includes a flexible member 7330 that is a thin flat structure. Similarly stated, the flexible member 7330 can be a ribbon or band. In some embodiments, the flexible member 7330 can be constructed from paper or a polymeric material that is pre-folded in an accordion-like fashion to be placed in a collapsed configuration. Similar to the gas vent 6310, the gas vent assembly 7310 includes a distal coupling member 7320, a flexible member 7330, and a valve member 7340. These components are nested together such that the gas vent assembly 7310 can be transitioned from a collapsed, coupled configuration to an expanded, decoupled configuration, and a series of partially expanded configurations therebetween as shown generally in FIGS. 55A-55C.

The distal coupling member 7320 includes a protrusion 7323 configured to matingly engage the elastomeric member. In some embodiments, the protrusion 7323 includes a threaded screw portion configured to be inserted into a corresponding threaded member of an elastomeric member (not shown). In some embodiments, the protrusion 7323 includes a self-tapping threaded portion for piercing and threading into an elastomeric member (not shown). In this manner, movement of the elastomeric member distally causes movement of distal coupling member 7320 distally. The distal coupling member 7320 includes a retention structure 7324 configured to engage a corresponding protrusion 7343 of the valve member 7340. More particularly, when the gas vent assembly 7310 is in the collapsed configuration (FIG. 55A), the distal coupling member 7320 can be coupled to the valve member 7340. In some embodiments, the distal coupling member 7320 includes a proximal portion with a storage chamber 7326 for housing the flexible member 7320 at its first effective length in the collapsed configuration. In some embodiments, the storage chamber 7326 includes a rotatable spool shaft and the flexible member 7320 can be wound up around the spool shaft during the collapsed configuration and unwound from the spool shaft when transitioning from the collapsed configuration to the expanded configuration. In some embodiments, the distal coupling member 7320 and the valve member 7340 define a storage volume therebetween for housing a coiled, spooled, or folded flexible member 7320.

Figure 55A:
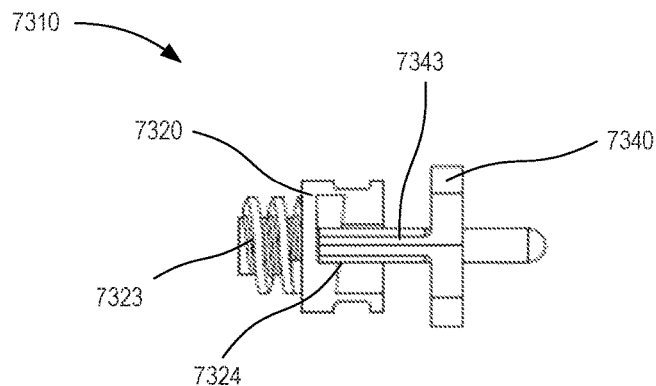
FIG. 55A is a side view of the gas vent assembly shown in FIG. 52 in a collapsed state of operation.
Figure 55B:
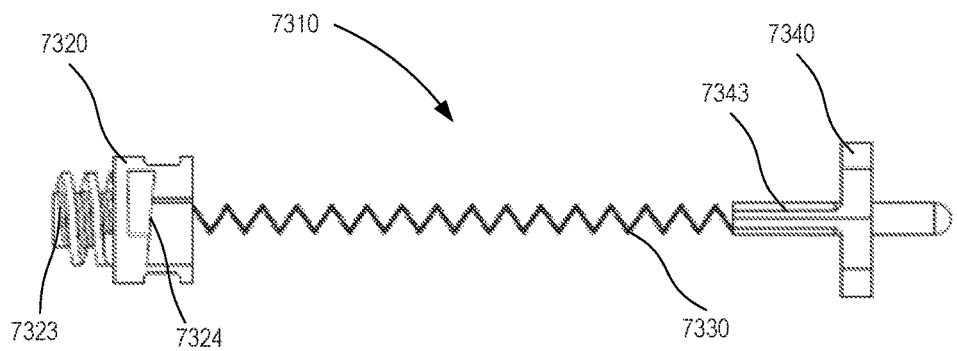
FIG. 55B is a side view of the gas vent assembly shown in FIG. 52 in a partially-expanded state of operation.
Figure 55C:
FIG. 55C is a side view of the gas vent assembly shown in FIG. 52 in a fully-expanded state of operation.

The flexible member 7330 includes a proximal end portion coupled to the valve member 7340 and a distal end portion coupled to the distal coupling member 7320. The flexible member can be a ribbon, band, or any other suitable member that can deform between a collapsed configuration (FIG. 55A) and an expanded configuration (FIG. 55C). In some embodiments, the flexible member 7330 can be an overmolded band or ribbon.

The valve member 7340 includes a pair of distal protrusions or arms 7343 that engage the distal coupling member 7320. The pair of distal protrusion or arms 7343 each include a latch portion 7343a that extend radially inward relative to a central axis of the valve member 7340. The latch portion 7343a is configured to engage the retention structure 7324 to keep the distal coupling member 7320 and the valve member 7340 coupled during installation, assembly, and storage. The valve member 7340 includes a guide surface (not shown, but similar to guide surface 6344 described above) and a valve protrusion 7345. The guide surface is configured to slide within the slots of a guide wall, as described herein. The valve protrusion 7345 defines a passageway 7346 and the passageway 7346 is configured to place the gas chamber in fluid communication with an external environment once the valve member 7340 becomes unseated relative to the guide wall.

When pressurized, gas within a gas chamber (e.g., similar to the gas chamber described above for the medical injector 4000) acts on a proximal surface of the elastomeric member (e.g., the elastomeric member 4217) to cause the elastomeric member to move distally within a container body, as described herein, the distal coupling member 7320 begins to move together with the elastomeric member. The force applied by the pressurized gas on the elastomeric member causes the distal coupling member 7320 to decouple from the valve member 7340. In particular, the initial force applied on the elastomeric member pulls the distal coupling member 7320 in a distal direction (e.g. in the left-hand direction in the orientation as shown in FIGS. 55A-55C). The pull on the distal coupling member 7320 is sufficient to cause the pair of arms 7343 to flex and expand radially outwardly from the central axis of the valve member 7340. The flexing of the arms 7343 enables the latch portions 7343a to ride over the retention structure 7324 of the distal coupling member 7320 thereby enabling the distal coupling member 7320 to decouple from the valve member 7340. To maintain a position of the valve member 7340 during the initial decoupling, a force applied by the pressurized gas on an exposed surface area of the valve member 7340 (together with frictional forces acting between the O-ring and the valve protrusion 7345) is greater than a decoupling force applied by the retention structure 7324 on the latch portions 7343a as the distal coupling member 7320 decouples from the valve member 7340. This arrangement ensures that the valve member does not move distally out of the vent opening (e.g., vent opening 4112) during the decoupling of the distal coupling member 7320 and the valve member 7340. In some embodiments, a force applied by the pressurized gas on a proximal surface of the elastomeric member is about 8 to 10 lb-f (or about 44.5 N) and a force applied by the pressurized gas on a distal surface of the valve member 7340 is about 1 to 2 lb-f (4.5 to 9.0N). In some embodiments, a force required to decouple the latch portions 7343a from the retention structure 7324 is less than about 1 to 2 lb-f (4.5 to 9.0N). In some embodiments, a ratio of a proximal surface area of the elastomeric member exposed to the pressurized gas to a distal surface area of the valve member 7340 exposed to the pressurized gas is about 3:1. In some embodiment, the ratio of surface areas is 4:1. In some embodiments, the pressurized gas is at about 100 psi (or about 690 kPa) when initially applying force on the proximal surface of the elastomeric member and is at about 20 psi (or about 138 kPa) prior to actuating the valve member 7340, as discussed below.

As the distal coupling member 7320 continues to move distally away from the valve member 7340, the flexible member 7330 begins to unspool and lengthen along the central axis of the valve member 7340. Once the elastomeric member has traveled a first distance within the container body, which may correspond to a first predefined dosage of medicament, the flexible member 7330 reaches a fully expanded length (i.e., second effective length) and is taut between the distal coupling member 7320 and the valve member 7340. The elastomeric member then travels a second distance within the container body, as the flexible member 7330 becomes fully expanded, to actuate the valve member 7340. As the elastomeric member travels the second distance, a tensile force is applied on the flexible member 7330 which is in turn transmitted to the valve member 7340 The tensile force (or release force) causes the valve member 7340 to move distally. The distal movement causes the valve member 7340 to unseat and places the passageway 7346 in fluid communication with the pressurized gas in the gas chamber. For example, when the valve member 7340 is unseated, the vent opening (e.g., the opening 4112), the O-ring (e.g., the O-ring 4113), and the passageway 7346 (see FIG. 54) collectively allow the gas to escape the medicament cavity, such that needle retraction can occur and/or the injection rate can be reduced (or the injection stopped). Once the passageway 7346 is in fluid communication, pressurized gas escapes the medicament cavity and no longer acts on the proximal surface of the elastomeric member to advance the elastomeric member distally. As the elastomeric member pauses and/or reverses to travel in the proximal direction, tensile force is no longer transmitted by the flexible member 7330 to the valve member 7340. Because of the flexible nature of the flexible member 7330, both the valve member 7340 and the valve protrusion 7345 remain in their current location relative to the guide wall even if the elastomeric member reverses and begins to travel in the proximal direction. In some embodiments, frictional forces between the O-ring and the valve protrusion 7345 prevents the valve member 7340 from being fully withdrawn and removed from the O-ring (i.e., the valve protrusion 7345 remains retained within the slots of the guide wall).

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

For example, in some embodiments, a medicament delivery device can include two or more medicament containers, each having a delivery member through which the medicament therein can be delivered. Such embodiments can accommodate the delivery of viscous medicaments and/or large volumes of medicament (e.g. >1 mL dose) by delivering portions of the overall dose in parallel. Specifically, as discussed above with respect to Eq. 1, the needle length (L) and the needle gauge (identified as the radius R of the needle lumen) can have a profound impact on the pressure needed to deliver a desired volume of medicament therethrough. Thus, by using a "parallel delivery" device of the types shown and described herein, delivery of viscous medicaments, such as certain large or macromolecular injectables that include carbohydrate-derived formulations, lipids, nucleic acids, proteins/peptides (e.g. monoclonal antibodies) and other biotechnologically-derived medicaments, can be facilitated. Any of the gas venting mechanisms, electronic circuit systems, or other components described herein can be included in a dual container device of the types shown and described in the '4345 PCT.

For example, any of the devices shown and described herein can include an electronic circuit system to provide user instruction and/or feedback. In some embodiments the electronic circuit system can be integral to the device (e.g., included within the housing, such as the housing 4100). In other embodiments, the electronic circuit system can be an external, discrete component that is affixed to the device.

For example, any of the elastomeric members described herein can be constructed from any suitable material or combination of different materials. For example, in some embodiments, at least a portion of any of the elastomeric members described herein can be coated. Such coatings can include, for example, polydimethylsiloxane. In some embodiments, at least a portion of any of the elastomeric members described herein can be coated with polydimethylsiloxane in an amount of between approximately 0.02 mg/cm$^2$ and approximately 0.80 mg/cm$^2$.

Any of the medicament container assemblies described herein can have any suitable size (e.g., length and/or diameter) and can contain any suitable volume of the medicament. In some embodiments, any of the medicament container assemblies described herein can be a prefilled (or prefillable) syringe, such as those manufactured by Becton Dickinson, Gerresheimer, Ompi Pharma or others. For example, in some embodiments, the medicament container assembly 4200 (and any of the medicament container assemblies described herein) can be a Becton Dickinson "BD Hypak Physiolis" prefillable syringe containing any of the medicaments described herein. Moreover, any of the medicament delivery devices and/or medical injectors described herein can be configured to inject any suitable dosage such as, for example, a dose of up to 1 mL of any of the medicaments described herein. In other embodiments, any of the medicament delivery devices and/or medical injectors described herein can be configured to inject a dose of up to 2 mL, 3 mL, 4 mL, 5 mL, or more of any of the medicaments described herein.

Any of the container bodies described herein can be constructed from glass, and can be fitted and/or coupled to any suitable needle. For example, in some embodiments, any of the container bodies described herein (including the container body 4210) can be coupled to a needle having any suitable size. Any of the medicament container assemblies and/or prefilled syringes described herein can be coupled to a needle having a gauge size of 21 gauge, 22 gauge, 23 gauge, 24 gauge, 25 gauge, 26 gauge, 27 gauge, 28 gauge, 29 gauge, 30 gauge, or 31 gauge. Any of the medicament container assemblies and/or prefilled syringes described herein can be coupled to a needle having any suitable length, such as, for example, a length of about 0.2 inches, about 0.27 inches, about 0.38 inches, about 0.5 inches, about 0.63 inches, about 0.75 inches, or more. In some embodiments, any of the medicament containers and/or prefilled syringes described herein can be coupled to a 29 gauge, needle having a length of approximately 0.5 inches. Moreover, any of the medicament containers and/or prefilled syringes described herein can include a staked needle at the distal end thereof.

For example, any of the medical injectors shown and described herein can include a base (or distal actuator) having a mechanism for cooling the surface of the target injection site. By cooling the target injection site, patient comfort during an injection operation can be improved. Such cooling mechanisms can include, for example, an electronic cooler (e.g., a thermo-electric cooler) that is triggered upon removal of a safety guard, a chemical or spray that is emitted by the base upon removal of the safety guard, or any other suitable mechanism.

Any of the medical injectors shown and described herein can include a base (or distal actuator) having a mechanism for expanding, stretching or otherwise pulling taut a patient's skin at or near an injection site. In other embodiments, the base (or distal actuator) of any of the injectors described herein can include a mechanism that increases the surface area of the base (or distal actuator) against the injection site. For example, in some embodiments a base can include a series of grips, protrusions, microneedles, or the like that can grip the skin and expand to stretch the surface prior to actuation and/or injection or allow for a large surface area of contact against the skin for added stability for injectate administration. In other embodiments, a base can include a series of grips, protrusions, microneedles, or the like that can grip the skin and pinch the surface together prior to actuation and/or injection. Such a base can include a dome or other structure to pinch certain portions of the anatomy, such as, for example, the abdomen.

Although the medicament injectors shown and described above include a delivery mechanism (e.g., 4300) including the release of a pressurized gas, in other embodiments, a medicament delivery device can include any suitable method of delivery of a medicament disposed within. For example, in some embodiments, any of the devices described herein can include a mechanical energy storage (e.g. spring, gears, racks, pinions, pulleys, or the like) member, rather than a compressed gas container. In other embodiments, any of the devices described herein can include any other suitable energy storage member (e.g., magnetic, electrical, propellant based, chemical reaction based, or the like).

While the medical injectors herein are described as being "pistonless" gas-powered auto-injectors, in other embodiments, any of the medical injectors can include any suitable energy storage member configured to produce a force directly on a medicament container and/or a carrier (as described, for example, in the '849 patent). For example, in some embodiments, a medical injector can include one or more bias members, springs, and/or any other suitable mechanical drives (as described above) configured to exert a force on one or more medicament containers. By way of example, a medical injector can include a first spring configured to produce a force on a first medicament container and a second spring configured to produce a force, substantially equal to the force produced by the first spring, on a second medicament container. Moreover, the first spring and the second spring can be actuated substantially concurrently and/or via the same actuation event such that the first spring and second spring move the first medicament container and the second medicament container substantially concurrently.

Although particular injection events, mechanisms, devices, and/or components have been described herein, it is to be understood that they have been presented by way of example and not limitation. That is to say, an auto-injector can include more than one medicament container and can be configured to deliver at least one dose of a medicament to a patient in response any suitable actuation event and/or the like.

Any of the devices and/or medicament containers shown and described herein can be constructed from any suitable material. Such materials include glass, plastic (including thermoplastics such as cyclic olefin copolymers), or any other material used in the manufacture of prefilled syringes containing medications.

Any of the devices and/or medicament containers shown and described herein can contain and/or deliver a wide array of large or macromolecular injectables that include carbohydrate-derived formulations, lipids, nucleic acids, proteins/peptides (e.g. monoclonal antibodies) and other biotechnologically-derived medicaments. For example, anti-tumor necrosis factor agents such as infliximab, etanercept, adalimumab, golimumab, natalizumab, vedolizumab, and certolizumab can be administered using the described auto-injector heroin, Other macromolecular injectable medications that can be administered using the device and/or medicament containers shown and described herein include viscous medicaments that target pro-inflammatory cytokines (e.g. IL-1, IL-2, IL-4, IL-5, IL-6, IL-12, IL-13, IL-23, IL-17, IL-21, IL-23A, and associated receptors) including dupilumab, sarilumab, mepolizumab, benralizumab, reslizumab, lebrikizumab, ustekinumab, anrunkinzumab, bertilimumab, tralokinumab, and risankizumab. Large anti-adhesion molecules to treat a variety of diseases may be administered using the device and/or medicament containers shown and described herein including etrolizumab and vatelizumab. Still other large and viscous monoclonal antibodies that may be administered using the device and/or medicament containers shown and described herein include tezepelumab, anifrolumab, omalizumab, and proprotein convertase subtilisin kexin type 9 (PCSK9) inhibitors including alirocumab and evolocumab.

Any of the medicament delivery devices and/or medicament containers described herein can be filled with and/or used to inject an anti-thrombolytic, such as LMWH, ULMWH, Xa Inhibitors, biotinylated idraparinux, etc., for either the acute management and/or surgical prophylaxis of deep vein thrombosis and/or pulmonary embolism or for the management of other conditions which may require anticoagulation to prevent thromboembolism, such as its use in cardiovascular diseases including atrial fibrillation and ischemic stroke. In another example, in some embodiments an injector according to an embodiment can be filled with and/or used to inject formulations for the treatment of asthma and/or chronic obstructive pulmonary disease.

Any of the medicament delivery devices and/or medicament containers described herein can be filled with and/or used to inject recombinant hyaluronidase. Any of the medicament delivery devices and/or medicament containers described herein can be filled with and/or used to inject depot medroxyprogesterone acetate for the treatment of infertility.

Any of the medicament delivery devices and/or medicament containers described herein can be filled with and/or used to inject Benzodiazepines such as Midazolam, Anticoagulants, Hematopoietic agents, Adrenocortical steroids, Antidiabetic agents, Sex hormones, Somatostatin Analogs, Monoclonal Antibodies, Agents for Migraine, Antianxiety Agents, Antiemetic/Antivertigo Agents, Antipsychotic Agents, General Anesthetics, NSAIDs, Opioid Agonist-Antagonist, Opioid Analgesics, Skeletal Muscle Relaxants. Aminoglycosides, Antiprotozoals, Antiretroviral Agents, Antituberculosis Agents, Bacitracin, Cephalosporin and Related Antibiotics, Colistimethate sodium, Lincosamides, Monobactams, Penicillins, Polymyxin B Sulfate, Antirheumatologic Agents, Antimetabolites, Immune Globulins, Immulogic Agents, Monoclonal antibodies, Antimetabolites, Hematopoietic, and/or Hemin, and agents that block proprotein convertase subtilisin/kexin type 9 (PCSK9).

Any of the medicament delivery devices and/or medicament containers described herein described herein can be filled with and/or used to inject environmental, food, and household allergen formulations for the treatment of allergic disease, specifically for use in immunotherapy.

Any of the devices and/or medicament containers shown and described herein can include any suitable medicament or therapeutic agent. In some embodiments, the medicament contained within any of the medicament containers shown herein can be a vaccine, such as, for example, an influenza A vaccine, an influenza B vaccine, an influenza A (H1N1) vaccine, a hepatitis A vaccine, a hepatitis B vaccine, a haemophilus influenza Type B (HiB) vaccine, a measles vaccine, a mumps vaccine, a rubella vaccine, or combination vaccine (e.g. measles, mumps and rubella, quadrivalent, or hexavalent vaccines), a polio vaccine, a human papilloma virus (HPV) vaccine, a tetanus vaccine, a diphtheria vaccine, a pertussis vaccine, a bubonic plague vaccine, a yellow fever vaccine, a cholera vaccine, a malaria vaccine, a cancer vaccine, a smallpox vaccine, a pneumococcal vaccine, a rotavirus vaccine, a varicella vaccine, a dengue fever vaccine, a rabies vaccine and/or a meningococcus vaccine. In other embodiments, the medicament contained within any of the medicament containers shown herein can be a catecholamine, such as epinephrine. In other embodiments, the medicament contained within any of the medicament containers shown herein can be an opioid receptor antagonist, such as naloxone, including any of the naloxone formulations described in U.S. Pat. No. 8,627,816, entitled "Medicament Delivery Device for Administration of Opioid Antagonists Including Formulation for Naloxone," filed on Feb. 28, 2011. In yet other embodiments, the medicament contained within any of the medicament containers shown herein can include peptide hormones such as insulin and glucagon; human growth hormone (HGH); sumatriptan; a corticosteroid such as dexamethasone; ondansetron; an opioid agonist receptor modulators such as fentanyl; a partial agonist opioid receptor modulators such as buprenorphine; a mixed agonist/antagonist opioid receptor modulator such as nalbuphine; a benzodiazepine such as diazepam, midazolam, lorazepam, or biologics such as glucagon or human growth hormone; erythropoiesis-stimulating agents (ESA) such as darbepoetin alfa; immunoglobulins including dual-variable domain immunoglobulins; interferons; anti-tumor; recombinant human granulocyte colony-stimulating factor (GCSF) such as pegfilgrastim; icatibant; and other therapies suitable for injection in mammals. In yet other embodiments, the medicament contained within any of the medicament containers shown herein can be a placebo substance (i.e., a substance with no active ingredients), such as water.

The medicament containers and/or medicament delivery devices disclosed herein can contain any suitable amount of any medicament. For example, in some embodiments, a medicament delivery device as shown herein can be a single-dose device containing an amount medicament to be delivered of approximately 0.4 mg, 0.8 mg, 1 mg, 1.6 mg or 2 mg. As described above, the fill volume can be such that the ratio of the delivery volume to the fill volume is any suitable value (e.g., 0.4, 0.6 or the like). In some embodiments, an electronic circuit system can include "configuration switch" that, when actuated during the assembly of the delivery device, can select an electronic output corresponding to the dose contained within the medicament container.

In some embodiments, a medical injector can include two prefilled syringes, each containing up to 1 mL of medicament (or more), and each having a needle. Such devices (e.g., "dual container devices") are shown and described in the '4345 PCT, which is incorporated by reference herein. Upon actuation of the device (as described above), a single energy storage member (e.g., a compressed gas container) can release energy to move the two containers within the housing in substantially the same operation to inject the two needles. The force produced by the energy storage member can further inject the medicament from each container. In such embodiments, the two containers can include either the same medicament or two different medicaments. For example, a dual container device can be filled with and/or used to inject methotrexate (from one container) and tocilizumab (in the other container) for the treatment of rheumatoid arthritis. In some embodiments, a dual container device can be filled with and/or used to inject tocilizumab and methotrexate for the treatment of rheumatoid arthritis, adalimumab and methotrexate for the treatment of psoriasis or rheumatoid arthritis, etanercept and methotrexate for the treatment of psoriatic arthritis, belimumab and rituximab for the treatment of Primary Sjogren's Syndrome, lanreotide autogel and pegvisomant for the treatment of acromegaly, narlaprevir and ritonavir for the treatment of chronic hepatitis C, alemtuzumab and rituximab for the treatment of chronic lymphocytic leukemia, pertuzumab and trastuzumab for the treatment of HER2-Positive early breast cancer, long-acting insulin glargine and fast-acting insulin lispro for the treatment of Type 2 diabetes, pramlintide and insulin for the treatment of Type 1 diabetes, insulin glargine and insulin lispro for the treatment of Type 1 diabetes, mosunetuzumab and atezolizumab for the treatment of neoplasm, nivolumab and tumor-infiltrating lymphocytes with interleukin-2 for the treatment of metastatic melanoma, pertuzumab and trastuzumab for the treatment of HER2 positive early breast cancer, ocrelizumab and recombinant human hyaluronidase for the treatment of multiple sclerosis, daratumumab recombinant human hyaluronidase for the treatment of multiple myeloma, nivolumab and recombinant human hyaluronidase for the treatment of metastatic tumors, and insulin lispro and recombinant human hyaluronidase for the treatment of diabetes mellitus.

Any of the medicament containers described herein can include any suitable elastomeric member and/or plunger. For example, an elastomeric member can be formulated to be compatible with the medicament contained within a medicament container. Moreover, a medicament container can include any number of elastomeric members. For example, in some embodiments, a medicament container can include a dry portion of a medicament and a fluid portion of the medicament, configured to be mixed before injection. The piston portion of the medicament delivery mechanism can be configured to engage multiple elastomeric members associated with the portions of the medicament. In this manner, multiple elastomeric members can be engaged to mix the dry portion with the fluid portion of the medicament before the completion of an injection event. In some embodiments, for example, any of the devices shown and described herein can include a mixing actuator similar to the mixing actuators shown and described in U.S. Pat. No. 9,173,999, entitled "Devices and Methods for Delivering Medicaments from a Multi-Chamber Container," filed Jan. 25, 2012, which is incorporated herein by reference in its entirety.

Although the injectors described herein have been shown and described as including mechanisms for needle retraction, in other embodiments any of the injectors shown and described herein can include a needle shield that extends distally after the injection to cover the exposed needle. Such a design may be used, for example, in a "pistonless" design as discussed above. For example, in some embodiments, a base of a medical injector (e.g. the base 4510 or the base 8510) can be (or include) an extending portion that, upon completion of the injection, extends distally to cover the needle. In some such embodiments, the gas vent assembly can divert all or a portion of the pressurized gas to a volume within the housing such that the diverted gas exerts a force on the base (or a portion of the base) to cause the base (or portion of the base) to extend distally to cover the needle. In other such embodiments, a spring, biasing member, or retraction member can propel the base (or portion of the base) distally.

Although the gas vent assembly 4310 is shown and described herein as moving a valve portion relative to a seal to selectively place an internal gas chamber in fluid communication with an external volume, in other embodiments, any of the gas vent assemblies disclosed herein can be operable to vent all or a portion of the pressurized gas to a second region within the housing. Further, any of the gas vent assemblies disclosed herein can include any suitable valve arrangement. For example, in some embodiments a gas vent assembly and/or a portion a housing can include a tear-through seal that is punctured or torn when a portion of a medicament carrier or a portion of an elastomeric member moves past a specific point during a delivery event. In other embodiments, a gas vent assembly and/or a portion a housing can include a movable valve member (e.g., a poppet, ball, or the like) that is moved to release pressure when a portion of a medicament carrier or a portion of an elastomeric member moves past a specific point during a delivery event.

Although various embodiments have been described as having particular features and/or combinations of components, other embodiments are possible having a combination of any features and/or components from any of embodiments where appropriate. For example, any of the devices shown and described herein can include an electronic circuit system as described herein.

What is claimed is:

1. An apparatus, comprising:
   a housing defining a gas chamber, a side wall of the housing defining an opening positioned to selectively place the gas chamber in fluid communication with an exterior volume, the gas chamber being configured to receive a pressurized gas upon actuation of the apparatus;
   a valve member at least partially occluding the opening prior to actuation of the apparatus;
   a carrier disposed within the housing, a proximal surface of the carrier defining a portion of a boundary of the gas chamber;
   a medicament container coupled to the carrier, a distal end portion of the medicament container configured to be coupled to a delivery member, the medicament container containing a medicament;
   an elastomeric member positioned within the medicament container, the elastomeric member sealing the medicament within the medicament container;
   a distal coupling member coupled to the elastomeric member, the distal coupling member including a retention structure coupled to the valve member prior to actuation of the apparatus;
   a flexible member having a distal end portion coupled to the distal coupling member and a proximal end portion coupled to the valve member, the flexible member being housed in a collapsed configuration within a storage volume defined by the distal coupling member and the valve member, the flexible member having the collapsed configuration prior to actuation of the apparatus and an expanded configuration when the elastomeric member moves within the medicament container in response to a portion of the pressurized gas, the flexible member being configured to exert a release force on the valve member to move the valve member relative to the opening on a condition that the flexible member is in the expanded configuration to place the gas chamber in fluid communication with the exterior volume.

2. The apparatus of claim 1, wherein the flexible member is at least one of a filament or a band.

3. The apparatus of claim 2, wherein the flexible member is overmolded with a plastic material.

4. The apparatus of claim 1, wherein the valve member moves in a distal direction on the condition that the flexible member is in the expanded configuration and the elastomeric member continues to move in the distal direction in response to the portion of the pressurized gas acting directly on the elastomeric member within the medicament container.

5. The apparatus of claim 4, wherein the elastomeric member pulls the valve member via the flexible member when the flexible member is in the expanded configuration.

6. The apparatus of claim 1, wherein:
   the valve member includes a latch protrusion positioned to engage the retention structure of the distal coupling member prior to actuation of the apparatus.

7. The apparatus of claim 1, wherein the elastomeric member moves within the medicament container through a stroke length to convey a dose of the medicament from the medicament container via the delivery member in response to the portion of the pressurized gas acting directly on the elastomeric member within the medicament container.

8. The apparatus of claim 7, further comprising:
   a gas vent assembly including the valve member coupled to the distal coupling member via the flexible member; and
   the gas vent assembly being movable from a first configuration prior to actuation of the apparatus to a second configuration, the second configuration corresponding to a fully expanded length of the flexible member, a length of the gas vent assembly in the second configuration corresponds to the stroke length, the length controlling a volume of the dose delivered.

9. The apparatus of claim 7, wherein the medicament comprises icatibant.

10. The apparatus of claim 7, wherein the medicament comprises a monoclonal antibody.

11. The apparatus of claim 1, wherein:
    the delivery member is a needle; and
    the medicament container is a prefilled syringe, the needle being staked to a distal end portion of a container body of the prefilled syringe.

12. The apparatus of claim 11, wherein the medicament within the prefilled syringe is any one of a drug or a biologic product.

13. The apparatus of claim 1, further comprising:
    a gas container within the housing, the gas container being configured to produce the pressurized gas within the gas chamber when the gas container is actuated.

14. The apparatus of claim 1, wherein:
    the valve member includes a valve protrusion; and
    the valve protrusion defines a passageway to place the gas chamber in fluid communication with the exterior volume when the valve member is moved relative to the opening.

15. An apparatus, comprising:
    a housing defining a gas chamber configured to receive a pressurized gas upon actuation of the apparatus, a side wall of the housing defining an opening configured to selectively place the gas chamber in fluid communication with an exterior volume;
    a medicament container supported within the housing, a distal end portion of the medicament container configured to be coupled to a delivery member, the medicament container containing a medicament and an elastomeric member that seals the medicament within the medicament container; and
    a valve assembly including a tension member coupled between a distal coupling member and a valve member, the distal coupling member being coupled to the elastomeric member within the medicament container the tension member being housed in a collapsed configuration within a storage volume defined by the distal coupling member and the valve member under a condition that the distal coupling member and the valve member are coupled together prior to actuation of the apparatus an expanded configuration when the elastomeric member moves within the medicament container in response to a portion of the pressurized gas, the tension member being configured to transmit a tensile force on the valve member to move the valve member relative to the opening to place the gas chamber in fluid communication with the exterior volume on a condition that the tension member has a fully expanded length.

16. The apparatus of claim 15, wherein the tension member is coiled, folded, rolled, or spooled in the collapsed configuration.

17. The apparatus of claim 15, wherein:
    the distal coupling member includes a retention structure; and the valve member includes a latch protrusion positioned to engage the retention structure of the distal coupling member when the tension member is in the collapsed configuration.

18. The apparatus of claim 17, wherein the latch protrusion is configured to release from the retention structure in response to a force applied by the pressurized gas on the elastomeric member upon actuation of the apparatus.

* * * * *

UNITED STATES PATENT AND TRADEMARK OFFICE
CERTIFICATE OF CORRECTION

PATENT NO. : 12,478,739 B2
APPLICATION NO. : 17/415397
DATED : November 25, 2025
INVENTOR(S) : Eric S. Edwards et al.

It is certified that error appears in the above-identified patent and that said Letters Patent is hereby corrected as shown below:

In the Claims

Claim 1, Line 23 – Column 37, Line 27 – change "apparatus;" to --apparatus; and--

Claim 15, Line 15 – Column 38, Line 48 – change "container" to --container,--

Claim 15, Line 21 – Column 38, Line 54 – change "apparatus an" to --apparatus and having an--

Signed and Sealed this
Twenty-seventh Day of January, 2026

John A. Squires
*Director of the United States Patent and Trademark Office*